US012625409B2

(12) United States Patent
Dayal et al.

(10) Patent No.: US 12,625,409 B2
(45) Date of Patent: May 12, 2026

(54) MULTI-SENSOR SYNERGY

(71) Applicant: View, Inc., Milpitas, CA (US)

(72) Inventors: Aditya Dayal, Sunnyvale, CA (US); Nitesh Trikha, Pleasanton, CA (US)

(73) Assignee: View Operating Corporation, San Jose, CA (US)

( * ) Notice: Subject to any disclaimer, the term of this patent is extended or adjusted under 35 U.S.C. 154(b) by 355 days.

(21) Appl. No.: 18/263,216

(22) PCT Filed: Jan. 27, 2022

(86) PCT No.: PCT/US2022/014135
§ 371 (c)(1),
(2) Date: Jul. 27, 2023

(87) PCT Pub. No.: WO2022/165062
PCT Pub. Date: Aug. 4, 2022

(65) Prior Publication Data
US 2024/0126130 A1      Apr. 18, 2024

Related U.S. Application Data

(63) Continuation of application No. PCT/US2021/015378, filed on Jan. 28, 2021, which
(Continued)

(51) Int. Cl.
*G02F 1/163* (2006.01)
*E06B 9/24* (2006.01)
(Continued)

(52) U.S. Cl.
CPC ................ *G02F 1/163* (2013.01); *E06B 9/24* (2013.01); *G05B 19/042* (2013.01); *H02J 50/20* (2016.02);
(Continued)

(58) Field of Classification Search
USPC ........................................................ 700/276
See application file for complete search history.

(56) References Cited

U.S. PATENT DOCUMENTS

| | | | |
|---|---|---|---|
| 2004/0050188 A1* | 3/2004 | Richards .......... | G08B 13/19619 73/866.3 |
| 2012/0109721 A1* | 5/2012 | Cebon ................... | G06Q 30/06 705/13 |

(Continued)

OTHER PUBLICATIONS

Albertos, Pedro, and Graham C. Goodwin. "Virtual sensors for control applications." Annual Reviews in Control 26.1 (2002): 101-112. (Year: 2002).*

*Primary Examiner* — Mohammad Ali
*Assistant Examiner* — Joshua T Sanders
(74) *Attorney, Agent, or Firm* — Cha & Reiter, LLC.

(57) ABSTRACT

Disclosed herein are methods, apparatuses, non-transitory computer readable media, and systems for performing synergistic sensing an attribute of an environment of a facility. Sensing may be performed by sensors of a facility from which a first sensor measures a first attribute at its first sampling rate. Due to a correlation of the first sensor and a second sensor that measures a second attribute at a second sampling rate slower than the first sampling rate, the second attribute can be determined and/or predicted at least in part by using measurements of the first attribute by the first sensor.

20 Claims, 26 Drawing Sheets

1600

| Attribute Description | Sensors | | | | | | |
|---|---|---|---|---|---|---|---|
| | Temperature | Relative Humidity | CO₂ | VOC | Lux | CCT | SPL |
| Occupancy status/number | | | X | | | | X |
| Loud/troublesome noises/lights | | | | | X | | X |
| Cleaning in progress | | | X | X | X | | X |
| Energy efficiency | X | X | | | X | X | |
| Comfort level | X | X | X | | X | | X |
| Inside air quality | | | X | X | | | |
| People movement | | | X | | X | | X |
| Restroom usage/space used | | | X | | X | | X |
| Maximum occupancy exceeded | | | X | | X | | X |
| Rapidly changing weather condition | | | | | | | X |
| Flight arrivals at airport gate | | | | X | | | X |

Related U.S. Application Data is a continuation of application No. 17/083,128, filed on Oct. 28, 2020, now abandoned, which is a continuation of application No. 16/664,089, filed on Oct. 25, 2019, now Pat. No. 11,294,254, which is a continuation-in-part of application No. PCT/US2019/030467, filed on May 2, 2019, which is a continuation-in-part of application No. PCT/US2018/029460, filed on Apr. 25, 2018, said application No. 16/664,089 is a continuation-in-part of application No. PCT/US2018/029460, filed on Apr. 25, 2018.

(60) Provisional application No. 63/263,806, filed on Nov. 9, 2021, provisional application No. 62/967,204, filed on Jan. 29, 2020, provisional application No. 62/666,033, filed on May 2, 2018, provisional application No. 62/607,618, filed on Dec. 19, 2017, provisional application No. 62/523,606, filed on Jun. 22, 2017, provisional application No. 62/507,704, filed on May 17, 2017, provisional application No. 62/506,514, filed on May 15, 2017, provisional application No. 62/490,457, filed on Apr. 26, 2017.

(51) Int. Cl.
    *G05B 19/042*     (2006.01)
    *H02J 50/20*     (2016.01)
    *H02J 50/80*     (2016.01)

(52) U.S. Cl.
    CPC ....... *H02J 50/80* (2016.02); *E06B 2009/2417* (2013.01); *E06B 2009/2464* (2013.01); *G05B 2219/25011* (2013.01); *G05B 2219/25252* (2013.01); *G05B 2219/2614* (2013.01); *G05B 2219/2628* (2013.01)

(56) References Cited

U.S. PATENT DOCUMENTS

| | | | |
|---|---|---|---|
| 2015/0001076 A1* | 1/2015 | Porro | G01N 27/26 |
| | | | 216/18 |
| 2020/0033163 A1* | 1/2020 | Agarwal | G06N 20/00 |

* cited by examiner

400 interior

406

S4

S3

408

S2

S1 exterior

404

600
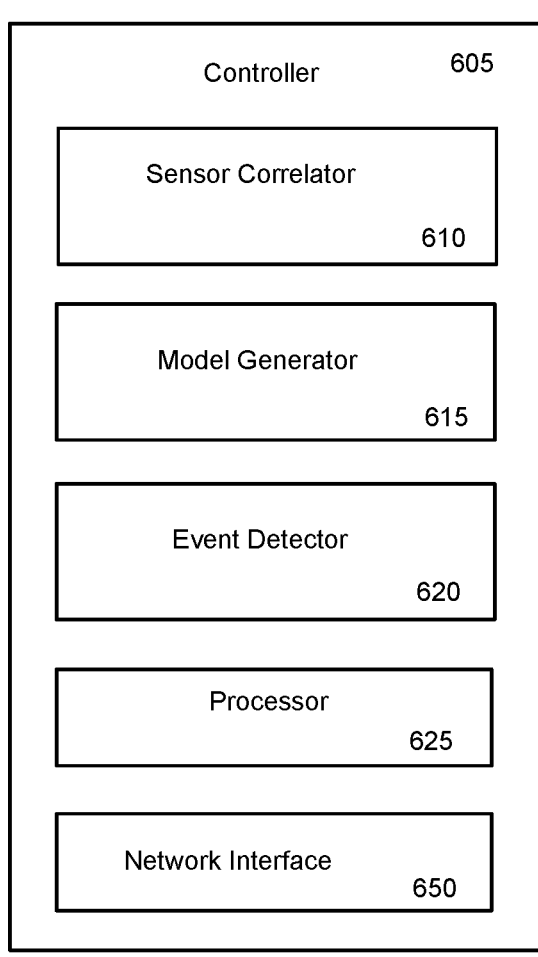
Controller    605
Sensor Correlator
610
Model Generator
615
Event Detector
620
Processor
625
Network Interface
650
FIGURE 6

700
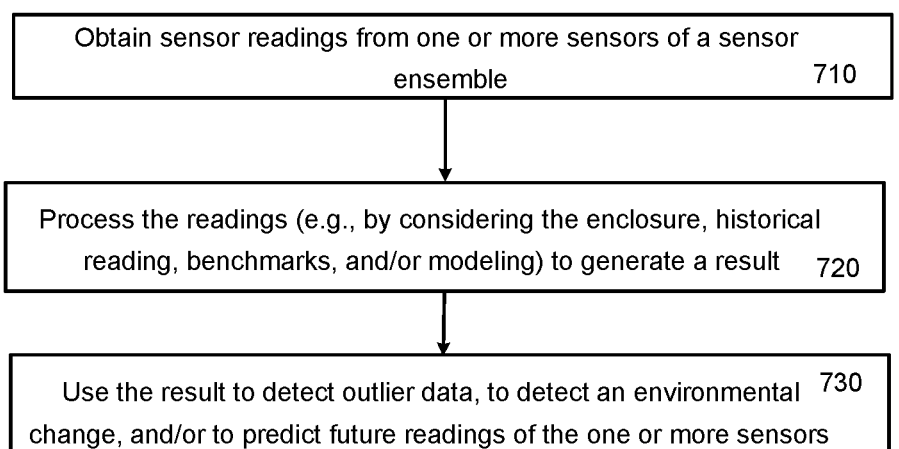
Obtain sensor readings from one or more sensors of a sensor ensemble     710
Process the readings (e.g., by considering the enclosure, historical reading, benchmarks, and/or modeling) to generate a result     720
Use the result to detect outlier data, to detect an environmental 730 change, and/or to predict future readings of the one or more sensors
FIGURE 7

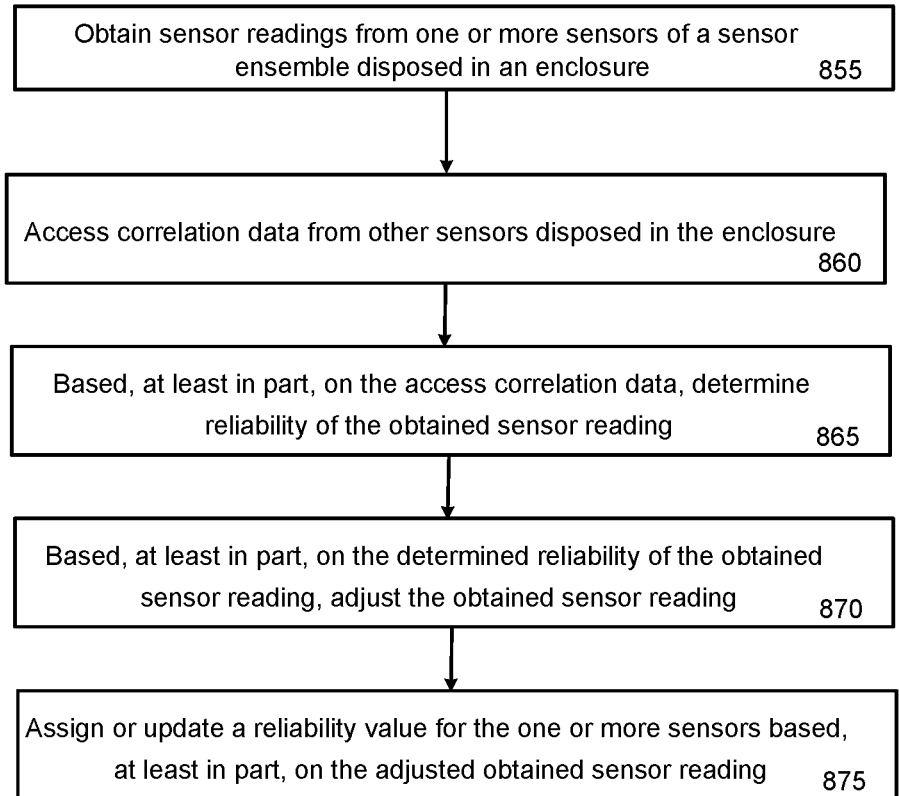

Obtain sensor readings from one or more sensors of a sensor ensemble disposed in an enclosure     855

Access correlation data from other sensors disposed in the enclosure     860

Based, at least in part, on the access correlation data, determine reliability of the obtained sensor reading     865

Based, at least in part, on the determined reliability of the obtained sensor reading, adjust the obtained sensor reading     870

Assign or update a reliability value for the one or more sensors based, at least in part, on the adjusted obtained sensor reading     875

FIGURE 8

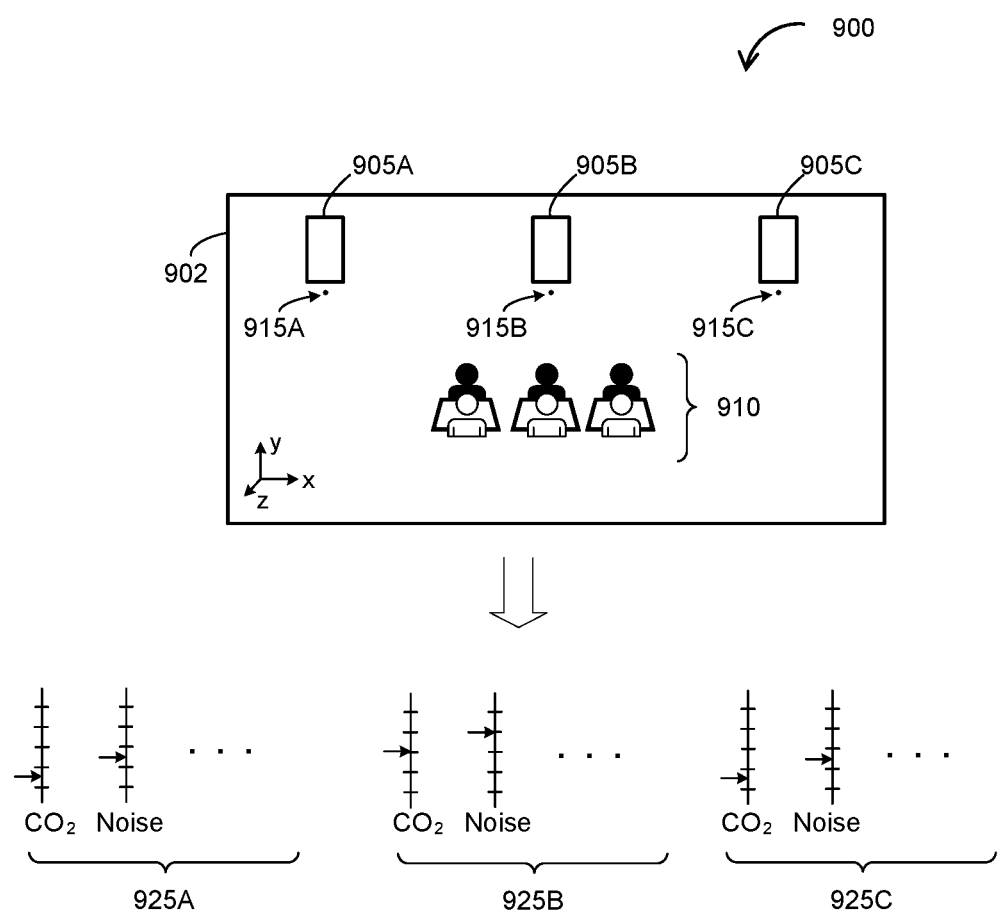
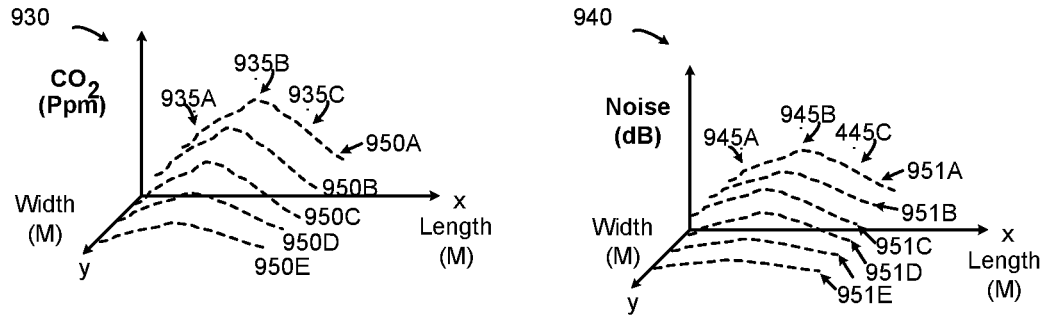
FIGURE 9

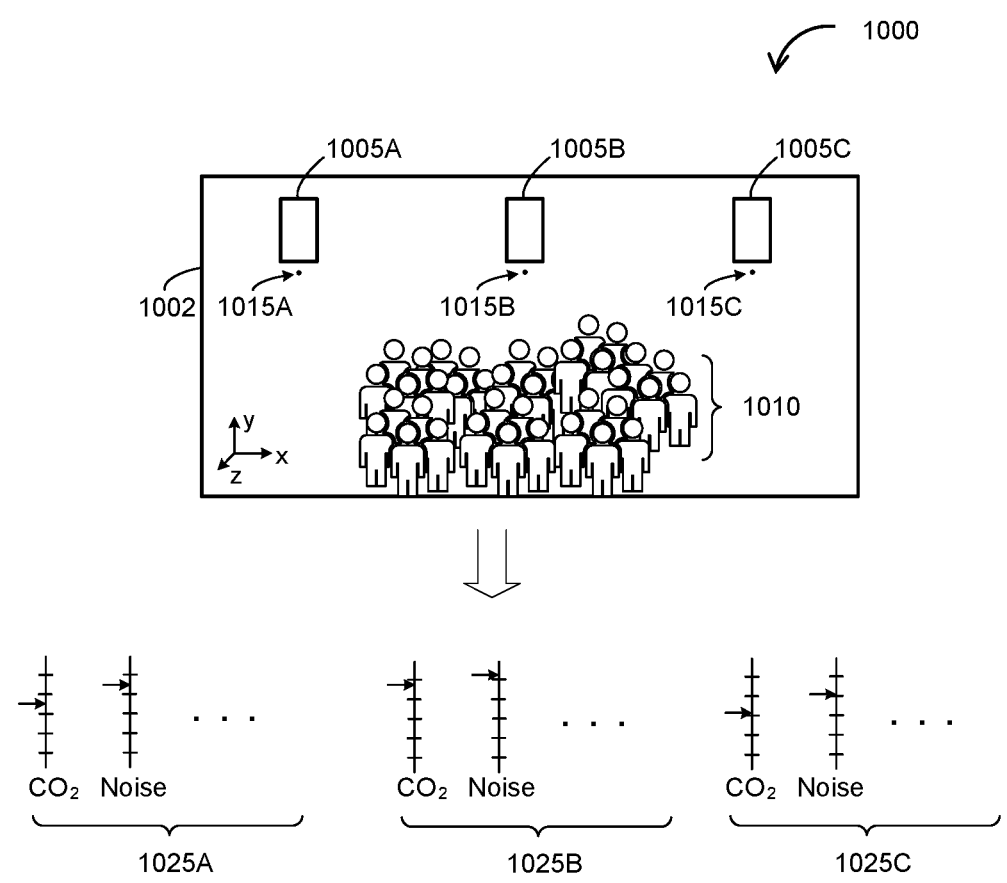
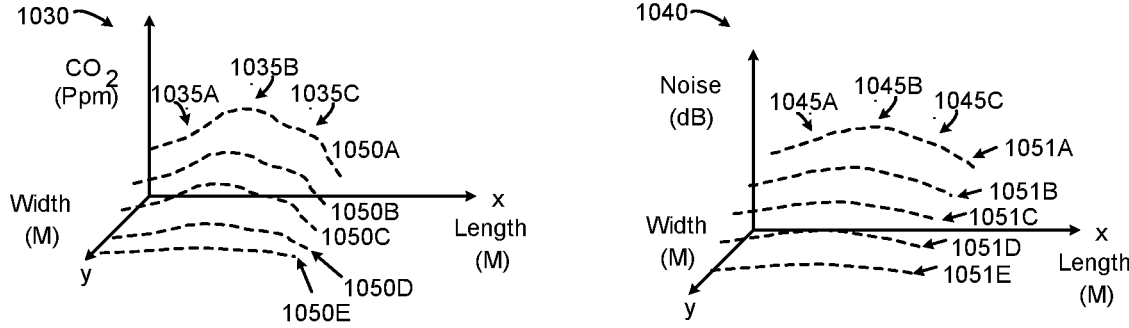
FIGURE 10

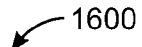
1600

| Attribute Description | Sensors | | | | | | |
|---|---|---|---|---|---|---|---|
| | Temperature | Relative Humidity | $CO_2$ | VOC | Lux | CCT | SPL |
| Occupancy status/number | | | X | | | | X |
| Loud/troublesome noises/lights | | | | | X | | X |
| Cleaning in progress | | | X | X | X | | X |
| Energy efficiency | X | X | | | X | X | |
| Comfort level | X | X | X | | X | | X |
| Inside air quality | | | X | X | | | |
| People movement | | | X | | X | | X |
| Restroom usage/space used | | | X | | X | | X |
| Maximum occupancy exceeded | | | X | | X | | X |
| Rapidly changing weather condition | | | | | | | X |
| Flight arrivals at airport gate | | | | X | | | X |

FIGURE 16

$$RH \propto \frac{1}{Temperature}$$

1900

|  | Temperature | Relative Humidity | CO₂ | VOC | Lux | CCT | SPL |
|---|---|---|---|---|---|---|---|
| Sensor response | 5 min | 5 min | 5 min | 5-10 min | 30 s | 30 s | 30 s |
| Natural state inputs (timescale) | 10 min − 1 hr | 10 min − 1 hr | 10 min − 1 hr | 30 min − 1 hr | 1 − 10 s | 1 − 10 s |  |
| Human activity inputs (timescale) | 1 − 5 min | 1 − 5 min | 1 − 5 min | 1 − 5 min | 1 − 5 s | 1 − 5 s | 1 − 5 s |

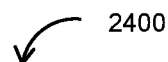

2400

Use a first sensor to measure a first attribute at a first sampling rate, the first sampling rate being faster than a second sampling rate of a second sensor configured to sense a second attribute

2410

Determine and/or predicting the second attribute at least in part by using measurements of the first attribute by the first sensor rather than measurements of the second sensor, the first sensor and the second sensor being of a facility

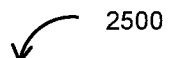
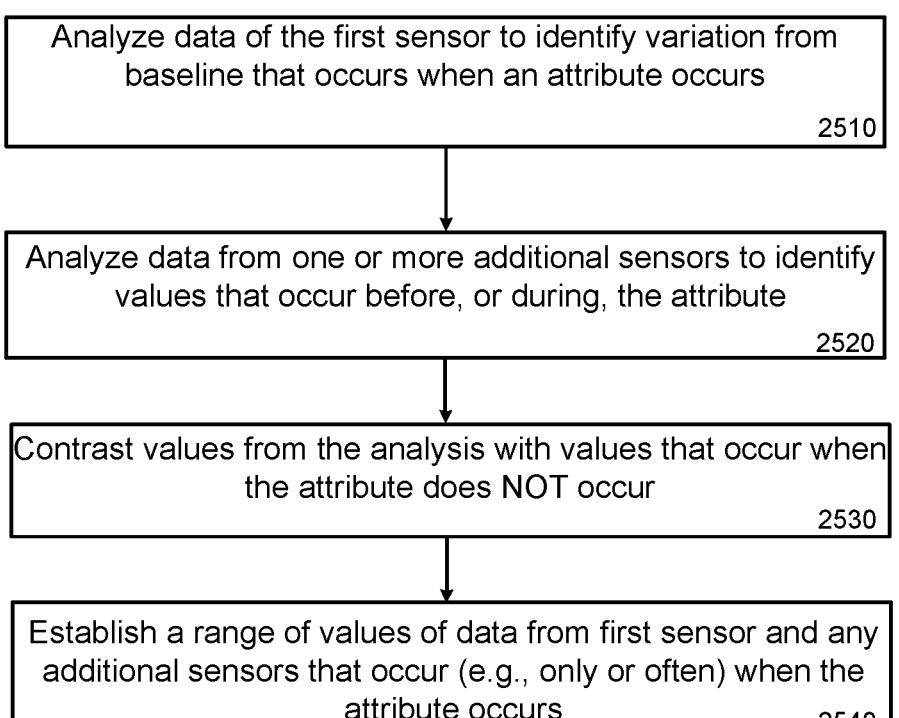
FIGURE 25

MULTI-SENSOR SYNERGY

RELATED APPLICATIONS

This application is a U.S. National Stage Patent Application which claims the benefit of International Application No. PCT/US2022/014135 filed Jan. 27, 2022, entitled "MULTI-SENSOR SYNERGY" which is a Continuation-in-Part of International Patent Application No. PCT/US2021/015378, filed Jan. 28, 2021, titled, "SENSOR CALIBRATION AND OPERATION," and further claims the benefit of U.S. Provisional Patent Application No. 63/263,806, filed Nov. 9, 2021, entitled "MULTI-SENSOR SYNERGY," International Patent Application No. PCT/US2021/015378, filed Jan. 28, 2021, titled, "SENSOR CALIBRATION AND OPERATION," is a Continuation-in-Part of U.S. patent application Ser. No. 17/083,128, filed Oct. 28, 2020, entitled "BUILDING NETWORK", and further claims benefit of U.S. Provisional Patent Application 62/967,204, filed Jan. 29, 2020, entitled "SENSOR CALIBRATION AND OPERATION", U.S. patent application Ser. No. 17/083,128, filed Oct. 28, 2020, entitled "BUILDING NETWORK" is a Continuation of U.S. patent application Ser. No. 16/664,089, filed Oct. 25, 2019, now U.S. Pat. No. 11,294,254, issued Apr. 5, 2022, entitled, "BUILDING NETWORK", which is a Continuation-in-Part of International Patent Application No. PCT/US2018/029460 filed Apr. 25, 2018, entitled "TINTABLE WINDOW SYSTEM FOR BUILDING SERVICES" and is also a Continuation-in-Part of International Patent Application No. PCT/US2019/030467 filed May 2, 2019, entitled, "EDGE NETWORK FOR BUILDING SERVICES", which claims benefit of U.S. Provisional Patent Application No. 62/666,033, filed May 2, 2018, entitled "EDGE NETWORK FOR BUILDING SERVICES" International Patent Application No. PCT/US/2019/030467 is a Continuation-in-Part of International Patent Application No. PCT/US2018/029460 filed Apr. 25, 2018, entitled "TINTABLE WINDOW SYSTEM FOR BUILDING SERVICES", which claims benefit of U.S. Provisional Patent Application No. 62/607,618, filed Dec. 19, 2017, entitled "ELECTROCHROMIC WINDOWS WITH TRANSPARENT DISPLAY TECHNOLOGY FIELD", and also claims benefit of U.S. Provisional Patent Application No. 62/523,606, filed Jun. 22, 2017, entitled "ELECTROCHROMIC WINDOWS WITH TRANSPARENT DISPLAY TECHNOLOGY", and also claims benefit of U.S. Provisional Patent Application No. 62/507,704, filed May 17, 2017, entitled "ELECTROCHROMIC WINDOWS WITH TRANSPARENT DISPLAY TECHNOLOGY", and also claims benefit of U.S. Provisional Patent Application No. 62/506,514, filed May 15, 2017, entitled "ELECTROCHROMIC WINDOWS WITH TRANSPARENT DISPLAY TECHNOLOGY", and also claims benefit of U.S. Provisional Patent Application 62/490,457, filed Apr. 26, 2017, entitled "ELECTROCHROMIC WINDOWS WITH TRANSPARENT DISPLAY TECHNOLOGY" all of which are assigned to the assignee hereof and incorporated by reference herein in their entirety.

BACKGROUND

A sensor may be configured (e.g., designed) to measure one or more environmental characteristics, for example, temperature, humidity, ambient noise, carbon dioxide, and/or other aspects of an ambient environment. Under typical operational conditions, the one or more environmental characteristics may have a natural state or operating range.

Various activities (e.g., automated and/or human activities) can disrupt this natural state or operating range, and environmental characteristics reflective of these activities may be measured by a sensor. Because different sensor types may be capable of measuring different environmental characteristics at different respective timescales, using sensor data from a single sensor type alone may have one or more shortcomings when determining an attribute (e.g., activity) of the environment based on the environmental characteristics, including being time-consuming and/or inaccurate.

SUMMARY

Various aspects disclosed herein alleviate at least part of the one or more shortcomings related to the use of sensors to determine an attribute of an environment.

Various aspects disclosed herein may relate to a plurality of sensors of a facility from which a first sensor measures a first attribute at its first sampling rate. Due to a correlation of the first sensor and a second sensor that measures a second attribute at a second sampling rate slower than the first sampling rate, the second attribute can be determined and/or predicted at least in part by using measurements of the first attribute by the first sensor.

In another aspect, a method of determining an attribute includes: using a first sensor to measure a first attribute at a first sampling rate, the first sampling rate being faster than a second sampling rate of a second sensor configured to sense a second attribute; and determining and/or predicting the second attribute at least in part by using measurements of the first attribute by the first sensor rather than measurements of the second sensor, the first sensor and the second sensor being of a facility. In some embodiments, the second attribute comprises an activity. In some embodiments, the activity comprises (i) cleaning of an enclosure, (ii) movement of one or more personnel in the enclosure, (iii) a change in an environmental condition, (iv) one or more personnel entering into the enclosure, (v) one or more personnel exiting the enclosure, (vi) activity in the enclosure, (vii) exceeding of a maximum occupancy of the enclosure, or (viii) an arrival of a vehicle at a transportation hub. In some embodiments, the enclosure comprises a building, room, or any other confined space. In some embodiments, the environmental condition comprises a weather condition, a sound level, an electromagnetic radiation level, an air quality level, a gas level, a particulate matter level, or a volatile organic compound level. In some embodiments, the transportation hub comprises an airport, a train station, a bus station, a tram stop, a ferry slip, a pilot station, a sailing station, or any other transit station; and optionally the other transit station comprises a rapid transition station. In some embodiments, the vehicle comprises an airplane, a train, a bus, a car, a subway car, a light rail car, a tram, a ferry, a boat, a ship, a helicopter, or a rocket; and optionally the car comprises a taxi car. In some embodiments, the second attribute comprises occupancy status of an enclosure, number of occupants in the enclosure, sound, electromagnetic radiation, an indicator of a level of comfort, an indicator of energy efficiency, air quality, temperature, gas, particulate matter, or volatile organic compounds. In some embodiments, the electromagnetic radiation comprises visible, infrared, ultrasound, or radio frequency radiation. In some embodiments, the second attribute that comprises gas comprises one or more of: gas type, velocity, and pressure. In some embodiments, the second attribute that comprises gas comprises one or more of: humidity, carbon dioxide, carbon monoxide, hydrogen sulfide, radon, nitrogen oxides, halogen, organic halogens, and formaldehyde. In some embodiments, the first sampling rate is at least about one order of magnitude faster than the second sampling rate. In some embodiments, the second sensor and the first sensor are disposed in the facility. In some embodiments, the first sensor and the second sensor are disposed in an enclosure of the facility. In some embodiments, the second attribute comprises temperature, sound, pressure, humidity, gas, particulate matter, volatile organic compound, or electromagnetic radiation. In some embodiments, the gas comprises carbon dioxide, carbon monoxide, radon, or hydrogen sulfide. In some embodiments, the second attribute is associated with an activity. In some embodiments, the activity comprises a human activity or a mechanical activity. In some embodiments, the first sensor is disposed in a housing enclosing another sensor, a transceiver, or an emitter. In some embodiments, the housing is disposed in a fixture of the facility, or is attached to a fixture of the facility. In some embodiments, the first sensor is utilized to control an environment of the facility. In some embodiments, the method includes using a third sensor to measure a third attribute at a third sampling rate, the third sampling rate being faster than the second sampling rate of the second sensor; and determining and/or predicting the second attribute at least in part by using measurements of (i) the first attribute by the first sensor and (ii) the third attribute by the third sensor, the third sensor being of a facility. In some embodiments, the first sensor and the third sensor are disposed in a housing. In some embodiments, the housing encloses another sensor, a transceiver, or an emitter. In some embodiments, the housing encloses at least two or seven different sensors. In some embodiments, the housing is disposed in a fixture of the facility, or is attached to a fixture of the facility. In some embodiments, synergistically and/or symbiotically evaluating measurements of the first sensor and measurements of the third sensor to determine and/or predict the second attribute. In some embodiments, the method includes using artificial intelligence to determine and/or predict the second attribute. In some embodiments, the artificial intelligence comprises machine learning. In some embodiments, the method includes using the first sensor to collect first sensed data during a period of time at the first sampling rate; using the third sensor to collect third sensed data during the period of time at the third sampling rate, wherein the third sensor comprises a different sensor type than the first sensor; obtaining data indicative of an occurrence of an activity during the period of time; responsive to obtaining the data indicative of the occurrence of the activity: (i) evaluating the first sensed data to determine a first correlation between the activity and a first range of values of the first sensed data, and (ii) evaluating the third sensed data to determine a second correlation between the activity and a third range of values of the third sensed data; determining a relationship between the activity, the first range of values, and the third range of values, wherein determining the relationship is based at least in part on the first correlation and the second correlation; and storing data indicative of the determined relationship. In some embodiments, (i) the first sensed data, (ii) the third sensed data, or both the first sensed data and the third sensed data, occur prior to and/or during the occurrence of the activity. In another aspect, a non-transitory computer readable program instructions for determining an attribute comprises the non-transitory computer readable program instructions, when read by one or more processors operatively coupled to a first sensor, causes the one or more processors to execute, or direct execution of, the method of any of the previously-described embodiments.

In another aspect, a non-transitory computer readable program instructions for determining an attribute includes: using, or directing use of, the first sensor to measure a first attribute at a first sampling rate, the first sampling rate being faster than a second sampling rate of a second sensor configured to sense a second attribute; and (i) determining or directing determination of, and/or (ii) prediction or directing prediction of: the second attribute at least in part by using measurements of the first attribute by the first sensor rather than measurements of the second sensor, the first sensor and the second sensor being of a facility. In some embodiments, the one or more processors comprises a hierarchical system of processors having at least three levels of hierarchy. In some embodiments, the one or more processors comprises a processor disposed in a device ensemble having a housing enclosing at least one sensor. In some embodiments, the device ensemble comprises another sensor, an emitter, or a transceiver. In some embodiments, the processor comprises a graphic processing unit. In some embodiments, the operations comprise utilizing, or directing utilization of, an artificial intelligence computational scheme for prediction of the second attribute. In some embodiments, the one or more processors comprises a processor disposed in, or attached to, a fixture of the facility. In some embodiments, the one or more processors comprises a processor disposed externally to the facility. In some embodiments, externally to the facility comprises a cloud server. In some embodiments, operations comprise remotely updating, or directing remote update, from a source external to the facility. In another aspect, an apparatus for determining an attribute comprises at least one controller, which at least one controller is configured to (a) operatively couple to the first sensor, and (b) execute, or direct execution of, the method of any of the previously-described embodiments.

In another aspect, an apparatus for determining an attribute includes at least one controller, which at least one controller is configured to: operatively couple to a first sensor; use, or direct use of, the first sensor to measure a first attribute at a first sampling rate, the first sampling rate being faster than a second sampling rate of a second sensor configured to sense a second attribute; and (i) determine or direct determination of, and/or (ii) predict or direct prediction of: the second attribute at least in part by using measurements of the first attribute by the first sensor rather than measurements of the second sensor, the first sensor and the second sensor being of a facility. In some embodiments, the at least one controller comprises a hierarchical control system having at least three levels of hierarchy. In some embodiments, the at least one controller comprises a controller disposed in a device ensemble having a housing enclosing at least one sensor. In some embodiments, the device ensemble comprises another sensor, an emitter, or a transceiver. In some embodiments, the at least one controller comprises a microcontroller. In some embodiments, the at least one controller is configured to utilize, or direct utilization of, artificial intelligence for predictive control. In some embodiments, the at least one controller comprises a controller disposed in, or attached to, a fixture of the facility. In another aspect, a system for determining an attribute comprises a network configured to operatively coupled to the first sensor, and transmit one or more signals facilitating the method of any of the previously-described embodiments.

In another aspect, a system for determining an attribute includes: a network configured to: operatively couple to a first sensor; transmit measurement data of a first attribute measured using the first sensor at a first sampling rate, the first sampling rate being faster than a second sampling rate of a second sensor configured to sense a second attribute; and transmit a determination and/or prediction of the second attribute, wherein the determination and/or prediction of the second attribute uses measurements of the first attribute by the first sensor rather than measurements of the second sensor, the first sensor and the second sensor being of a facility. In some embodiments, the network is configured to transmit communication and power on a single cable. In some embodiments, the network is configured to transmit communication protocols, at least two of the communication protocols are different. In some embodiments, the communication protocols comprise at least a fourth generation, or a fifth generation cellular communication protocol. In some embodiments, the communication protocols facilitate cellular, media, control, security, and/or other data communication. In some embodiments, the communication protocols comprise a control protocol that comprises building automation control protocol. In some embodiments, the network is configured to operatively coupled to one or more antennas, and optionally the one or more antennas comprise a distributed antenna system. In some embodiments, the network is configured to facilitate remote software update from a source external to the facility. In another aspect, an apparatus for determining an attribute comprises: a device ensemble disposed in a housing, the device ensemble comprising the first sensor, the device ensemble configured to execute, or facilitate execution of, the method of any of the previously-described embodiments.

In another aspect, an apparatus for determining an attribute includes: a device ensemble disposed in a housing, the device ensemble comprising at least a first sensor, the device ensemble configured to (i) measure a first attribute by the first sensor at a first sampling rate, the first sampling rate being faster than a second sampling rate of a second sensor configured to sense a second attribute, and (ii) facilitate determination and/or prediction of the second attribute, wherein the determination and/or prediction of the second attribute uses measurements of the first attribute by the first sensor rather than measurements of the second sensor, the first sensor and the second sensor being of a facility. In some embodiments, the device ensemble is configured to facilitate the determination and/or prediction at least in part by being configured to operatively couple to a power and/or communication network. In some embodiments, the device ensemble comprises communication and/or power port. In some embodiments, the device ensemble comprises at least one processor and/or at least one memory. In some embodiments, the device ensemble comprises at least one printed circuit boards having devices operatively coupled at both sides of the at least one printed circuit board. In some embodiments, the housing comprises at least one hole that facilitates measuring the first attribute. In some embodiments, the device ensemble comprises a radio transceiver or an accelerometer. In some embodiments, the radio transceiver is configured to measure ultrawide bandwidth radiation. In some embodiments, the device ensemble comprises two printed circuit boards that are separate from each other. In some embodiments, the non-transitory computer program product comprises at least one medium (e.g., non-transitory computer readable medium).

In another aspect, the present disclosure provides systems, apparatuses (e.g., controllers), and/or non-transitory computer-readable medium (e.g., software) that implement any of the methods disclosed herein.

In another aspect, the present disclosure provides methods that use any of the systems, computer readable media, and/or apparatuses disclosed herein, e.g., for their intended purpose.

In another aspect, an apparatus comprises at least one controller that is programmed to direct a mechanism used to implement (e.g., effectuate) any of the method disclosed herein, which at least one controller is configured to operatively couple to the mechanism. In some embodiments, at least two operations (e.g., of the method) are directed/executed by the same controller. In some embodiments, at less at two operations are directed/executed by different controllers.

In another aspect, an apparatus comprises at least one controller that is configured (e.g., programmed) to implement (e.g., effectuate) any of the methods disclosed herein. The at least one controller may implement any of the methods disclosed herein. In some embodiments, at least two operations (e.g., of the method) are directed/executed by the same controller. In some embodiments, at less at two operations are directed/executed by different controllers.

In another aspect, a system comprises at least one controller that is programmed to direct operation of at least one another apparatus (or component thereof), and the apparatus (or component thereof), wherein the at least one controller is operatively coupled to the apparatus (or to the component thereof). The apparatus (or component thereof) may include any apparatus (or component thereof) disclosed herein. The at least one controller may be configured to direct any apparatus (or component thereof) disclosed herein. The at least one controller may be configured to operatively couple to any apparatus (or component thereof) disclosed herein. In some embodiments, at least two operations (e.g., of the apparatus) are directed by the same controller. In some embodiments, at less at two operations are directed by different controllers.

In another aspect, a computer software product, comprising a non-transitory computer-readable medium in which program instructions are stored, which instructions, when read by at least one processor (e.g., computer), cause the at least one processor to direct a mechanism disclosed herein to implement (e.g., effectuate) any of the method disclosed herein, wherein the at least one processor is configured to operatively couple to the mechanism. The mechanism can comprise any apparatus (or any component thereof) disclosed herein. In some embodiments, at least two operations (e.g., of the apparatus) are directed/executed by the same processor. In some embodiments, at less at two operations are directed/executed by different processors.

In another aspect, the present disclosure provides a non-transitory computer-readable medium comprising machine-executable code that, upon execution by one or more processors, implements any of the methods disclosed herein. In some embodiments, at least two operations (e.g., of the method) are directed/executed by the same processor. In some embodiments, at less at two operations are directed/executed by different processors.

In another aspect, the present disclosure provides a non-transitory computer-readable medium comprising machine-executable code that, upon execution by one or more processors, effectuates directions of the controller(s) (e.g., as disclosed herein). In some embodiments, at least two operations (e.g., of the controller) are directed/executed by the same processor. In some embodiments, at less at two operations are directed/executed by different processors.

In another aspect, the present disclosure provides a computer system comprising one or more computer processors and a non-transitory computer-readable medium coupled thereto. The non-transitory computer-readable medium comprises machine-executable code that, upon execution by the one or more processors, implements any of the methods disclosed herein and/or effectuates directions of the controller(s) disclosed herein.

The content of this summary section is provided as a simplified introduction to the disclosure and is not intended to be used to limit the scope of any invention disclosed herein or the scope of the appended claims.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

These and other features and embodiments will be described in more detail with reference to the drawings.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "Fig." and "Figs." herein), of which:

FIG. 6 schematically depicts a controller;

FIG. 7 shows a schematic flow chart;

FIG. 8 shows a schematic flow chart;

FIG. 9 shows a schematic example of sensor arrangement and sensor data;

FIG. 10 shows a schematic example of sensor arrangement and sensor data;

FIG. 16 shows a table providing example attributes that may be detected using sensor synergy;

FIG. 24 shows a flowchart of a method for determining an attribute, according to an embodiment;

FIG. 25 shows a flowchart of a method for establishing a relationship between an attribute values of sensor data from first and second sensors, according to an embodiment.

Figure 1:
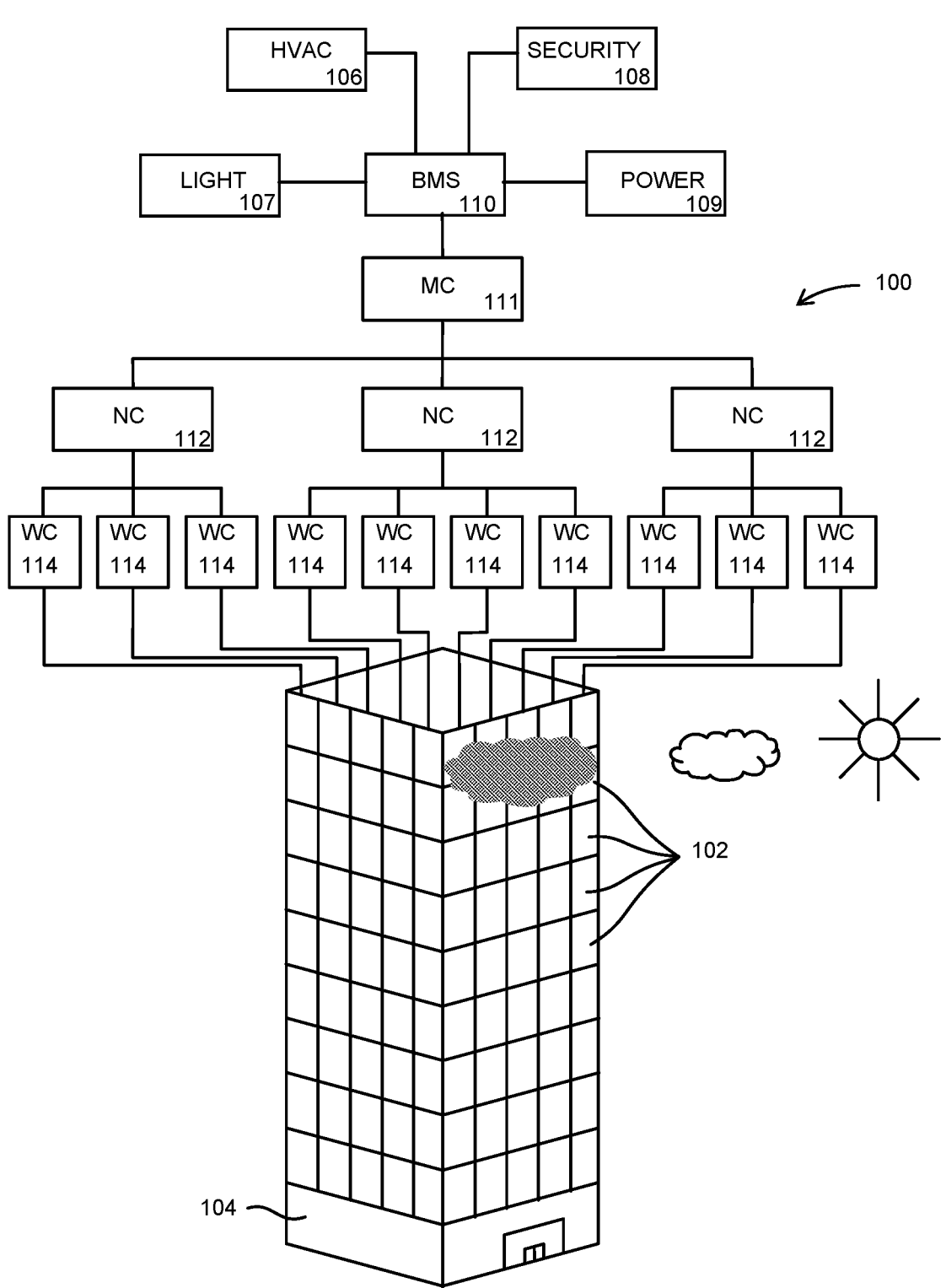
FIG. 1 shows a depiction of an example system that may perform multi-sensor synergy as described herein.

The figures and components therein may not be drawn to scale. Various components of the figures described herein may not be drawn to scale.

DETAILED DESCRIPTION

While various embodiments of the invention have been shown, and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein might be employed.

Terms such as "a," "an," and "the" are not intended to refer to only a singular entity but include the general class of which a specific example may be used for illustration. The terminology herein is used to describe specific embodiments of the invention(s), but their usage does not delimit the invention(s).

When ranges are mentioned, the ranges are meant to be inclusive, unless otherwise specified. For example, a range between value 1 and value 2 is meant to be inclusive and include value 1 and value 2. The inclusive range will span any value from about value 1 to about value 2. The term "adjacent" or "adjacent to," as used herein, includes "next to," "adjoining," "in contact with," and "in proximity to."

The term "operatively coupled" or "operatively connected" refers to a first element (e.g., mechanism) that is coupled (e.g., connected) to a second element, to allow the intended operation of the second and/or first element. The coupling may comprise physical or non-physical coupling. The non-physical coupling may comprise signal-induced coupling (e.g., wireless coupling). Coupled can include physical coupling (e.g., physically connected), or non-physical coupling (e.g., via wireless communication).

An element (e.g., mechanism) that is "configured to" perform a function includes a structural feature that causes the element to perform this function. A structural feature may include an electrical feature, such as a circuitry or a circuit element. A structural feature may include an actuator. A structural feature may include a circuitry (e.g., comprising electrical or optical circuitry). Electrical circuitry may comprise one or more wires. Optical circuitry may comprise at least one optical element (e.g., beam splitter, mirror, lens and/or optical fiber). A structural feature may include a mechanical feature. A mechanical feature may comprise a latch, a spring, a closure, a hinge, a chassis, a support, a fastener, or a cantilever, and so forth. Performing the function may comprise utilizing a logical feature. A logical feature may include programming instructions. Programming instructions may be executable by at least one processor. Programming instructions may be stored or encoded on a medium accessible by one or more processors. Additionally, in the following description, the phrases "operable to," "adapted to," "configured to," "designed to," "programmed to," or "capable of" may be used interchangeably where appropriate.

In some embodiments, an enclosure comprises an area defined by at least one structure. The at least one structure may comprise at least one wall. An enclosure may comprise and/or enclose one or more sub-enclosure. The at least one wall may comprise metal (e.g., steel), clay, stone, plastic, glass, plaster (e.g., gypsum), polymer (e.g., polyurethane, styrene, or vinyl), asbestos, fiber-glass, concrete (e.g., reinforced concrete), wood, paper, or a ceramic. The at least one wall may comprise wire, bricks, blocks (e.g., cinder blocks), tile, drywall, or frame (e.g., steel frame).

In some embodiments, the enclosure comprises one or more openings. The one or more openings may be reversibly closable. The one or more openings may be permanently open. A fundamental length scale of the one or more openings may be smaller relative to the fundamental length scale of the wall(s) that define the enclosure. A fundamental length scale may comprise a diameter of a bounding circle, a length, a width, or a height. A surface of the one or more openings may be smaller relative to the surface the wall(s) that define the enclosure. The opening surface may be a percentage of the total surface of the wall(s). For example, the opening surface can measure about 30%, 20%, 10%, 5%, or 1% of the walls(s). The wall(s) may comprise a floor, a ceiling or a side wall. The closable opening may be closed by at least one window or door. The enclosure may be at least a portion of a facility. The enclosure may comprise at least a portion of a building. The building may be a private building and/or a commercial building. The building may comprise one or more floors. The building (e.g., floor thereof) may include at least one of: a room, hall, foyer, attic, basement, balcony (e.g., inner or outer balcony), stairwell, corridor, elevator shaft, façade, mezzanine, penthouse, garage, porch (e.g., enclosed porch), terrace (e.g., enclosed terrace), cafeteria, and/or Duct. In some embodiments, an enclosure may be stationary and/or movable (e.g., a train, a plane, a ship, a vehicle, or a rocket).

In some embodiments, a plurality of devices may be operatively (e.g., communicatively) coupled to the control system. The devices may include a sensor, emitter, transceiver, antenna, radar, media display construct, processor, and/or controller. The display (e.g., display matrix) may comprise a light emitting diode (LED). The LED may comprise an organic material (e.g., organic light emitting diode abbreviated herein as "OLED"). The OLED may comprise a transparent organic light emitting diode display (abbreviated herein as "TOLED"), which TOLED is at least partially transparent. The plurality of devices may be disposed in a facility (e.g., including a building and/or room). The control system may comprise the hierarchy of controllers. The devices may comprise an emitter, a sensor, or a window (e.g., IGU). The device may be any device as disclosed herein. At least two of the plurality of devices may be of the same type. For example, two or more IGUs may be coupled to the control system. At least two of the plurality of devices may be of different types. For example, a sensor and an emitter may be coupled to the control system. At times the plurality of devices may comprise at least 20, 50, 100, 500, 1000, 2500, 5000, 7500, 10000, 50000, 100000, or 500000 devices. The plurality of devices may be of any number between the aforementioned numbers (e.g., from 20 devices to 500000 devices, from 20 devices to 50 devices, from 50 devices to 500 devices, from 500 devices to 2500 devices, from 1000 devices to 5000 devices, from 5000 devices to 10000 devices, from 10000 devices to 100000 devices, or from 100000 devices to 500000 devices). For example, the number of windows in a floor may be at least 5, 10, 15, 20, 25, 30, 40, or 50. The number of windows in a floor can be any number between the aforementioned numbers (e.g., from 5 to 50, from 5 to 25, or from 25 to 50). At times the devices may be in a multi-story building. At least a portion of the floors of the multi-story building may have devices controlled by the control system (e.g., at least a portion of the floors of the multi-story building may be controlled by the control system). For example, the multi-story building may have at least 2, 8, 10, 25, 50, 80, 100, 120, 140, or 160 floors that are controlled by the control system. The number of floors (e.g., devices therein) controlled by the control system may be any number between the aforementioned numbers (e.g., from 2 to 50, from 25 to 100, or from 80 to 160). The floor may be of an area of at least about 150 m$^2$, 250 m$^2$, 500 m$^2$, 1000 m$^2$, 1500 m$^2$, or 2000 square meters (m$^2$). The floor may have an area between any of the aforementioned floor area values (e.g., from about 150 m$^2$ to about 2000 m$^2$, from about 150 m$^2$ to about 500 m$^2$, from about 250 m$^2$ to about 1000 m$^2$, or from about 1000 m$^2$ to about 2000 m$^2$). The facility may comprise a commercial or a residential building. The residential facility may comprise a multi or a single family building.

In some embodiments, the device may comprise a display construct (e.g., an TOLED display construct). The display may have at its fundamental length scale 2000, 3000, 4000, 5000, 6000, 7000, or 8000 pixels. The display may have at its fundamental length scale any number of pixels between the aforementioned number of pixels (e.g., from about 2000 pixels to about 4000 pixels, from about 4000 pixels to about 8000 pixels, or from about 2000 pixels to about 8000 pixels). A fundamental length scale may comprise a diameter of a bounding circle, a length, a width, or a height. The fundamental length scale may be abbreviated herein as "FLS." The display construct may comprise a high resolution display. For example, the display construct may have a resolution of at least about 550, 576, 680, 720, 768, 1024, 1080, 1920, 1280, 2160, 3840, 4096, 4320, or 7680 pixels, by at least about 550, 576, 680, 720, 768, 1024, 1080, 1280, 1920, 2160, 3840, 4096, 4320, or 7680 pixels (at 30 Hz or at 60 Hz). The first number of pixels may designate the height of the display and the second pixels may designates the length of the display. For example, the display may be a high resolution display having a resolution of 1920×1080, 3840× 2160, 4096×2160, or 7680×4320. The display may be a standard definition display, enhanced definition display, high definition display, or an ultra-high definition display. The display may be rectangular. The image projected by the display matrix may be refreshed at a frequency (e.g., at a refresh rate) of at least about 20 Hz, 30 Hz, 60 Hz, 70 Hz, 75 Hz, 80 Hz, 100 Hz, or 120 Hertz (Hz). The FLS of the display construct may be at least 20", 25", 30", 35", 40", 45", 50", 55", 60", 65", 80", or 90 inches ("). The FLS of the display construct can be of any value between the aforementioned values (e.g., from about 20" to about 55", from about 55" to about 100", or from about 20" to about 100"). The display construct may be operatively (e.g., physically) coupled to a tintable window. The display construct may operate in tandem with the display construct. Examples of display constructs, tintable windows, their operation, control, and any related software may be found in U.S. Provisional Patent Application Ser. No. 63/085,254 filed Sep. 30, 2020, titled "TANDEM VISION WINDOW AND MEDIA DISPLAY," which is incorporated herein by reference in its entirety.

In some embodiments, the enclosure encloses an atmosphere. The atmosphere may comprise one or more gases. The gases may include inert gases (e.g., argon or nitrogen) and/or non-inert gases (e.g., oxygen or carbon dioxide). The enclosure atmosphere may resemble an atmosphere external to the enclosure (e.g., ambient atmosphere) in at least one external atmosphere characteristic that includes: temperature, relative gas content, gas type (e.g., humidity, and/or oxygen level), debris (e.g., dust and/or pollen), and/or gas velocity. The enclosure atmosphere may be different from the atmosphere external to the enclosure in at least one external atmosphere characteristic that includes: temperature, relative gas content, gas type (e.g., humidity, and/or oxygen level), debris (e.g., dust and/or pollen), and/or gas velocity. For example, the enclosure atmosphere may be less humid (e.g., drier) than the external (e.g., ambient) atmosphere. For example, the enclosure atmosphere may contain the same (e.g., or a substantially similar) oxygen-to-nitrogen ratio as the atmosphere external to the enclosure. The velocity of the gas in the enclosure may be (e.g., substantially) similar throughout the enclosure. The velocity of the gas in the enclosure may be different in different portions of the enclosure (e.g., by flowing gas through to a vent that is coupled with the enclosure).

Certain disclosed embodiments provide a network infrastructure in the enclosure (e.g., a facility such as a building). The network infrastructure is available for various purposes such as for providing communication and/or power services. The communication services may comprise high bandwidth (e.g., wireless and/or wired) communications services. The communication services can be to occupants of a facility and/or users outside the facility (e.g., building). The network infrastructure may work in concert with, or as a partial replacement of, the infrastructure of one or more cellular carriers. The network infrastructure can be provided in a facility that includes electrically switchable windows. Examples of components of the network infrastructure include a high speed backhaul. The network infrastructure may include at least one cable, switch, physical antenna, transceivers, sensor, transmitter, receiver, radio, processor and/or controller (that may comprise a processor). The network infrastructure may be operatively coupled to, and/or include, a wireless network. The network infrastructure may comprise wiring. One or more sensors can be deployed (e.g., installed) in an environment as part of installing the network and/or after installing the network. The network may be configured for transmission of a plurality of communication types and power on the same cable. The communication types may comprise data. The communication types may comprise cellular communication (e.g., conforming to at least a third (3G), fourth (4G), or fifth (5G) generation cellular communication). The communication type may comprise BACnet (building automation and control networks) protocol communication. The communication type may comprise media streaming. The media streaming may support HDMI, Digital Visual Interface (DVI), DisplayPort (DP) and/or Serial digital interface (SDI). The streaming may be of compressed or uncompressed (e.g., Moving Picture Experts Group (MPEG) or Advanced Video Coding (AVC, a.k.a., H.264)) digital media streams.

FIG. 1 shows a depiction of an example system 100 for controlling and driving a plurality of electrochromic windows 102. It may also be employed to control the operation of one or more window antennas as described elsewhere herein. The system 100 can be adapted for use with a building 104 such as a commercial office building or a residential building. In some implementations, the system 100 is designed to function in conjunction with modern heating, ventilation, and air conditioning (HVAC) systems 106, interior lighting systems 107, security systems 108 and power systems 109 as a single holistic and efficient energy control system for the entire building 104, or a campus of buildings 104. Some implementations of the system 100 are particularly well-suited for integration with a building management system (BMS) 110. The BMS 110 is a computer-based control system that can be installed in a building to monitor and control the building's mechanical and electrical equipment such as HVAC systems, lighting systems, power systems, elevators, fire systems, and security systems. The BMS 110 can include hardware and associated firmware or software for maintaining conditions in the building 104 according to preferences set by the occupants or by a building manager or other administrator. The software can be based on, for example, internet protocols or open standards.

A BMS can typically be used in large buildings where it functions to control the environment within the building. For example, the BMS 110 can control lighting, temperature, carbon dioxide levels, and humidity within the building 104. There can be numerous mechanical or electrical devices that are controlled by the BMS 110 including, for example, furnaces or other heaters, air conditioners, blowers, and vents. To control the building environment, the BMS 110 can turn on and off these various devices according to rules or in response to conditions. Such rules and conditions can be selected or specified by a building manager or administrator, for example. One primary function of the BMS 110 is to maintain a comfortable environment for the occupants of the building 104 while minimizing heating and cooling energy losses and costs. In some implementations, the BMS 110 can be configured not only to monitor and control, but also to optimize the synergy between various systems, for example, to conserve energy and lower building operation costs.

Some implementations are alternatively or additionally designed to function responsively or reactively based on feedback sensed through, for example, thermal, optical, or other sensors or through input from, for example, an HVAC or interior lighting system, or an input from a user control. Further information may be found in U.S. Pat. No. 8,705, 162, issued Apr. 22, 2014, which is incorporated herein by reference in its entirety. Some implementations also can be utilized in existing structures, including both commercial and residential structures, having traditional or conventional HVAC or interior lighting systems. Some implementations also can be retrofitted for use in older residential homes.

The system 100 includes a network controller 112 configured to control a plurality of window controllers 114. For example, the network controller 112 can control tens, hundreds, or even thousands of window controllers 114. Each window controller 114, in turn, can control and drive one or more electrochromic windows 102. In some implementations, the network controller 112 issues high level instructions such as the final tint state of an electrochromic window and the window controllers receive these commands and directly control their windows by applying electrical stimuli to appropriately drive tint state transitions and/or maintain tint states. The number and size of the electrochromic windows 102 that each window controller 114 can drive is generally limited by the voltage and current characteristics of the load on the window controller 114 controlling the respective electrochromic windows 102. In some implementations, the maximum window size that each window controller 114 can drive is limited by the voltage, current, or power requirements to cause the desired optical transitions in the electrochromic window 102 within a desired timeframe. Such requirements are, in turn, a function of the surface area of the window. In some implementations, this relationship is nonlinear. For example, the voltage, current, or power requirements can increase nonlinearly with the surface area of the electrochromic window 102. For example, in some cases the relationship is nonlinear at least in part because the sheet resistance of the first and second conductive layers (see, for example, FIG. 3) may increase nonlinearly with distance across the length and width of the first or second conductive layers. In some implementations, the relationship between the voltage, current, or power requirements required to drive multiple electrochromic windows 102 of equal size and shape is, however, directly proportional to the number of the electrochromic windows 102 being driven.

In some embodiments, the sensor(s) are operatively coupled to at least one controller and/or processor. Sensor readings may be obtained by one or more processors and/or controllers. A controller may comprise a processing unit (e.g., CPU or GPU). A controller may receive an input (e.g., from at least one sensor). The controller may comprise circuitry, electrical wiring, optical wiring, socket, and/or outlet. A controller may deliver an output. A controller may comprise multiple (e.g., sub-) controllers. The controller may be a part of a control system. A control system may comprise a master controller, floor (e.g., comprising network controller) controller, a local controller. The local controller may be a window controller (e.g., controlling an optically switchable window), enclosure controller, or component controller. For example, a controller may be a part of a hierarchal control system (e.g., comprising a main controller that directs one or more controllers, e.g., floor controllers, local controllers (e.g., window controllers), enclosure controllers, and/or component controllers). A physical location of the controller type in the hierarchal control system may be changing. For example: At a first time: a first processor may assume a role of a main controller, a second processor may assume a role of a floor controller, and a third processor may assume the role of a local controller. At a second time: the second processor may assume a role of a main controller, the first processor may assume a role of a floor controller, and the third processor may remain with the role of a local controller. At a third time: the third processor may assume a role of a main controller, the second processor may assume a role of a floor controller, and the first processor may assume the role of a local controller. A controller may control one or more devices (e.g., be directly coupled to the devices). A controller may be disposed proximal to the one or more devices it is controlling. For example, a controller may control an optically switchable device (e.g., IGU), an antenna, a sensor, and/or an output device (e.g., a light source, sounds source, smell source, gas source, HVAC outlet, or heater). In one embodiment, a floor controller may direct one or more window controllers, one or more enclosure controllers, one or more component controllers, or any combination thereof. The floor controller may comprise a floor controller. For example, the floor (e.g., comprising network) controller may control a plurality of local (e.g., comprising window) controllers. A plurality of local controllers may be disposed in a portion of a facility (e.g., in a portion of a building). The portion of the facility may be a floor of a facility. For example, a floor controller may be assigned to a floor. In some embodiments, a floor may comprise a plurality of floor controllers, e.g., depending on the floor size and/or the number of local controllers coupled to the floor controller. For example, a floor controller may be assigned to a portion of a floor. For example, a floor controller may be assigned to a portion of the local controllers disposed in the facility. For example, a floor controller may be assigned to a portion of the floors of a facility. A master controller may be coupled to one or more floor controllers. The floor controller may be disposed in the facility. The master controller may be disposed in the facility, or external to the facility. The master controller may be disposed in the cloud. A controller may be a part of, or be operatively coupled to, a building management system. A controller may receive one or more inputs. A controller may generate one or more outputs. The controller may be a single input single output controller (SISO) or a multiple input multiple output controller (MIMO). A controller may interpret an input signal received. A controller may acquire data from the one or more components (e.g., sensors). Acquire may comprise receive or extract. The data may comprise measurement, estimation, determination, generation, or any combination thereof. A controller may comprise feedback control. A controller may comprise feed-forward control. Control may comprise on-off control, proportional control, proportional-integral (PI) control, or proportional-integral-derivative (PID) control. Control may comprise open loop control, or closed loop control. A controller may comprise closed loop control. A controller may comprise open loop control. A controller may comprise a user interface. A user interface may comprise (or operatively coupled to) a keyboard, keypad, mouse, touch screen, microphone, speech recognition package, camera, imaging system, or any combination thereof. Outputs may include a display (e.g., screen), speaker, or printer.

Figure 2:
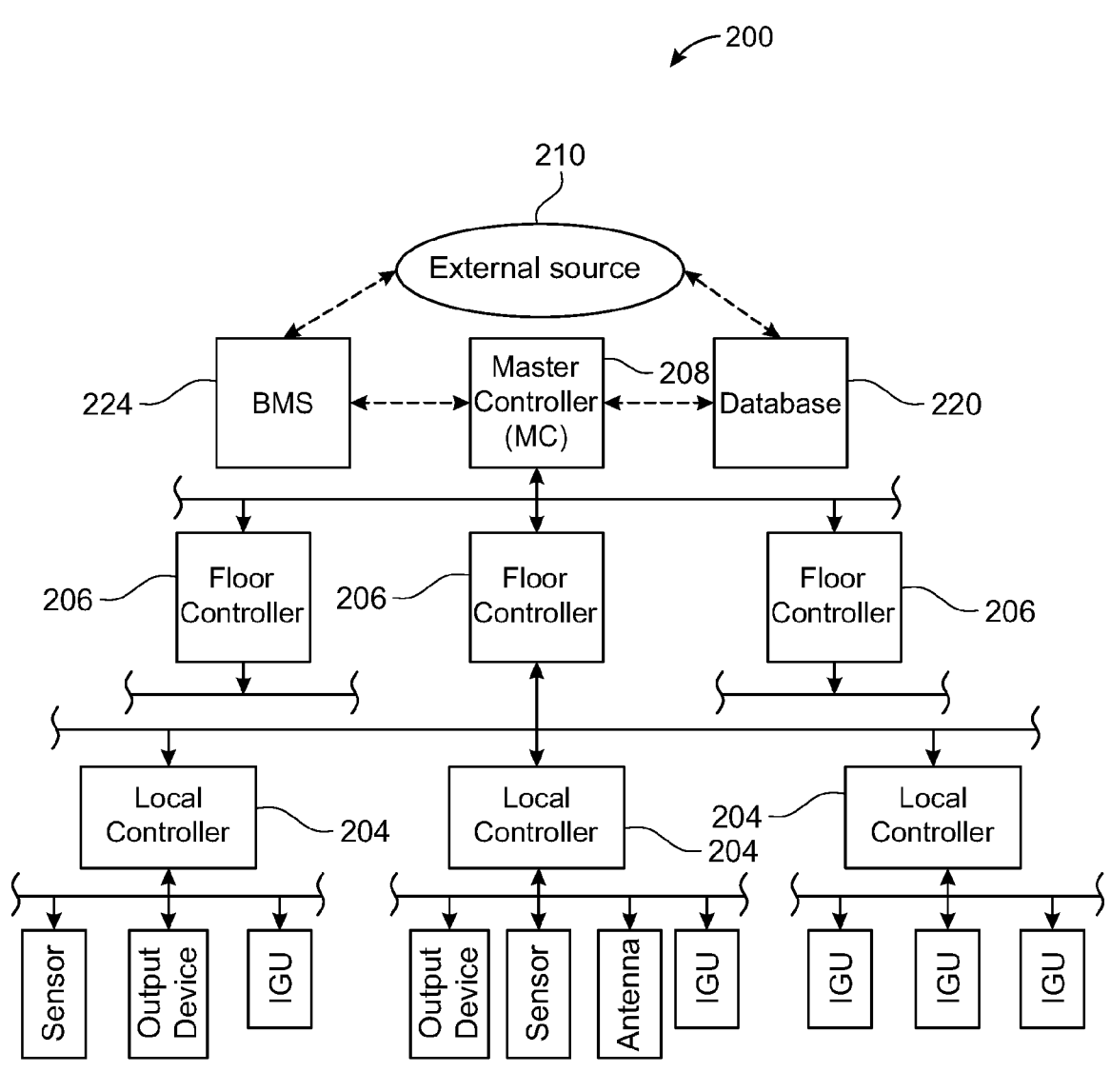
FIG. 2 shows a control system and its various components.

FIG. 2 shows an example of a control system architecture 200 comprising a master controller 208 that controls floor controllers 206, that in turn control local controllers 204. In some embodiments, a local controller controls one or more IGUs, one or more sensors, one or more output devices (e.g., one or more emitters), or any combination thereof. FIG. 2 shows an example of a configuration in which the master controller is operatively coupled (e.g., wirelessly and/or wired) to a building management system (BMS) 224 and to a database 220. Arrows in FIG. 2 represents communication pathways. A controller may be operatively coupled (e.g., directly/indirectly and/or wired and/wirelessly) to an external source 210. The external source may comprise a network. The external source may comprise one or more sensor or output device. The external source may comprise a cloud-based application and/or database. The communication may be wired and/or wireless. The external source may be disposed external to the facility. For example, the external source may comprise one or more sensors and/or antennas disposed, e.g., on a wall or on a ceiling of the facility. The communication may be monodirectional or bidirectional. In the example shown in FIG. 2, the communication all communication arrows are meant to be bidirectional.

In various embodiments, a network infrastructure supports a control system for one or more windows such as tintable (e.g., electrochromic) windows. The control system may comprise one or more controllers operatively coupled (e.g., directly or indirectly) to one or more windows. While the disclosed embodiments describe tintable windows (also referred to herein as "optically switchable windows," or "smart windows") such as electrochromic windows, the concepts disclosed herein may apply to other types of switchable optical devices comprising a liquid crystal device, an electrochromic device, suspended particle device (SPD), NanoChromics display (NCD), Organic electroluminescent display (OELD), suspended particle device (SPD), NanoChromics display (NCD), or an Organic electroluminescent display (OELD). The display element may be attached to a part of a transparent body (such as the windows). The tintable window may be disposed in a (non-transitory) facility such as a building, and/or in a transitory facility (e.g., vehicle) such as a car, RV, bus, train, airplane, helicopter, ship, or boat.

In some embodiments, a tintable window exhibits a (e.g., controllable and/or reversible) change in at least one optical property of the window, e.g., when a stimulus is applied. The change may be a continuous change. A change may be to discrete tint levels (e.g., to at least about 2, 4, 8, 16, or 32 tint levels). The optical property may comprise hue, or transmissivity. The hue may comprise color. The transmissivity may be of one or more wavelengths. The wavelengths may comprise ultraviolet, visible, or infrared wavelengths. The stimulus can include an optical, electrical and/or magnetic stimulus. For example, the stimulus can include an applied voltage and/or current. One or more tintable windows can be used to control lighting and/or glare conditions, e.g., by regulating the transmission of solar energy propagating through them. One or more tintable windows can be used to control a temperature within a building, e.g., by regulating the transmission of solar energy propagating through the window. Control of the solar energy may control heat load imposed on the interior of the facility (e.g., building). The control may be manual and/or automatic. The control may be used for maintaining one or more requested (e.g., environmental) conditions, e.g., occupant comfort. The control may include reducing energy consumption of a heating, ventilation, air conditioning and/or lighting systems. At least two of heating, ventilation, and air conditioning may be induced by separate systems. At least two of heating, ventilation, and air conditioning may be induced by one system. The heating, ventilation, and air conditioning may be induced by a single system (abbreviated herein as "HVAC). In some cases, tintable windows may be responsive to (e.g., and communicatively coupled to) one or more environmental sensors and/or user control. Tintable windows may comprise (e.g., may be) electrochromic windows. The windows may be located in the range from the interior to the exterior of a structure (e.g., facility, e.g., building). However, this need not be the case. Tintable windows may operate using liquid crystal devices, suspended particle devices, microelectromechanical systems (MEMS) devices (such as microshutters), or any technology known now, or later developed, that is configured to control light transmission through a window. Windows (e.g., with MEMS devices for tinting) are described in U.S. patent application Ser. No. 14/443,353, filed May 15, 2015, now U.S. Pat. No. 10,359, 681, issued Jul. 23, 2019, titled, "MULTI-PANE WINDOWS INCLUDING ELECTROCHROMIC DEVICES AND ELECTROMECHANICAL SYSTEMS DEVICES," which is incorporated herein by reference in its entirety. In some cases, one or more tintable windows can be located within the interior of a building, e.g., between a conference room and a hallway. In some cases, one or more tintable windows can be used in automobiles, trains, aircraft, and other vehicles, e.g., in lieu of a passive and/or non-tinting window.

In some embodiments, the tintable window comprises an electrochromic device (referred to herein as an "EC device" (abbreviated herein as ECD), or "EC"). An EC device may comprise at least one coating that includes at least one layer. The at least one layer can comprise an electrochromic material. In some embodiments, the electrochromic material exhibits a change from one optical state to another, e.g., when an electric potential is applied across the EC device. The transition of the electrochromic layer from one optical state to another optical state can be caused, e.g., by reversible, semi-reversible, or irreversible ion insertion into the electrochromic material (e.g., by way of intercalation) and a corresponding injection of charge-balancing electrons. For example, the transition of the electrochromic layer from one optical state to another optical state can be caused, e.g., by a reversible ion insertion into the electrochromic material (e.g., by way of intercalation) and a corresponding injection of charge-balancing electrons. Reversible may be for the expected lifetime of the ECD. Semi-reversible refers to a measurable (e.g. noticeable) degradation in the reversibility of the tint of the window over one or more tinting cycles. In some instances, a fraction of the ions responsible for the optical transition is irreversibly bound up in the electrochromic material (e.g., and thus the induced (altered) tint state of the window is not reversible to its original tinting state). In various EC devices, at least some (e.g., all) of the irreversibly bound ions can be used to compensate for "blind charge" in the material (e.g., ECD).

In some implementations, suitable ions include cations. The cations may include lithium ions (Li+) and/or hydrogen ions (H+) (i.e., protons). In some implementations, other ions can be suitable. Intercalation of the cations may be into an (e.g., metal) oxide. A change in the intercalation state of the ions (e.g. cations) into the oxide may induce a visible change in a tint (e.g., color) of the oxide. For example, the oxide may transition from a colorless to a colored state. For example, intercalation of lithium ions into tungsten oxide (WO3-y $(0<y\leq{\sim}0.3)$) may cause the tungsten oxide to change from a transparent state to a colored (e.g., blue) state. EC device coatings as described herein are located within the viewable portion of the tintable window such that the tinting of the EC device coating can be used to control the optical state of the tintable window.

Figure 3:
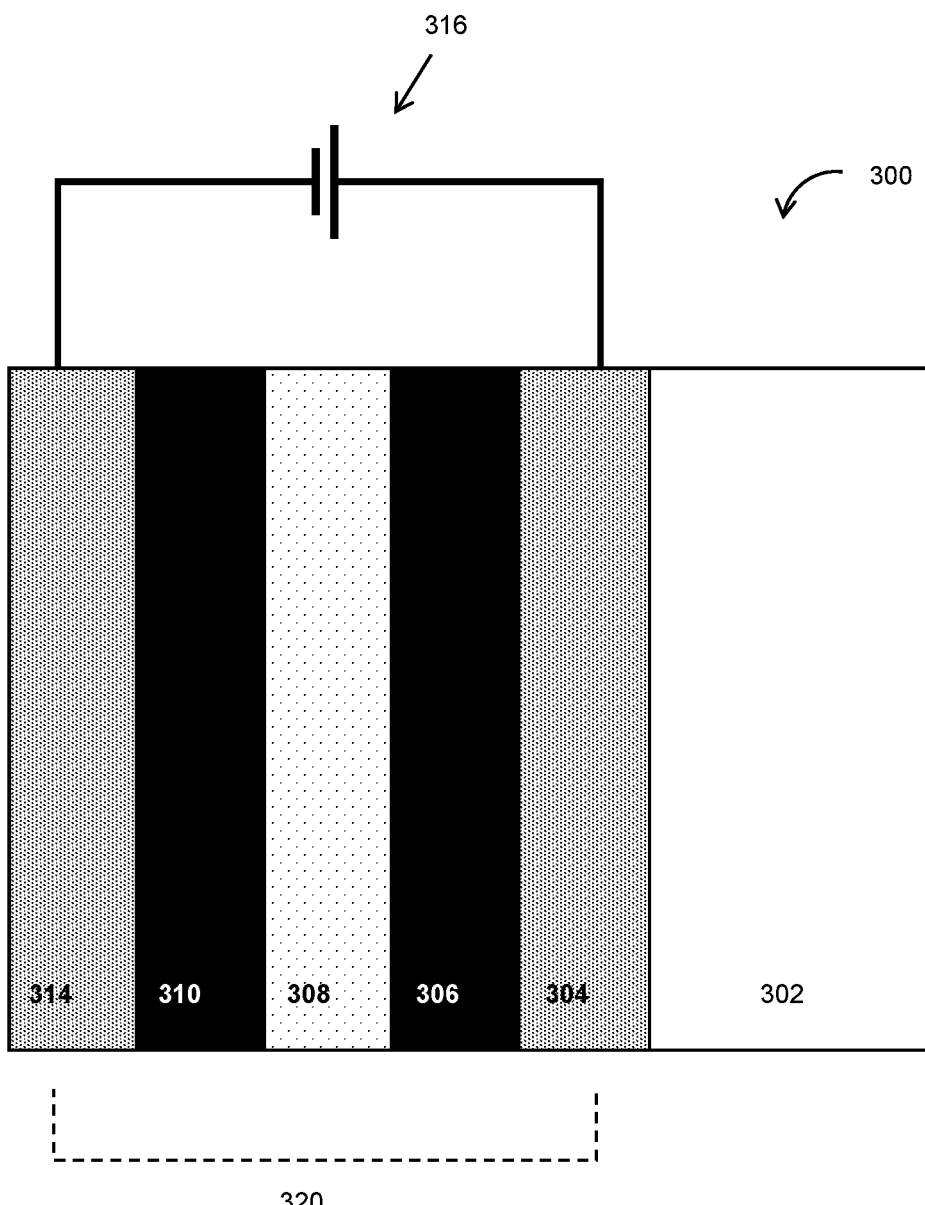
FIG. 3 schematically shows an electrochromic device.

FIG. 3 shows an example of a schematic cross-section of an electrochromic device AA00 in accordance with some embodiments is shown in FIG. 3. The EC device coating is attached to a substrate 302, a transparent conductive layer (TCL) 304, an electrochromic layer (EC) 306 (sometimes also referred to as a cathodically coloring layer or a cathodically tinting layer), an ion conducting layer or region (IC) 308, a counter electrode layer (CE) 310 (sometimes also referred to as an anodically coloring layer or anodically tinting layer), and a second TCL 314.

Elements 304, 306, 308, 310, and 314 are collectively referred to as an electrochromic stack 320. A voltage source 316 operable to apply an electric potential across the electrochromic stack 320 effects the transition of the electrochromic coating from, e.g., a clear state to a tinted state. In other embodiments, the order of layers is reversed with respect to the substrate. That is, the layers are in the following order: substrate, TCL, counter electrode layer, ion conducting layer, electrochromic material layer, TCL.

In various embodiments, the ion conductor region (e.g., 308) may form from a portion of the EC layer (e.g., 306) and/or from a portion of the CE layer (e.g., 310). In such embodiments, the electrochromic stack (e.g., 320) may be deposited to include cathodically coloring electrochromic material (the EC layer) in direct physical contact with an anodically coloring counter electrode material (the CE layer). The ion conductor region (sometimes referred to as an interfacial region, or as an ion conducting substantially electronically insulating layer or region) may form where the EC layer and the CE layer meet, for example through heating and/or other processing steps. Examples of electrochromic devices (e.g., including those fabricated without depositing a distinct ion conductor material) can be found in U.S. patent application Ser. No. 13/462,725, filed May 2, 2012, titled "ELECTROCHROMIC DEVICES," that is incorporated herein by reference in its entirety. In some embodiments, an EC device coating may include one or more additional layers such as one or more passive layers. Passive layers can be used to improve certain optical properties, to provide moisture, and/or to provide scratch resistance. These and/or other passive layers can serve to hermetically seal the EC stack 320. Various layers, including transparent conducting layers (such as 304 and 314), can be treated with anti-reflective and/or protective layers (e.g., oxide and/or nitride layers).

In certain embodiments, the electrochromic device is configured to (e.g., substantially) reversibly cycle between a clear state and a tinted state. Reversible may be within an expected lifetime of the ECD. The expected lifetime can be at least about 5, 10, 15, 25, 50, 75, or 100 years. The expected lifetime can be any value between the aforementioned values (e.g., from about 5 years to about 100 years, from about 5 years to about 50 years, or from about 50 years to about 100 years). A potential can be applied to the electrochromic stack (e.g., 320) such that available ions in the stack that can cause the electrochromic material (e.g., 306) to be in the tinted state reside primarily in the counter electrode (e.g., 310) when the window is in a first tint state (e.g., clear). When the potential applied to the electrochromic stack is reversed, the ions can be transported across the ion conducting layer (e.g., 308) to the electrochromic material and cause the material to enter the second tint state (e.g., tinted state).

It should be understood that the reference to a transition between a clear state and tinted state is non-limiting and suggests only one example, among many, of an electrochromic transition that may be implemented. Unless otherwise specified herein, whenever reference is made to a clear-tinted transition, the corresponding device or process encompasses other optical state transitions such as non-reflective-reflective, and/or transparent-opaque. In some embodiments, the terms "clear" and "bleached" refer to an optically neutral state, e.g., untinted, transparent and/or translucent. In some embodiments, the "color" or "tint" of an electrochromic transition is not limited to any wavelength or range of wavelengths. The choice of appropriate electrochromic material and counter electrode materials may govern the relevant optical transition (e.g., from tinted to untinted state).

In certain embodiments, at least a portion (e.g., all of) the materials making up electrochromic stack are inorganic, solid (i.e., in the solid state), or both inorganic and solid. Because various organic materials tend to degrade over time, particularly when exposed to heat and UV light as tinted building windows are, inorganic materials offer an advantage of a reliable electrochromic stack that can function for extended periods of time. In some embodiments, materials in the solid state can offer the advantage of being minimally contaminated and minimizing leakage issues, as materials in the liquid state sometimes do. One or more of the layers in the stack may contain some amount of organic material (e.g., that is measurable). The ECD or any portion thereof (e.g., one or more of the layers) may contain little or no measurable organic matter. The ECD or any portion thereof (e.g., one or more of the layers) may contain one or more liquids that may be present in little amounts. Little may be of at most about 100 ppm, 10 ppm, or 1 ppm of the ECD. Solid state material may be deposited (or otherwise formed) using one or more processes employing liquid components, such as certain processes employing sol-gels, physical vapor deposition, and/or chemical vapor deposition.

Figure 4:
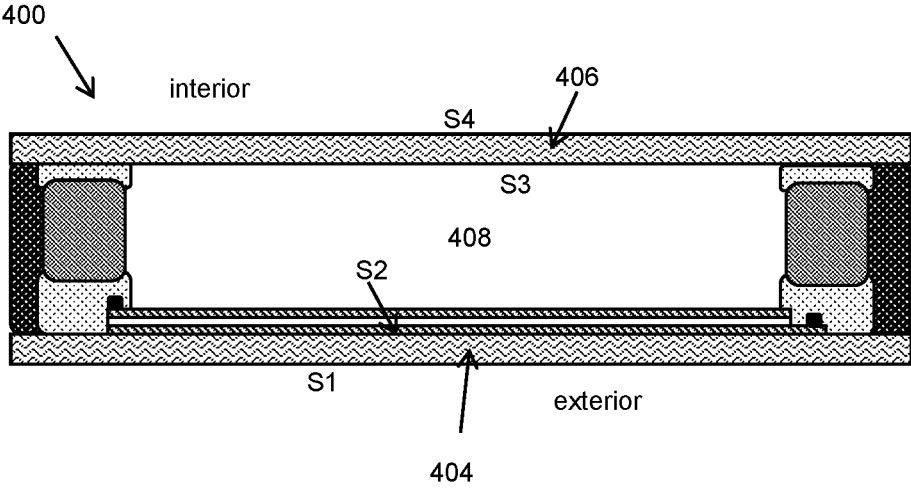
FIG. 4 schematically shows a cross section of an Integrated Glass Unit (IGU)

FIG. 4 shows an example of a cross-sectional view of a tintable window embodied in an insulated glass unit ("IGU") 400, in accordance with some implementations. The terms "IGU," "tintable window," and "optically switchable window" can be used interchangeably herein. It can be desirable to have IGUs serve as the fundamental constructs for holding electrochromic panes (also referred to herein as "lites") when provided for installation in a building. An IGU lite may be a single substrate or a multi-substrate construct. The lite may comprise a laminate, e.g., of two substrates. IGUs (e.g., having double- or triple-pane configurations) can provide a number of advantages over single pane configurations. For example, multi-pane configurations can provide enhanced thermal insulation, noise insulation, environmental protection and/or durability, when compared with single-pane configurations. A multi-pane configuration can provide increased protection for an ECD. For example, the electrochromic films (e.g., as well as associated layers and conductive interconnects) can be formed on an interior surface of the multi-pane IGU and be protected by an inert gas fill in the interior volume (e.g., 408) of the IGU. The inert gas fill may provide at least some (heat) insulating function for an IGU. Electrochromic IGUs may have heat blocking capability, e.g., by virtue of a tintable coating that absorbs (and/or reflects) heat and light.

In some embodiments, an "IGU" includes two (or more) substantially transparent substrates. For example, the IGU may include two panes of glass. At least one substrate of the IGU can include an electrochromic device disposed thereon. The one or more panes of the IGU may have a separator disposed between them. An IGU can be a hermetically sealed construct, e.g., having an interior region that is isolated from the ambient environment. A "window assembly" may include an IGU. A "window assembly" may include a (e.g., stand-alone) laminate. A "window assembly" may include one or more electrical leads, e.g., for connecting the IGUs and/or laminates. The electrical leads may operatively couple (e.g. connect) one or more electrochromic devices to a voltage source, switches and the like, and may include a frame that supports the IGU or laminate. A window assembly may include a window controller, and/or components of a window controller (e.g., a dock).

FIG. 4 shows an example implementation of an IGU 400 that includes a first pane 404 having a first surface S1 and a second surface S2. In some implementations, the first surface S1 of the first pane 404 faces an exterior environment, such as an outdoors or outside environment. The IGU 400 also includes a second pane 406 having a first surface S3 and a second surface S4. In some implementations, the second surface (e.g., S4) of the second pane (e.g., 406) faces an interior environment, such as an inside environment of a home, building, vehicle, or compartment thereof (e.g., an enclosure therein such as a room).

In some implementations, the first and the second panes (e.g., 404 and 406) are transparent or translucent, e.g., at least to light in the visible spectrum. For example, each of the panes (e.g., 404 and 406) can be formed of a glass material. The glass material may include architectural glass, and/or shatter-resistant glass. The glass may comprise a silicon oxide ($SO_x$). The glass may comprise a soda-lime glass or float glass. The glass may comprise at least about 75% silica ($SiO_2$). The glass may comprise oxides such as $Na_2O$, or CaO. The glass may comprise alkali or alkali-earth oxides. The glass may comprise one or more additives. The first and/or the second panes can include any material having suitable optical, electrical, thermal, and/or mechanical properties. Other materials (e.g., substrates) that can be included in the first and/or the second panes are plastic, semi-plastic and/or thermoplastic materials, for example, poly(methyl methacrylate), polystyrene, polycarbonate, allyl diglycol carbonate, SAN (styrene acrylonitrile copolymer), poly(4-methyl-1-pentene), polyester, and/or polyamide. The first and/or second pane may include mirror material (e.g., silver). In some implementations, the first and/or the second panes can be strengthened. The strengthening may include tempering, heating, and/or chemically strengthening.

Sensors of a sensor ensemble may be organized into a sensor module. A sensor ensemble may comprise a circuit board, such as a printed circuit board, in which a number of sensors are adhered or affixed to the circuit board. Sensors can be removed from a sensor module. For example, a sensor may be plugged and/or unplugged from the circuit board. Sensors may be individually activated and/or deactivated (e.g., using a switch). The circuit board may comprise a polymer. The circuit board may be transparent or non-transparent. The circuit board may comprise metal (e.g., elemental metal and/or metal alloy). The circuit board may comprise a conductor. The circuit board may comprise an insulator. The circuit board may comprise any geometric shape (e.g., rectangle or ellipse). The circuit board may be configured (e.g., may be of a shape) to allow the ensemble to be disposed in a mullion (e.g., of a window). The circuit board may be configured (e.g., may be of a shape) to allow the ensemble to be disposed in a frame (e.g., door frame and/or window frame). The mullion and/or frame may comprise one or more holes to allow the sensor(s) to obtain (e.g., accurate) readings. The circuit board may include an electrical connectivity port (e.g., socket). The circuit board may be connected to a power source (e.g., to electricity). The power source may comprise renewable or non-renewable power source.

Figure 5:
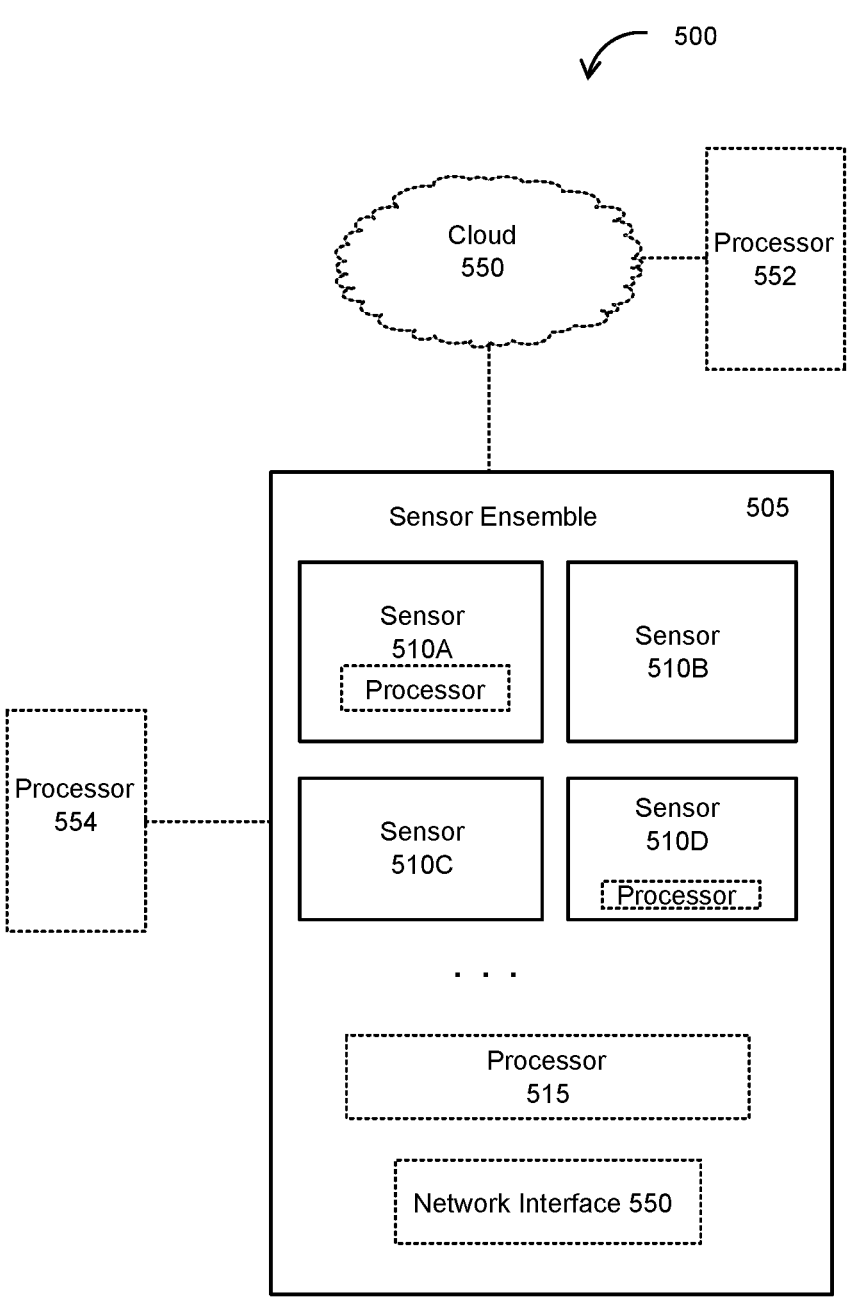
FIG. 5 shows an apparatus and its components and connectivity options.

FIG. 5 shows an example of a diagram 500 of an ensemble of sensors organized into a sensor module. Sensors 510A, 510B, 510C, and 510D are shown as included in sensor ensemble 505. An ensemble of sensors organized into a sensor module may include at least 1, 2, 4, 5, 8, 10, 20, 50, or 500 sensors. The sensor module may include a number of sensors in a range between any of the aforementioned values (e.g., from about 1 to about 1000, from about 1 to about 500, or from about 500 to about 1000). Sensors of a sensor module may comprise sensors configured or designed for sensing a parameter comprising, temperature, humidity, carbon dioxide, particulate matter (e.g., between 2.5 μm and 10 μm), total volatile organic compounds (e.g., via a change in a voltage potential brought about by surface adsorption of volatile organic compound), ambient light, audio noise level, pressure (e.g. gas, and/or liquid), acceleration, time, radar, lidar, radio signals (e.g., ultra-wideband radio signals), passive infrared, glass breakage, or movement detectors. The sensor ensemble (e.g., 505) may comprise non-sensor devices (e.g., emitters), such as buzzers and light emitting diodes. Examples of sensor ensembles and their uses can be found in U.S. patent application Ser. No. 16/447,169, filed Jun. 20, 2019, titled, "SENSING AND COMMUNICATIONS UNIT FOR OPTICALLY SWITCHABLE WINDOW SYSTEMS," that is incorporated herein by reference in its entirety.

In some embodiments, the one or more devices comprise a sensor (e.g., as part of a transceiver). In some embodiments, a transceiver may be configured transmit and receive one or more signals using a personal area network (PAN) standard, for example such as IEEE 802.15.4. In some embodiments, signals may comprise Bluetooth, Wi-Fi, or EnOcean signals (e.g., wide bandwidth). The one or more signals may comprise ultra-wide bandwidth (UWB) signals (e.g., having a frequency in the range from about 2.4 to about 10.6 Giga Hertz (GHz), or from about 7.5 GHz to about 10.6 GHz). An Ultra-wideband signal can be one having a fractional bandwidth greater than about 20%. An ultra-wideband (UWB) radio frequency signal can have a bandwidth of at least about 500 Mega Hertz (MHz). The one or more signals may use a very low energy level for short-range. Signals (e.g., having radio frequency) may employ a spectrum capable of penetrating solid structures (e.g., wall, door, and/or window). Low power may be of at most about 25 milli Watts (mW/), 50 mW, 75 mW, or 100 mW. Low power may be any value between the aforementioned values (e.g., from 25 mW to 100 mW, from 25 mW to 50 mW, or from 75 mW to 100 mW). The sensor and/or transceiver may be configured to support wireless technology standard used for exchanging data between fixed and mobile devices, e.g., over short distances. The signal may comprise Ultra High Frequency (UHF) radio waves, e.g., from about 2.402 gigahertz (GHz) to about 2.480 GHz. The signal may be configured for building personal area networks (PANs).

In some embodiments, the device is configured to enable geo-location technology (e.g., global positioning system (GPS), Bluetooth (BLE), ultrawide band (UWB) and/or dead-reckoning). The geo-location technology may facilitate determination of a position of signal source (e.g., location of the tag) to an accuracy of at least 100 centimeters (cm), 75 cm, 50 cm, 25 cm, 20 cm, 10 cm, or 5 cm. In some embodiments, the electromagnetic radiation of the signal comprises ultra-wideband (UWB) radio waves, ultra-high frequency (UHF) radio waves, or radio waves utilized in global positioning system (GPS). In some embodiments, the electromagnetic radiation comprises electromagnetic waves of a frequency of at least about 300 MHz, 500 MHz, or 1200 MHz. In some embodiments, the signal comprises location and/or time data. In some embodiments, the geo-location technology comprises Bluetooth, UWB, UHF, and/or global positioning system (GPS) technology. In some embodiments, the signal has a spatial capacity of at least about 1013 bits per second per meter squared ($bit/s/m^2$).

In some embodiments, pulse-based ultra-wideband (UWB) technology (e.g., ECMA-368, or ECMA-369) is a wireless technology for transmitting large amounts of data at low power (e.g., less than about 1 millivolt (mW), 0.75 mW, 0.5 mW, or 0.25 mW) over short distances (e.g., of at most about 300 feet 0, 250', 230', 200', or 150'). A UWB signal can occupy at least about 750 MHz, 500 MHz, or 250 MHz of bandwidth spectrum, and/or at least about 30%, 20%, or 10% of its center frequency. The UWB signal can be transmitted by one or more pulses. A component broadcasts digital signal pulses may be timed (e.g., precisely) on a carrier signal across a number of frequency channels at the same time. Information may be transmitted, e.g., by modulating the timing and/or positioning of the signal (e.g., the pulses). Signal information may be transmitted by encoding the polarity of the signal (e.g., pulse), its amplitude and/or by using orthogonal signals (e.g., pulses). The UWB signal may be a low power information transfer protocol. The UWB technology may be utilized for (e.g., indoor) location applications. The broad range of the UWB spectrum comprises low frequencies having long wavelengths, which allows UWB signals to penetrate a variety of materials, including various building fixtures (e.g., walls). The wide range of frequencies, e.g., including the low penetrating frequencies, may decrease the chance of multipath propagation errors (without wishing to be bound to theory, as some wavelengths may have a line-of-sight trajectory). UWB communication signals (e.g., pulses) may be short (e.g., of at most about 70 cm, 60 cm, or 50 cm for a pulse that is about 600 MHz, 500 MHz, or 400 MHz wide; or of at most about 20 cm, 23 cm, 25 cm, or 30 cm for a pulse that is has a bandwidth of about 1 GHz, 1.2 GHz, 1.3 GHz, or 1.5 GHz). The short communication signals (e.g., pulses) may reduce the chance that reflecting signals (e.g., pulses) will overlap with the original signal (e.g., pulse).

In some embodiments, an increase in the number and/or types of sensors may be used to increase a probability that one or more measured property is accurate and/or that a particular event measured by one or more sensor has occurred. In some embodiments, sensors of sensor ensemble may cooperate with one another. In an example, a radar sensor of sensor ensemble may determine presence of a number of individuals in an enclosure. A processor (e.g., processor 915) may determine that detection of presence of a number of individuals in an enclosure is positively correlated with an increase in carbon dioxide concentration. In an example, the processor-accessible memory may determine that an increase in detected infrared energy is positively correlated with an increase in temperature as detected by a temperature sensor. In some embodiments, network interface (e.g., 550) may communicate with other sensor ensembles similar to sensor ensemble. The network interface may additionally communicate with a controller.

Individual sensors (e.g., sensor 510A, sensor 510D, etc.) of a sensor ensemble may comprise and/or utilize at least one dedicated processor. A sensor ensemble may utilize a remote processor (e.g., 554) utilizing a wireless and/or wired communications link. A sensor ensemble may utilize at least one processor (e.g., processor 552), which may represent a cloud-based processor coupled to a sensor ensemble via the cloud (e.g., 550). Processors (e.g., 552 and/or 554) may be located in the same building, in a different building, in a building owned by the same or different entity, a facility owned by the manufacturer of the window/controller/sensor ensemble, or at any other location. In various embodiments, as indicated by the dotted lines of FIG. 5, sensor ensemble 505 is not required to comprise a separate processor and network interface. These entities may be separate entities and may be operatively coupled to ensemble 505. The dotted lines in FIG. 5 designate optional features. In some embodiments, onboard processing and/or memory of one or more ensemble of sensors may be used to support other functions (e.g., via allocation of ensembles(s) memory and/or processing power to the network infrastructure of a building).

FIG. 6 shows an example of a controller 605 for controlling one or more sensors. Controller 605 comprises sensor correlator 610, model generator 615, event detector 620, processor and memory 625, and the network interface 650. Sensor correlator 610 operates to detect correlations between or among various sensor types. For example, an infrared radiation sensor measuring an increase in infrared energy may be positively correlated with an increase in measure temperature. A sensor correlator may establish correlation coefficients, such as coefficients for negatively-correlated sensor readings (e.g., correlation coefficients between −1 and 0). For example, the sensor correlator may establish coefficients for positively-correlated sensor readings (e.g., correlation coefficients between 0 and +1).

In some embodiments, the sensor data may be time dependent. In some embodiments, the sensor data may be space dependent. The model may utilize time and/or space dependency of the sensed parameter. A model generator may permit fitting of sensor readings as a function of one or more dimensions of an enclosure. In an example, a model provides sensor profile curves for carbon dioxide may utilize various gaseous diffusion models, which may allow prediction of a level of carbon dioxide at points in between sensor locations. Processor and memory (e.g., 625) may facilitate processing of models.

In some embodiments, the sensor and/or sensor ensemble may act as an event detector. The event detector may operate to direct activity of sensors in an enclosure. In an example, in response to event detector determining that very few individuals remain in an enclosure, event detector may direct carbon dioxide sensors to reduce a sampling rate. Reduction of a sampling rate may extend the life of a sensor (e.g., a carbon dioxide sensor). In another example, in response to event detector determining that a large number of individuals are present in a room, event detector may increase the sampling rate of a carbon dioxide sensor. In an example, in response to event detector receiving a signal from a glass breakage sensor, event detector may activate one or more movement detectors of an enclosure, one or more radar units of a detector. A network interface (e.g., 650) may be configured or designed to communicate with one or more sensors via wireless communications links, wired communications links, or any combination thereof.

The controller may monitor and/or direct (e.g., physical) alteration of the operating conditions of the apparatuses, software, and/or methods described herein. Control may comprise regulate, manipulate, restrict, direct, monitor, adjust, modulate, vary, alter, restrain, check, guide, or manage. Controlled (e.g., by a controller) may include attenuated, modulated, varied, managed, curbed, disciplined, regulated, restrained, supervised, manipulated, and/or guided. The control may comprise controlling a control variable (e.g. temperature, power, voltage, and/or profile). The control can comprise real time or off-line control. A calculation utilized by the controller can be done in real time, and/or offline. The controller may be a manual or a non-manual controller. The controller may be an automatic controller. The controller may operate upon request. The controller may be a programmable controller. The controller may be programed. The controller may comprise a processing unit (e.g., CPU or GPU). The controller may receive an input (e.g., from at least one sensor). The controller may deliver an output. The controller may comprise multiple (e.g., sub-) controllers. The controller may be a part of a control system. The control system may comprise a master controller, floor controller, local controller (e.g., enclosure controller, or window controller). The controller may receive one or more inputs. The controller may generate one or more outputs. The controller may be a single input single output controller (SISO) or a multiple input multiple output controller (MIMO). The controller may interpret the input signal received. The controller may acquire data from the one or more sensors. Acquire may comprise receive or extract. The data may comprise measurement, estimation, determination, generation, or any combination thereof. The controller may comprise feedback control. The controller may comprise feed-forward control. The control may comprise on-off control, proportional control, proportional-integral (PI) control, or proportional-integral-derivative (PID) control. The control may comprise open loop control, or closed loop control. The controller may comprise closed loop control. The controller may comprise open loop control. The controller may comprise a user interface. The user interface may comprise (or operatively coupled to) a keyboard, keypad, mouse, touch screen, microphone, speech recognition package, camera, imaging system, or any combination thereof. The outputs may include a display (e.g., screen), speaker, or printer.

The methods, systems and/or the apparatus described herein may comprise a control system. The control system can be in communication with any of the apparatuses (e.g., sensors) described herein. The sensors may be of the same type or of different types, e.g., as described herein. For example, the control system may be in communication with the first sensor and/or with the second sensor. The control system may control the one or more sensors. The control system may control one or more components of a building management system (e.g., lightening, security, and/or air conditioning system). The controller may regulate at least one (e.g., environmental) characteristic of the enclosure. The control system may regulate the enclosure environment using any component of the building management system. For example, the control system may regulate the energy supplied by a heating element and/or by a cooling element. For example, the control system may regulate velocity of an air flowing through a vent to and/or from the enclosure. The control system may comprise a processor. The processor may be a processing unit. The controller may comprise a processing unit. The processing unit may be central. The processing unit may comprise a central processing unit (abbreviated herein as "CPU"). The processing unit may be a graphic processing unit (abbreviated herein as "CPU"). The controller(s) or control mechanisms (e.g., comprising a computer system) may be programmed to implement one or more methods of the disclosure. The processor may be programmed to implement methods of the disclosure. The controller may control at least one component of the forming systems and/or apparatuses disclosed herein.

In some embodiments, an enclosure includes one or more sensors. The sensor may facilitate controlling the environment of the enclosure such that inhabitants of the enclosure may have an environment that is more comfortable, delightful, beautiful, healthy, productive (e.g., in terms of inhabitant performance), easer to live (e.g., work) in, or any combination thereof. The sensor(s) may be configured as low or high resolution sensors. Sensor may provide on/off indications of the occurrence and/or presence of a particular environmental event (e.g., one pixel sensors). In some embodiments, the accuracy and/or resolution of a sensor may be improved via artificial intelligence analysis of its measurements. Examples of artificial intelligence techniques that may be used include: reactive, limited memory, theory of mind, and/or self-aware techniques know to those skilled in the art). Sensors may be configured to process, measure, analyze, detect and/or react to one or more of: data, temperature, humidity, sound, force, pressure, electromagnetic waves, position, distance, movement, flow, acceleration, speed, vibration, dust, light, glare, color, gas(es), and/or other aspects (e.g., characteristics) of an environment (e.g., of an enclosure). The gases may include volatile organic compounds (VOCs). The gases may include carbon monoxide, carbon dioxide, water vapor (e.g., humidity), oxygen, radon, and/or hydrogen sulfide. The one or more sensors may be calibrated in a factory setting. A sensor may be optimized to be capable of performing accurate measurements of one or more environmental characteristics present in the factory setting. In some instances, a factory calibrated sensor may be less optimized for operation in a target environment. For example, a factory setting may comprise a different environment than a target environment. The target environment can be an environment in which the sensor is deployed. The target environment can be an environment in which the sensor is expected and/or destined to operate. The target environment may differ from a factory environment. A factory environment corresponds to a location at which the sensor was assembled and/or built. The target environment may comprise a factory in which the sensor was not assembled and/or built. In some instances, the factory setting may differ from the target environment to the extent that sensor readings captured in the target environment are erroneous (e.g., to a measurable extent). In this context, "erroneous" may refer to sensor readings that deviate from a specified accuracy (e.g., specified by a manufacture of the sensor). In some situations, a factory-calibrated sensor may provide readings that do not meet accuracy specifications (e.g., by a manufacturer) when operated in the target environments.

In certain embodiments, one or more shortcomings in sensor operation may be at least partially corrected and/or alleviated by allowing a sensor to be self-calibrated in its target environment (e.g., where the sensor is installed). In some instances, a sensor may be calibrated and/or recalibrated after installation in the target environment. In some instances, a sensor may be calibrated and/or recalibrated after a certain period of operation in the target environment. The target environment may be the location at which the sensor is installed in an enclosure. In comparison to a sensor that is calibrated prior to installation, in a sensor calibrated and/or recalibrated after installation in the target environment may provide measurements having increased accuracy (e.g., that is measurable). In certain embodiments, one or more previously-installed sensors in an enclosure provide readings that are used to calibrated and/or recalibrate a newly-installed sensor in the enclosure.

In some embodiments, a target environment corresponding to a first enclosure differs from a target environment corresponding to a second enclosure. For example, a target environment of an enclosure that corresponds to a cafeteria or to an auditorium may present sensor readings different than a target enclosure that corresponds to a conference room. A sensor may consider the target environment (e.g., one or more characteristics thereof) when performing sensor readings and/or outputting sensor data. For example, during lunchtime a carbon dioxide sensor installed in an occupied cafeteria may provide higher readings than a sensor installed in an empty conference room. In another example, ambient noise sensor located in an occupied cafeteria during lunch may provide higher readings than an ambient noise sensor located in a library.

In some embodiments, a sensor (e.g., occasionally) provides an output signal indicating an erroneous measurement. The sensor may be operatively coupled to at least one controller. The controller(s) may obtain erroneous sensor reading from the sensor. The controller(s) may obtain readings of the same type, at a similar time (e.g., or simultaneously), from one or more other (e.g., nearby) sensors. The one or more other sensors may be disposed at the same environment as the one sensor. The controller(s) may evaluate the erroneous sensor reading in conjunction with one or more readings of the same type made by one or more other sensors of the same type to identify the erroneous sensor reading as an outlier. For example, the controller may evaluate an erroneous temperature sensor reading and one or more readings of temperature made by one or more other temperature sensors. The controller(s) may determine that the sensor reading is erroneous in response to consideration (e.g., including evaluating and/or comparing with) the sensor reading with one or more readings from other sensors in the same environment (e.g., in the same enclosure). Controller(s) may direct the one sensor providing the erroneous reading to undergo recalibration (e.g., by undergoing a recalibration procedure). For example, the controller(s) may transmit one or more values and/or parameters to the sensor(s) providing the erroneous reading. The sensor(s) providing the erroneous reading may utilize the transmitted value and/or parameter to adjust its subsequent sensor reading(s). For example, the sensor(s) providing the erroneous reading may utilize the transmitted value and/or parameter to adjust its baseline for subsequent sensor reading(s). The baseline can be a value, a set of values, or a function.

A sensor may obtain a first reading of a first parameter from a first sensor and a second reading of the first parameter from a second sensor. The first sensor may be disposed at a first location in an enclosure and the second sensor may be disposed at a second location in the enclosure. A projected value of the first parameter measured at the first location may be estimated based, at least in part, on the second reading. A difference may be determined between the estimated projected value of the first parameter and the first reading of the first parameter. The difference between the estimated projected value of the first parameter and the first reading of the first parameter may be considered and/or utilized in modifying the first reading of the first parameter.

In some embodiments, self-calibration measurements performed in the field (e.g., in the target setting such as a deployment site) may be used to monitor a measurable characteristic (e.g., noise, objects, carbon dioxide ($CO_2$) level, and/or temperature) over a time-window (e.g., of at least an hour, a day, or a week). A value may be monitored over a time window to obtain a best-known value. A best-known value may comprise values that remain within an error range over a time-window (also referred to herein as the "minimal sampling period"). An optimal value may be interpolated, anticipated, and/or calculated. A minimal sampling period may be a function of the number and/or frequency of sampling needed to establish a reliable baseline. A best-known value may be the most stable value sensed (e.g., having smallest fluctuation range and/or lowest value) during at least the sampling period). In some cases, best-known values may be obtained during periods of low disturbance in an environment when fluctuations of the environmental characteristic (e.g., environmental property) are at a minimum. For example, best-known values may be obtained during an evening or weekend, e.g., during periods of low occupancy in an environment (e.g., building) when noise fluctuations and/or concentrations of gases such as $CO_2$ are at a minimum. A time-window during which a field baseline is measured (e.g., during a sampling period), can be pre-assigned, or can be assigned using a (e.g., repetitive) occurrence of the minimal sampling period. The minimal sampling period can be a period sufficient to allow differentiation of the measured signal from noise. Any pre-assigned time window can be adjusted using the (e.g., repetitive) occurrence of the minimal sampling period. Positional and/or stationary characteristics (e.g., placement of walls and/or windows) of the enclosure may be utilized in measuring the characteristics of a give environment. The positional and/or stationary characteristics of the enclosure may be derived independently (e.g., from $3^{rd}$ party data and/or from non-sensor data). The positional and/or stationary characteristics of the enclosure may be derived using data from the one or more sensors disposed in the environment. When the environment is minimally disturbed with respect to the measured environmental characteristic (e.g., when no one is present in an environment, and/or when the environment is quiet), some sensor data may be used to sense position of (e.g., stationary and/or non-stationary) objects to determine the environment. Determining the position of objects comprises determining an (e.g., human) occupancy in the environment. Distance and/or location related measurements may utilize sensor(s) such as radar and/o ultrasonic sensors. Distance and location related measurements may derive from sensors that to not traditionally correlated to location and/or distance. Objects disposed in, or that are part of, an enclosure may have distinct sensor signatures. For example, location of people in the enclosure may correlate to distinct temperature, humidity and/or $CO_2$ signatures. For example, location of a wall may correlate to an abrupt change in the distribution of temperature, humidity and/or $CO_2$ in the enclosure. For example, location of a window or door (whether open or closed) may correlate to a change in the distribution of temperature, humidity and/or $CO_2$ next to the window or door. The one or more sensors in the enclosure may monitor any environmental changes and/or correlates such changes to changes in subsequently monitored values. In some cases, lack of fluctuations in monitored values may be used as an indication that a sensor is damaged, and that the sensor may need to be remove or replaced.

In some embodiments, a best-known value is designated. The best-known value may be designated as a field-baseline, e.g., which may be compared to a factory base-line. If a field baseline is within an error range of the factory baseline, then the field baseline may be equated (e.g., and/or substituted with) a factory baseline. Otherwise new baseline may be assigned to the field baseline (e.g., baseline for the sensor deployed in the target location). In some cases, best-known values may be compared to, and/or derived from, historical values and/or third-party values. An accuracy of the field-baselines may be monitored over time. If a drift in a field-baseline is detected, which field-baseline (i) is above a threshold (e.g., about 5% of the field-baseline value drops), or (ii) is outside a field-baseline error range, then the field-baseline may be reset to the new (e.g., drifted) field-baseline value. The threshold may be of at least 2%, 4%, 5%, 10%, 15%, 20%, or 30% value drop relative to a previously determined baseline.

In some embodiments, a device (e.g., sensor) can be designated as a golden device that can be used as a reference (e.g., as the golden standard) for calibration of the other sensors (e.g., of the same type in this or in another facility). The golden device may be a device that is the most calibrated in the facility or in a portion thereof (e.g., in the building, in the floor, and/or in the room). A calibrated and/or localized device may be utilized as a standard for calibrating and/or localizing other devices (e.g., of the same type). Such devices may be referred to as the "golden device." The golden device be utilized as a reference device.

The golden device may be the one most calibrated and/or accurately localized in the facility (e.g., among devices of the same type).

In some embodiments, self-calibration is performed based at least in part on one or more learning techniques (e.g., machine learning, artificial intelligence (AI), heuristics, and/or collaboration/correlation among differing sensor types). Self-calibration may be performed on an individual sensor and/or on a remote processor operatively coupled to the sensor (e.g., on a central processor and/or in the cloud). Self-calibration may periodically determine any need for new calibration of a sensor (e.g., by monitoring drift). Self-calibration may consider a plurality of sensors (e.g., a community of sensors). A community of sensors can be of the same type, in the same environment, in the same enclosure (e.g., space), and/or in a vicinity (e.g., proximity) of the sensor. For example, a community of sensors can be in the same enclosure, same space, same building, in the same floor, in the same room, in the same room portion, within at most a predetermined distance from each other, or any combination thereof. A community of sensors can include a dormant sensor, shut sensor, and/or actively functioning sensor. Baseline(s) from one or more actively functioning sensor may be compared against other sensor(s) to find any baseline outliers. Baseline(s) from one or more functioning sensor may be compared to (e.g., dormant) sensors that were previously calibrated. Non-functioning (e.g., dormant) sensor(s) may serve as "memory sensors," e.g., for the purpose of baseline comparison. For example, a dormant state of a sensor may preserve its calibration value. Malfunctioning sensors can be functionally replaced by activating inactive sensors that were previously installed in the environment (e.g., instead of physically replacing them by installing a new sensor introduced to the environment). The environment may be an enclosure. When a sensor is added to the community of sensors, it may adopt a baseline value that considers the baseline values of adjacent sensor(s) of the community. For example, a new sensor may adopt baseline values (e.g., average, mean, median, mode, or midrange) of its (e.g., directly) adjacent sensors. Directly adjacent sensors 1 and 2 are two sensors that are adjacent to one another, without any other sensor (e.g., of the same type disposed in the distance between sensor 1 and sensor 2. For example, a new sensor may adopt baseline values (e.g., average, mean, median, mode, or midrange) of a plurality of sensors (e.g., all sensors) in the environment.

In some embodiments, Self-calibration considers a ground truth sensing value. A ground truth sensing value can be monitored by an alternate (e.g., and more sensitive) method. For example, by physically monitoring (e.g., manually and/or automatically) an individual sensor against a known and/or different measurement methodology. In some cases, ground truth may be determined by a traveler (e.g., robot, or Field Service Engineer), or external data (e.g., from a $3^{rd}$ party). The robot may comprise a drone, or a vehicle.

In some embodiments, a sensor transmits (e.g., beacons) data to a receiver, e.g., a sensor or suite of sensors. The suite of sensors can also be referred to as an "ensemble of sensors." The sensors in the suite of sensors can be analogous to those deployed in a space of an enclosure. At least one sensor of the suite of sensors may be out of calibration, or not calibrated (e.g., upon or after deployment). A sensor may be calibrated using ground truth measurement (e.g., performed by a traveler). The traveler may carry a similar sensor to the one to be calibrated/recalibrated. The sensor may be sensed by the traveler as being non-calibrated or out of calibration. The traveler may be a field service engineer.

The traveler may be a robot. The robot may be mobile. The robot may comprise a wheel (e.g., wheels). The robot may comprise a vehicle. The robot may be air borne. The robot may comprise, or be integrated into a drone, helicopter, and/or airplane. The mobile enclosure (e.g., car or drone) may be devoid of a human operator. A receiver may be carried by the traveler, e.g., into the space. The traveler (e.g., using the receiver) may take one or more readings to determine ground truth value(s). The readings corresponding to the ground truth value(s) may be sent, directly or indirectly (e.g. via the cloud) to proximate uncalibrated and/or mis-calibrated sensor(s). A sensor that is reprogrammed with a ground truth value(s), may thus become calibrated. A sensor (or suite of sensors) of the traveler may be programmed to transmit (e.g., beacon) to non-calibrated or mis-calibrated sensors, its newly calibrated values. The transmission of the newly calibrated values may be sent to sensors within a certain radius, e.g., depending on the property measured by the sensor and its location (e.g., geographical) susceptibility. In one example, when a field service engineer (abbreviated herein as "FSE") is within a radius of a sensor, and ground truth readings have been successfully programmed into the sensor that is now calibrated using the ground truth readings. In some embodiments, a signal indicates successful calibration of the sensor. Calibration of the sensor may include transferring data and/or reprograming the sensor. The signal may comprise a sound (e.g., chime), a light, or another signal type that is detectable (e.g., by an instrument and/or by a user). The FSE may move to the next sensor(s) for calibration assessment, calibration, and/or recalibration. Such procedure may allow a traveler (e.g., FSE) to enter a space of an enclosure, and travel (e.g., walk around) in the space. The traveler may enter one or more characteristics of the sensor. The one or more characteristics of the sensor may comprise property measured, range (e.g., radii), sensor type, sensor fidelity, sampling frequency, operating temperature (e.g., or range thereof), or operating pressure. The traveler may wait for a signal of the sensor (e.g., indicating completion of calibration), and move on to recalibrate sensor(s) in the space. The assessment of the calibration, calibration, and/or recalibration of the sensor may require physical coupling (e.g., via a wire) to the sensor. The assessment of the calibration, calibration, and/or recalibration of the sensor may be devoid of physical coupling to the sensor (e.g., be wireless). The wireless calibration may be automated (e.g., using a robot as a traveler). The wireless calibration utilizing the traveler may require physical travel within the environment in which the sensor(s) are deployed. To ensure accuracy, transmitted data can be compared (e.g., in real time, or at a later time) to a standard and/or alternate measurement methodology. Transmitted and/or compared sensor data may be stored and/or used for calibration of a sensor.

In some cases, a location of a sensor may be calibrated. For example, there may be a discrepancy between a registered location of a sensor, and a measured location of the sensor by the traveler. This may occur when the sensor is or is not calibrated as to the property (e.g., humidity or pressure) it is designed to measure. The traveler may transmit the discrepancy to allow correction of any previously measured data by the (location mis-calibrated or uncalibrated) sensor. The transmission may be to a controller and/or to a processor that is operatively coupled with a controller, which controller is operatively coupled to the sensor. The traveler may initiate a location correction operation of the sensor, e.g., to calibrate/re-calibrate its location.

In some embodiments, the location of a sensor carried by the traveler differs from a location of the sensor to be calibrated. For example, the sensor of the traveler may be in the middle of the room, and sensor(s) to be calibrated may be affixed to a wall. The discrepancy of these locations may contribute to a calibration error (e.g., of the property measured by the sensor). The traveler may transmit (e.g., along with the calibration data or separate thereto) the location at which the calibration data is measured (e.g., the location of the sensor of the traveler), e.g., to allow for any location discrepancy compensation. The variability in the sensed quality(ies) (e.g., property(ies)) may be calculated, anticipated, and/or applied to the sensed data used for calibration, e.g., to compensate for any variability between the sensor of the traveler and the sensor being recalibrated/calibrated. The calculation may comprise a simulation, e.g., a real-time simulation. A simulation may consider the enclosure (e.g., room), fixtures in and/or defining the enclosure, directions of any enclosure boundaries (e.g., wall, floor, ceiling, and/or window), and/or any anticipated variability in the environment of the enclosure (e.g., at least one characteristic comprising location, volume, air flow or temperature, of a vent of the enclosure). A simulation may anticipate fixture(s) (e.g., desk, chair, and/or lamp) and/or bodies in the enclosure. The bodies may include (i) inhabitants disposed in the enclosure during specific time periods and/or (ii) inhabitant traffic patterns. The anticipatory simulation may resemble anticipating an existence, position, mass and/or other characteristics of a black hole from the behavior of its surroundings (e.g., as opposed to by direct measurement on the black hole). The simulation may comprise an indirect method of calibration. The simulation may comprise a recursive fitting methodology. A simulation may comprise auto positioning of (i) a structural grid of the environment (e.g., building walls) and/or (ii) a grid to which the sensors are affixed to. The calibration/recalibration may be adjusted in situ and/or in real-time. The calibration/recalibration of a sensor may utilize relative location information. Relative may be to at least one fixed structural element (e.g., relative to at least one fixed sensor).

In some embodiments, a plurality of sensors is assembled into a sensor suite (e.g., sensor ensemble). At least two sensors of the plurality of sensors may be of a different type (e.g., are configured to measure different properties). Various sensor types can be assembled together (e.g., bundled up) and form a sensor suite. The plurality of sensors may be coupled to one electronic board. The electrical connection of at least two of the plurality of sensors in the sensor suit may be controlled (e.g., manually and/or automatically). For example, the sensor suite may be operatively coupled to, or comprise, a controller (e.g., a microcontroller). The controller may control and on/off connectivity of the sensor to electrical power. The controller can thus control the time (e.g., period) at which the sensor will be operative.

In some embodiments, baseline of one or more sensors of the sensor ensemble may drift. A recalibration may include one or more (e.g., but not all) sensors of a sensor suite. For example, a collective baseline drift can occur in at least two sensor types in a given sensor suite. A baseline drift in one sensor of the sensor suite may indicate malfunction of the sensor. Baseline drifts measured in a plurality of sensors in the sensor suite, may indicate a change in the environment sensed by the sensors in the sensor suite (e.g., rather than malfunction of these baseline drifted sensors). Such sensor data baseline drifts may be utilized to detect environmental changes. For example (i) that a building was erected/destroyed next to the sensor suite, (ii) that a ventilation channel was altered (e.g., damaged) next to the sensor suite, (iii) that a refrigerator is installed/dismantled next to the sensor suite, (iv) that a working location of a person is altered relative (e.g., and adjacent) to the sensor suite, (v) that an electronic change (e.g., malfunction) is experienced by the sensor suite, (vi) that a structure (e.g., interior wall) has been changed, or (vii) any combination thereof. In this manner, the data can be used e.g. to update a three-dimensional (3D_model of the enclosure.

In some embodiments, one or more sensors are added or removed from a community of sensors, e.g., disposed in the enclosure and/or in the sensor suite. Newly added sensors may inform (e.g., beacon) other members of a community of sensor of its presence and relative location within a topology of the community. Examples of sensor community(ies) can be found, for example, in U.S. Provisional Patent Application Ser. No. 62/958,653, filed Jan. 8, 2020, titled, "SENSOR AUTOLOCATION," that is incorporated by reference herein in its entirety.

FIG. 7 shows a flowchart for a method 700 for detecting an outlier based, at least in part, on sensor readings. The method of FIG. 7 may be performed by an individual sensor of a sensor ensemble. The method of FIG. 7 may be performed by a first sensor coupled to (e.g., in communication with) a second sensor. The method of FIG. 7 may be directed by a controller coupled to (e.g., in communication with) the first and/or second sensors. The method of FIG. 7 begins at 710, in which sensor readings are obtained from one or more sensors of a sensor ensemble. At 720, readings are processed (e.g., by considering the enclosure, historical reading, benchmarks, and/or modeling) to generate a result. At 730, the result is utilized to detect outlier data, to detect an outlier sensor, to detect an environmental change (e.g., at a particular time and/or location), and/or to predict future readings of the one or more sensors.

In particular embodiments, sensor readings from a particular sensor may be correlated with sensor readings from a sensor of the same type or of a different type. Receipt of a sensor reading may give rise to a sensor accessing correlation data from other sensors disposed within the same enclosure. Based, at least in part, on the access correlation data, the reliability of a sensor may be determined or estimated. Responsive to determination or estimation of sensor reliability, a sensor output reading may be adjusted (e.g., increased/decreased). A reliability value may be assigned to a sensor based on adjusted sensor readings.

FIG. 8 shows a flowchart for a method 850 for detecting and adjusting an outlier based, at least in part, on sensor readings. The method of FIG. 8 may be performed by an individual sensor of a sensor ensemble. The method of FIG. 8 may be performed by a first sensor coupled to (e.g., and in communication with) a second sensor. The method of FIG. 8 may be directed by at least one controller (e.g., processor) coupled to (e.g., in communication with) first and/or second sensors. The method of FIG. 8 begins at 855, in which sensor readings are obtained from one or more sensors of a sensor ensemble disposed in an enclosure. A sensor reading may be any type of reading, such as detection of movement of individuals within an enclosure, temperature, humidity, or any other property detected by the sensor. At 860, correlation data may be accessed from other sensors disposed in the enclosure. Correlation data may relate to output readings from a sensor of the same type or a sensor of a different type operating within the enclosure. In an example, a noise sensor may access data from a movement sensor to determine if one or more individuals have entered an enclosure. One or more individuals moving within an enclosure may emit a level of noise. In an example, output signals from a noise sensor may be corroborated by a second noise sensor and/or by a movement detector. At 865, based, at least in part, on the accessed correlation data, reliability of an obtained sensor reading may be determined. In an example, responsive to output signals from a faulty (e.g., uncalibrated, mis-calibrated, or otherwise malfunctioning) noise sensor without movement detection by movement detector, output signals from the noise sensor may be determined to be of decreased reliability. In an example, responsive to a calibrated noise sensor reporting an increase in detected noise and simultaneous movement detection, sensor readings from the calibrated noise sensor may be determined to be of increased reliability. At 870, based, at least in part, on the determined reliability of obtained sensor readings, sensor readings may be adjusted (e.g., and re-calibrated). In an example, a faulty (e.g., uncalibrated, mis-calibrated, or otherwise malfunctioning) noise sensor sensing a large increase in noise while a movement sensor detects very little movement may bring about adjustment (e.g., decreasing) of noise sensor output readings. In an example, a faulty noise sensor sensing only a small increase in noise while a movement detector detects a large number of individuals entering an enclosure may bring about adjustment (e.g., increasing) of noise sensor output readings. At 875, assigning or updating a reliability value for one or more sensors based, at least in part, on adjusted sensor readings may be performed. In an example, a newly-installed sensor, which repeatedly (e.g., two or more times) provides output readings inconsistent with other sensors of the same type or of a different type may be (i) assigned a lower value of reliability, (ii) calibrated or re-calibrated, and/or (iii) examined for any other reliability issues. In an example, a calibrated sensor, which repeatedly provides output readings consistent with other sensors of the same type or of a different type may be assigned a higher value of reliability.

In some embodiments, a plurality of sensors of the same type may be distributed in an enclosure. At least one of the plurality of sensors of the same type, may be part of an ensemble. For example, at least two of the plurality of sensors of the same type, may be part of at least two ensembles. The sensor ensembles may be distributed in an enclosure. An enclosure may comprise a conference room. For example, a plurality of sensors of the same type may measure an environmental parameter in the conference room. Responsive to measurement of the environmental parameter of an enclosure, a parameter topology of the enclosure may be generated. A parameter topology may be generated utilizing output signals from any type of sensor of sensor ensemble, e.g., as disclosed herein. Parameter topologies may be generated for any enclosure of a facility such as conference rooms, hallways, bathrooms, cafeterias, garages, auditoriums, utility rooms, storage facilities, equipment rooms, and/or elevators.

FIG. 9 shows an example of a diagram 900 of an arrangement of sensor ensembles distributed within an enclosure. In the example shown in FIG. 9, a group 910 of individuals are seated in conference room 902. The conference room includes an "X" dimension to indicate length, a "Y" dimension to indicate height, and a "Z" dimension to indicate depth. XYZ being directions a Cartesian coordination system. Sensor ensembles 905A, 905B, and 905C comprise sensors can operate similar to sensors described in reference to sensor ensemble 505 of FIG. 5. At least two sensor ensembles (e.g., 905A, 905B, and 905C) may be integrated into a single sensor module. Sensor ensembles 905A, 905B, and 905C can include a carbon dioxide ($CO_2$)

sensor, a carbon monoxide (CO) sensor, an ambient noise sensor, or any other sensor disclosed herein. In the example shown in FIG. 9, a first sensor ensemble 905A is disposed (e.g., installed) near point 915A, which may correspond to a location in a ceiling, wall, or other location to a side of a table at which the group 910 of individuals are seated. In the example shown in FIG. 9, a second sensor ensemble 905B is disposed (e.g., installed) near point 915B, which may correspond to a location in a ceiling, wall, or other location above (e.g., directly above) a table at which the group 910 of individuals are seated. In the example shown in FIG. 9, a third sensor ensemble 905C may be disposed (e.g., installed) at or near point 915C, which may correspond to a location in a ceiling, wall, or other location to a side of the table at which the relatively small group 910 of individuals are seated. Any number of additional sensors and/or sensor modules may be positioned at other locations of conference room 902. The sensor ensembles may be disposed anywhere in the enclosure. The location of an ensemble of sensors in an enclosure may have coordinates (e.g., in a Cartesian coordinate system). At least one coordinate (e.g., of x, y, and z) may differ between two or more sensor ensembles, e.g., that are disposed in the enclosure. At least two coordinates (e.g., of x, y, and z) may differ between two or more sensor ensembles, e.g., that are disposed in the enclosure. All the coordinates (e.g., of x, y, and z) may differ between two or more sensor ensembles, e.g., that are disposed in the enclosure. For example, two sensor ensembles may have the same x coordinate, and different y and z coordinates. For example, two sensor ensembles may have the same x and y coordinates, and a different z coordinate. For example, two sensor ensembles may have different x, y, and z coordinates.

In particular embodiments, one or more sensors of the sensor ensemble provide readings. In some embodiments, the sensor is configured to sense a parameter. The parameter may comprise temperature, particulate matter, volatile organic compounds, electromagnetic energy, pressure, acceleration, time, radar, lidar, glass breakage, movement, or gas. The gas may comprise a Nobel gas. The gas may be a gas harmful to an average human. The gas may be a gas present in the ambient atmosphere (e.g., oxygen, carbon dioxide, ozone, chlorinated carbon compounds, or nitrogen compound(s) such as Nitric oxide (NO) and/or nitrogen dioxide ($NO_2$)). The gas(es) may comprise oxygen, nitrogen, carbon dioxide, carbon monoxide, hydrogen sulfide, nitrogen dioxide, inert gas, Nobel gas (e.g., radon), cholorophore, ozone, formaldehyde, methane, or ethane. The gas may comprise radon, carbon monoxide, hydrogen sulfide, hydrogen, oxygen, water (e.g., humidity). The electromagnetic sensor may comprise an infrared, visible light, ultraviolet sensor. The infrared radiation may be passive infrared radiation (e.g., black body radiation). The electromagnetic sensor may sense radio waves. The radio waves may comprise wide band, or ultra-wideband radio signals. The radio waves may comprise pulse radio waves. The radio waves may comprise radio waves utilized in communication. The gas sensor may sense a gas type, flow (e.g., velocity and/or acceleration), pressure, and/or concentration. The readings may have an amplitude range. The readings may have a parameter range. For example, the parameter may be electromagnetic wavelength, and the range may be a range of detected wavelengths.

In some embodiments, the sensor data is responsive to the environment in the enclosure and/or to any inducer(s) of a change (e.g., any environmental disruptor) in this environment. The sensors data may be responsive to emitters operatively coupled to (e.g., in) the enclosure (e.g., an occupant, appliances (e.g., heater, cooler, ventilation, and/or vacuum), opening). For example, the sensor data may be responsive to an air conditioning duct, or to an open window. The sensor data may be responsive to an activity taking place in the room. The activity may include human activity, and/or non-human activity. The activity may include electronic activity, gaseous activity, and/or chemical activity. The activity may include a sensual activity (e.g., visual, tactile, olfactory, auditory, and/or gustatory). The activity may include an electronic and/or magnetic activity. The activity may be sensed by a person. The activity may not be sensed by a person. The sensors data may be responsive to the occupants in the enclosure, substance (e.g., gas) flow, substance (e.g., gas) pressure, and/or temperature.

In one example, sensor ensembles 905A, 905B, and 905C include $CO_2$ sensor, and an ambient noise sensor. A carbon dioxide sensor of sensor ensemble 905A may provide a reading as depicted in sensor output reading profile 925A. A noise sensor of sensor ensemble 905A may provide a reading also depicted in sensor output reading profile 925A. A carbon dioxide sensor of sensor ensemble 905B may provide a reading as depicted in sensor output reading profile 925B. A noise sensor of sensor ensemble 905B may provide a reading also as depicted in sensor output reading profile 925B. Sensor output reading profile 925B may indicate higher levels of carbon dioxide and noise relative to sensor output reading profile 925A. Sensor output reading profile 925C may indicate lower levels of carbon dioxide and noise relative to sensor output reading profile 925B. Sensor output reading profile 925C may indicate carbon dioxide and noise levels similar to those of sensor output reading profile 925A. Sensor output reading profiles 925A, 925B, and 925C may comprise indications representing other sensor readings, such as temperature, humidity, particulate matter, volatile organic compounds, ambient light, pressure, acceleration, time, radar, lidar, ultra-wideband radio signals, passive infrared, and/or glass breakage, movement detectors.

In some embodiments, data from a sensor in a sensor in the enclosure (e.g., and in the sensor ensemble) is collected and/or processed (e.g., analyzed). The data processing can be performed by a processor of the sensor, by a processor of the sensor ensemble, by another sensor, by another ensemble, in the cloud, by a processor of the controller, by a processor in the enclosure, by a processor outside of the enclosure, by a remote processor (e.g., in a different facility), by a manufacturer (e.g., of the sensor, of the window, and/or of the building network). The data of the sensor may have a time indicator (e.g., may be time stamped). The data of the sensor may have a sensor location identification (e.g., be location stamped). The sensor may be identifiably coupled with one or more controllers.

In particular embodiments, sensor output reading profiles 925A, 925B, and 925C may be processed. For example, as part of the processing (e.g., analysis), the sensor output reading profiles may be plotted on a graph depicting a sensor reading as a function of a dimension (e.g., the "X" dimension) of an enclosure (e.g., conference room 902). In an example, a carbon dioxide level indicated in sensor output reading profile 925A may be indicated as point 935A of $CO_2$ graph 930 of FIG. 9. In an example, a carbon dioxide level of sensor output reading profile 925B may be indicated as point 935B of $CO_2$ graph 930. In an example, a carbon dioxide level indicated in sensor output reading profile 925C may be indicated as point 935C of $CO_2$ graph 930. In an example, an ambient noise level indicated in sensor output reading profile 925A may be indicated as point 945A of noise graph 940. In an example, an ambient noise level indicated in sensor output reading profile 925B may be indicated as point 945B of noise graph 940. In an example, an ambient noise level indicated in sensor output reading profile 925C may be indicated as point 945C of noise graph 940.

Figure 15:
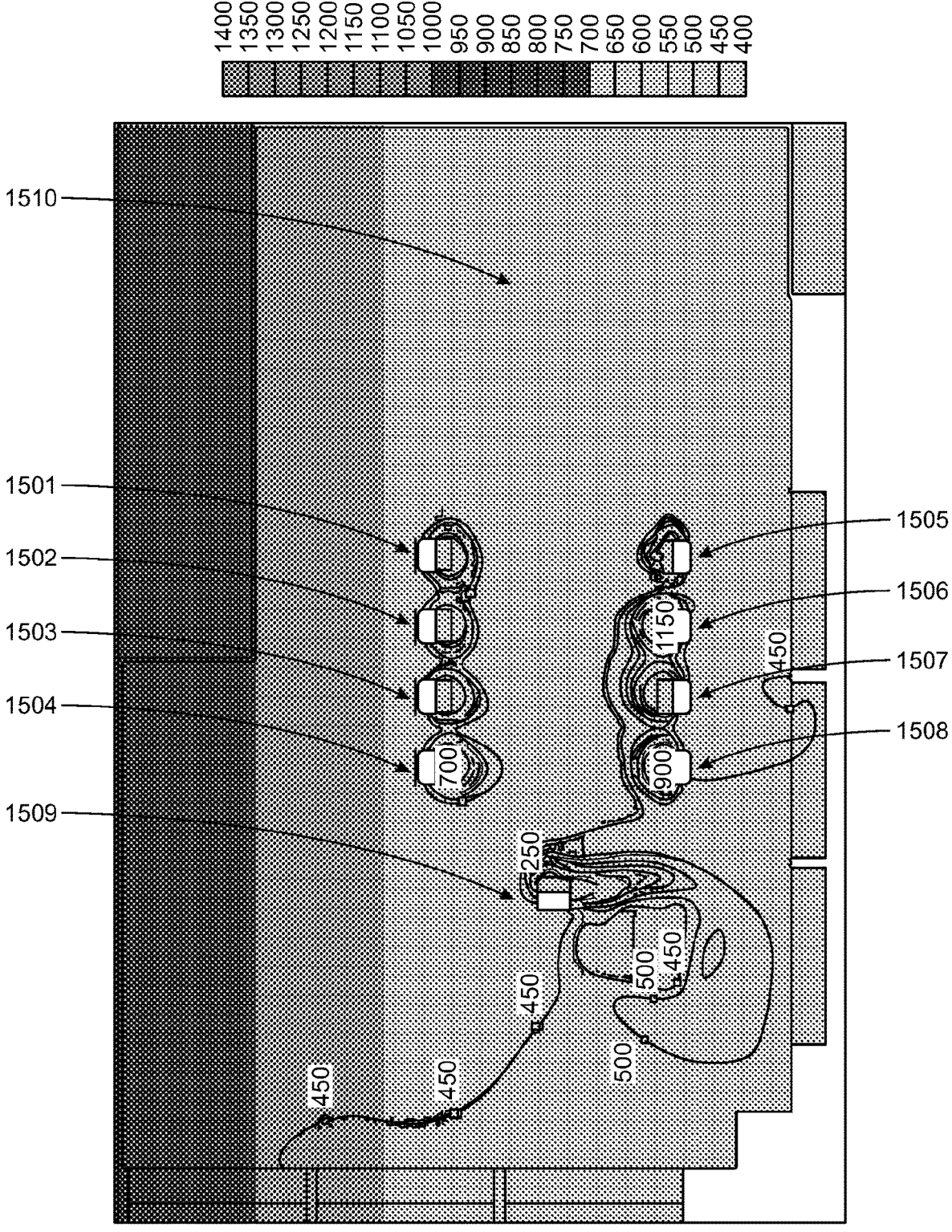
FIG. 15 shows a topographical map of measured property values.

In some embodiments, processing data derived from the sensor comprises applying one or more models. The models may comprise mathematical models. The processing may comprise fitting of models (e.g., curve fitting). The model may be multi-dimensional (e.g., two or three dimensional). The model may be represented as a graph (e.g., 2 or 3 dimensional graph). For example, the model may be represented as a contour map (e.g., as depicted in FIG. 15). The modeling may comprise one or more matrices. The model may comprise a topological model. The model may relate to a topology of the sensed parameter in the enclosure. The model may relate to a time variation of the topology of the sensed parameter in the enclosure. The model may be environmental and/or enclosure specific. The model may consider one or more properties of the enclosure (e.g., dimensionalities, openings, and/or environmental disrupters (e.g., emitters)). Processing of the sensor data may utilize historical sensor data, and/or current (e.g., real time) sensor data. The data processing (e.g., utilizing the model) may be used to project an environmental change in the enclosure, and/or recommend actions to alleviate, adjust, or otherwise react to the change.

In particular embodiments, sensor ensembles 905A, 905B, and/or 905C, may be capable of accessing a model to permit curve fitting of sensor readings as a function of one or more dimensions of an enclosure. In an example, a model may be accessed to generate sensor profile curves 950A, 950B, 950C, 950D, and 950E, utilizing points 935A, 935B, and 935C of $CO_2$ graph 930. In an example, a model may be accessed to generate sensor profile curves 951A, 951B, 951C, 951B, and 951E utilizing points 945A, 945B, and 945C of noise graph 940. Additional models may utilize additional readings from sensor ensembles (e.g., 905A, 905B, and/or 905C) to provide curves in addition to sensor profile curves 950 and 951 of FIG. 9. Sensor profile curves generated in response to use of a model may sensor output reading profiles indicate a value of a particular environmental parameter as a function of a dimension of an enclosure (e.g., an "X" dimension, a "Y" dimension, and/or a "Z" dimension).

In certain embodiments, one or more models utilized to form curves 950A-950E and 951A-951E) may provide a parameter topology of an enclosure. In an example, a parameter topology (as represented by curves 950A-950E and 951A-951E) may be synthesized or generated from sensor output reading profiles. The parameter topology may be a topology of any sensed parameter disclosed herein. In an example, a parameter topology for a conference room (e.g., conference room 902) may comprise a carbon dioxide profile having relatively low values at locations away from a conference room table and relatively high values at locations above (e.g., directly above) a conference room table. In an example, a parameter topology for a conference room may comprise a multi-dimensional noise profile having relatively low values at locations away from a conference table and slightly higher values above (e.g., directly above) a conference room table.

FIG. 10 shows an example of a diagram 1000 of an arrangement of sensor ensembles distributed within an enclosure. In the example shown in FIG. 10, a relatively large group 1010 of individuals (e.g., larger relative to conference room group 910) are assembled in auditorium 1002. The auditorium includes an "X" dimension to indicate length, a "Y" dimension to indicate height, and a "Z" dimension to indicate depth. Sensor ensembles 1005A, 1005B, and 1005C may comprise sensors that operate similar to sensors described in reference to sensor ensemble 905 of FIG. 9. At least two sensor ensembles (e.g., 1005A, 1005B, and 1005C) may be integrated into a single sensor module. Sensor ensembles 1005A, 1005B, and 1005C can include a $CO_2$ sensor, an ambient noise sensor, or any other sensor disclosed herein. In the example shown in FIG. 10, a first sensor ensemble 1005A is disposed (e.g., installed) near point 1015A, which may correspond to a location in a ceiling, wall, or other location to a side of seating area at which the relatively large group 1010 of individuals are seated. In the example shown in FIG. 10, a second sensor ensemble 1005B may be disposed (e.g., installed) at or near point 1015B, which may correspond to a location in a ceiling, wall, or other location above (e.g., directly above) an area at which the relatively large group 1010 of individuals are congregated. A third sensor ensemble 1005C may be disposed (e.g., installed) at or near point 1015C, which may correspond to a location in a ceiling, wall, or other location to a side of the table at which the relatively large group 1010 of individuals are positioned. Any number of additional sensors and/or sensor modules may be positioned at other locations of auditorium 1002. The sensor ensembles may be disposed anywhere in the enclosure.

In one example, sensor ensembles 1005A, 1005B, and 1005C, includes a carbon dioxide sensor of sensor ensemble 1005A may provide a reading as depicted in sensor output reading profile 1025A. A noise sensor of sensor ensemble 1005A may provide a reading also depicted in sensor output reading profile 1025A. A carbon dioxide sensor of sensor ensemble 1005B may provide a reading as depicted in sensor output reading profile 1025B. A noise sensor of sensor ensemble 1005B may provide a reading also as depicted in sensor output reading profile 1025B. Sensor output reading profile 1025B may indicate higher levels of carbon dioxide and noise relative to sensor output reading profile 1025A. Sensor output reading profile 1025C may indicate lower levels of carbon dioxide and noise relative to sensor output reading profile 1025B. Sensor output reading profile 1025C may indicate carbon dioxide and noise levels similar to those of sensor output reading profile 1025A. Sensor output reading profiles 1025A, 1025B, and 1025C may comprise indications representing other sensor readings of any sensed parameter disclosed herein.

In particular embodiments, sensor output reading profiles 1025A, 1025B, and 1025C may be plotted on a graph depicting a sensor reading as a function of a dimension (e.g., the "X" dimension) of an enclosure (e.g., auditorium 1002). In an example, a carbon dioxide level indicated in sensor output reading profile 1025A (shown in FIG. 10) may be indicated as point 1035A (shown in FIG. 10) of $CO_2$ graph 1030. In an example, a carbon dioxide level of sensor output reading profile 1025B (shown in FIG. 10) may be indicated as point 1035B (shown in FIG. 10) of $CO_2$ graph 1030. In an example, a carbon dioxide level indicated in sensor output reading profile 1025C may be indicated as point 1035C of $CO_2$ graph 1030. In an example, an ambient noise level indicated in sensor output reading profile 1025A may be indicated as point 1045A of noise graph 1040. In an example, an ambient noise level indicated in sensor output reading profile 1025B may be indicated as point 1045B of noise graph 1040. In an example, an ambient noise level indicated in sensor output reading profile 1025C may be indicated as point 1045C of noise graph 1040.

In particular embodiments, sensor ensembles 1005A, 1005B, and/or 1005C, may be capable of utilizing and/or accessing (e.g., configured to utilize and/or access) a model to permit curve fitting of sensor readings as a function of one or more dimensions of an enclosure. In an example shown in FIG. 10, a model may be accessed to provide sensor profiles, utilizing points 1035A, 1035B, and 1035C of $CO_2$ graph 1030. In an example shown as an example in FIG. 10, a model may be accessed to provide sensor profile 1051 utilizing points 1045A, 1045B, and 1045C of noise graph 1040. Additional models may utilize additional readings from sensor ensembles (e.g., 1005A, 1005B, 1005C) to provide sensor profile curves (e.g. sensor profile curve 1050A, 1050B, 1050C, 1050D, and 1050E) of FIG. 10. Models may be utilized to provide sensor profile curves corresponding to ambient noise levels (e.g., sensor profile curves 1050A, 1050B, 1050C, 1050D, and 1051E). Sensor profile curves generated in response to use of a model may indicate a value of a particular environmental parameter as a function of a dimension of an enclosure (e.g., an "X" dimension, a "Y" dimension, and/or a "Z" dimension). In certain embodiments, one or more models utilized to form sensor profile curves 1050 and 1051) may provide a parameter topology of an enclosure. A parameter topology may be indicative of a particular type of enclosure. In an example, a parameter topology may be synthesized or generated from sensor profile curves 1050 and 1051, which may correspond to a parameter topology for an auditorium. In an example, a parameter topology for an auditorium may comprise a carbon dioxide profile having at least moderately high values at all locations and very high values at locations near the center of the auditorium. In an example, a parameter topology for an auditorium may comprise a noise profile having relatively high values at all locations of an auditorium and higher values near the center of the auditorium. In particular embodiments, sensor readings from one or more sensors of a sensor ensemble may be obtained. Sensor readings may be obtained by the sensor itself. Sensor readings may be obtained by a cooperating sensor, which may be of the same type or a different type of sensor. Sensor readings may be obtained by one or more processors and/or controllers Sensor reading may be processed by considering one or more other readings from other sensors disposed (e.g., installed) within an enclosure, historical readings, benchmarks, and/or modeling, to generate a result (e.g., a prediction or an estimation of a sensor reading.) A generated result may be utilized to detect an outlier of a sensor reading and/or an outlier sensor. A generated result may be utilized to detect an environmental change at a time and/or location. A generated result may be utilized to predict future readings of the one or more sensors in the enclosure.

In some embodiments, a sensor has an operational lifespan. An operational lifespan of a sensor may be related to one or more readings taken by the sensor. Sensor readings from certain sensors may be more valuable and/or varied during certain time periods and may be less valuable and/or varied during other time periods. For example, movement sensor readings may be more varied during the day than during the night. The operational lifespan of the sensor may be extended. Extension of the operational lifespan may be accomplished by permitting the sensor to reduce sampling of environmental parameters at certain time periods (e.g., having the lower beneficial value). Certain sensors may modify (e.g., increase or decrease) a frequency at which sensor readings are sampled. Timing and/or frequency of the sensor operation may depend on the sensor type, location in the (e.g., target) environment, and/or time of day. A sensor type may require constant and/or more frequent operation during the day (e.g., $CO_2$, VOCs, occupancy, and/or lighting sensor). Volatile organic compounds may be animal and/or human derived. VOCs may comprise a compound related to human produced odor. A sensor may require infrequent operation during at least a portion of the night. A sensor type may require infrequent operation during at least a portion of the day (e.g., temperature and/or pressure sensor). A sensor may be assigned a timing and/or frequency of operation. The assignment may be controlled (e.g., altered) manually and/or automatically (e.g., using at least one controller operatively coupled to the sensor). Operatively coupled may include communicatively coupled, electrically coupled, optically coupled, or any combination thereof. Modification of the timing and/or frequency at which sensor readings are taken may be responsive to detection of an event by a sensor of the same type or of a sensor of a different type. Modification of the timing and/or frequency at which sensor readings may utilize sensor data analysis. The sensor data analysis may utilize artificial intelligence (abbreviated herein as "AI"). The control may be fully automatic or partially automatic. The partially automatic control may allow a user to (i) override a direction of the controller, and/or (ii) indicate any preference (e.g., of the user).

Figure 11:
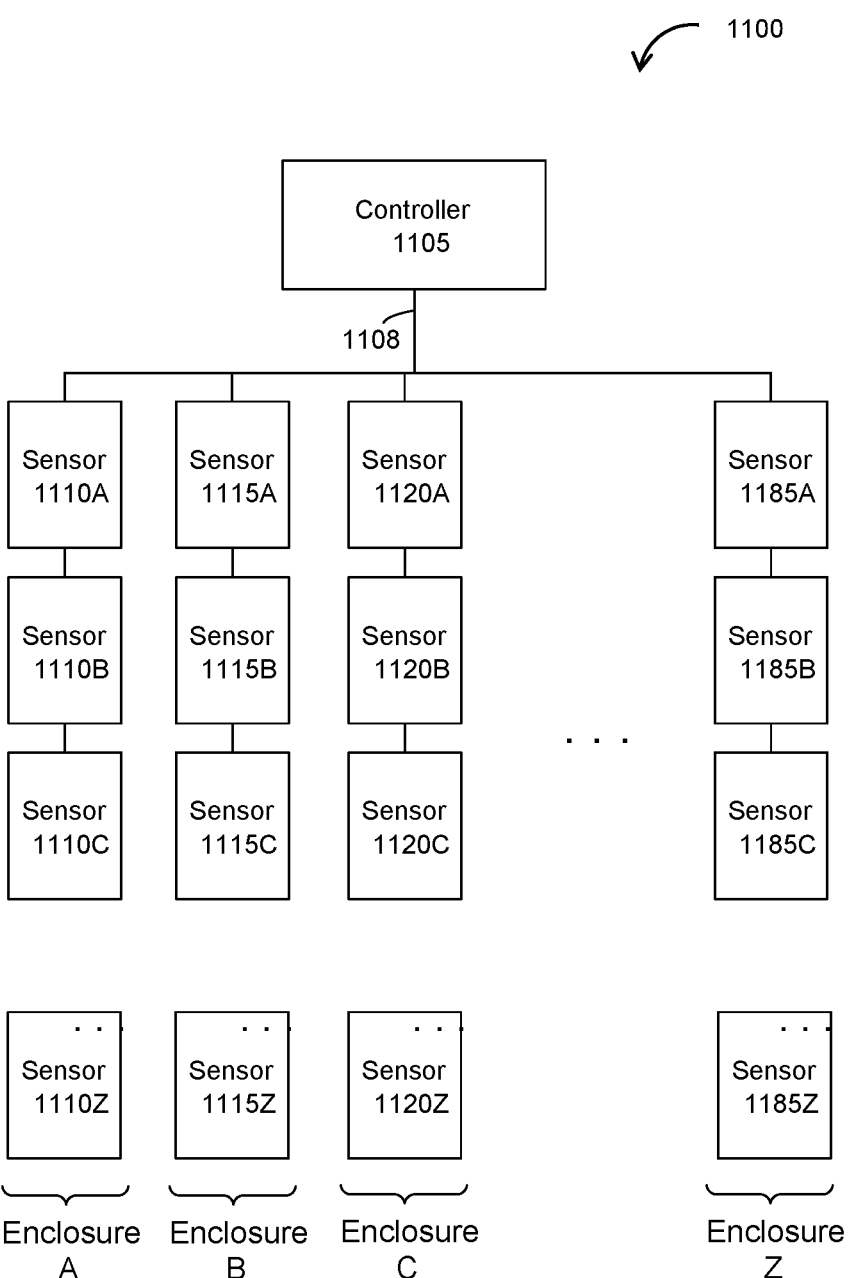
FIG. 11 shows a schematic example of sensor arrangement.

In some embodiments, processing sensor data comprises performing sensor data analysis. The sensor data analysis may comprise at least one rational decision making process, and/or learning. The sensor data analysis may be utilized to adjust and environment, e.g., by adjusting one or more components that affect the environment of the enclosure. The data analysis may be performed by a machine based system (e.g., a circuitry). The circuitry may be of a processor. The sensor data analysis may utilize artificial intelligence. The sensor data analysis may rely on one or more models (e.g., mathematical models). In some embodiments, the sensor data analysis comprises linear regression, least squares fit, Gaussian process regression, kernel regression, nonparametric multiplicative regression (NPMR), regression trees, local regression, semiparametric regression, isotonic regression, multivariate adaptive regression splines (MARS), logistic regression, robust regression, polynomial regression, stepwise regression, ridge regression, lasso regression, elasticnet regression, principal component analysis (PCA), singular value decomposition, fuzzy measure theory, Borel measure, Han measure, risk-neutral measure, Lebesgue measure, group method of data handling (GMDH), Naive Bayes classifiers, k-nearest neighbors algorithm (k-NN), support vector machines (SVMs), neural networks, support vector machines, classification and regression trees (CART), random forest, gradient boosting, or generalized linear model (GLM) technique. FIG. 11 shows an example of a diagram 1100 of an arrangement of sensors distributed among enclosures. In the example shown in FIG. 11, controller 1105 is communicatively linked 1108 with sensors located in enclosure A (sensors 1110A, 1110B, 1110C, . . . 1110Z), enclosure B (sensors 1115A, 1115B, 1115C, 1115Z), enclosure C (sensors 1120A, 1120B, 1120C, . . . 1120Z), and enclosure Z (sensors 1185A, 1185B, 1185C, . . . 1185Z). Communicatively linked comprises wired and/or wireless communication. In some embodiments, a sensor ensemble includes at least two sensors of a differing types. In some embodiments, a sensor ensemble includes at least two sensors of the same type. In the example shown in FIG. 11, sensors 1110A, 1110B, 1110C, . . . 1110Z of enclosure A represent an ensemble. An ensemble of sensors can refer to a collection of diverse sensors. In some embodiments, at least two of the sensors in the ensemble cooperate to determine environmental parameters, e.g., of an enclosure in which they are disposed. For example, a sensor ensemble may include a carbon dioxide sensor, a carbon monoxide sensor, a volatile organic chemical sensor, an ambient noise sensor, a visible light sensor, a temperature sensor, and/or a humidity sensor. A sensor ensemble may comprise other types of sensors, and claimed subject matter is not limited in this respect. The enclosure may comprise one or more sensors that are not part of an ensemble of sensors. The enclosure may comprise a plurality of ensembles. At least two of the plurality of ensembles may differ in at least one of their sensors. At least two of the plurality of ensembles may have at least one of their sensors that is similar (e.g., of the same type). For example, an ensemble can have two motion sensors and one temperature sensor. For example, an ensemble can have a carbon dioxide sensor and an IR sensor. The ensemble may include one or more devices that are not sensors. The one or more other devices that are not sensors may include sound emitter (e.g., buzzer), and/or electromagnetic radiation emitters (e.g., light emitting diode). In some embodiments, a single sensor (e.g., not in an ensemble) may be disposed adjacent (e.g., immediately adjacent such as contacting) another device that is not a sensor.

In some embodiments, the ensemble of sensors is disposed in a housing. The housing may comprise one or more circuit boards. The housing my comprise a processor or an emitter. The housing may comprise a temperature exchanging component (e.g., heat sink, cooler, and/or flow of gas). The temperature adjusting component can be active or passive. The processor may comprise a GPU or CPU processing unit. The circuitry may be programmable. The circuitry boards may be disposed in a manner that will permit temperature exchange, e.g., though another medium. The other medium may include a temperature conductive metal (e.g., elemental metal or metal alloy. For example, comprising copper and/or aluminum. The housing may comprise a polymer or a resin. The housing may include a plurality of sensors, emitters, temperature adjusters, and/or processors. The housing may comprise any device disclosed herein. The housing (e.g., container or envelope) may comprise a transparent or non-transparent material. The housing may comprise a body and a lid. The housing may comprise one or more holes. The housing may be operatively coupled to a power and/or communication network. The communication may be wired and/or wireless. Examples of sensor ensemble, housing, control, and coupling to the network can be found in U.S. Provisional Patent Application Ser. No. 63/079,851, filed Sep. 17, 2020, titled, "DEVICE ENSEMBLES AND COEXISTENCE MANAGEMENT OF DEVICES," which is incorporated herein by reference in its entirety.

Sensors of a sensor ensemble may collaborate with one another. A sensor of one type may have a correlation with at least one other type of sensor. A situation in an enclosure may affect one or more of different sensors. Sensor readings of the one or more different sensors may be correlated and/or affected by the situation. The correlations may be predetermined. The correlations may be determined over a period of time (e.g., using a learning process). The period of time may be predetermined. The period of time may have a cutoff value. The cutoff value may consider an error threshold (e.g., percentage value) between a predictive sensor data and a measured sensor data, e.g., in similar situation(s). The time may be ongoing. The correlation may be derived from a learning set (also referred to herein as "training set"). The learning set may comprise, and/or may be derived from, real time observations in the enclosure. The observations may include data collection (e.g., from sensor(s)). The learning set may comprise sensor(s) data from a similar enclosure. The learning set may comprise third party data set (e.g., of sensor(s) data). The learning set may derive from simulation, e.g., of one or more environmental conditions affecting the enclosure. The learning set may compose detected (e.g., historic) signal data to which one or more types of noise were added. The correlation may utilize historic data, third party data, and/or real time (e.g., sensor) data. The correlation between two sensor types may be assigned a value. The value may be a relative value (e.g., strong correlation, medium correlation, or weak correlation). The learning set that is not derived from real-time measurements, may serve as a benchmark (e.g., baseline) to initiate operations of the sensors and/or various components that affect the environment (e.g., HVAC system, and/or tinting windows). Real time sensor data may supplement the learning set, e.g., on an ongoing basis or for a defined time period. The (e.g., supplemented) learning set may increase in size during deployment of the sensors in the environment. The initial learning set may increase in size, e.g., with inclusion of additional (i) real time measurements, (ii) sensor data from other (e.g., similar) enclosures, (iii) third party data, and/or (iv) other and/or updated simulation.

In some embodiments, data from sensors may be correlated. Once a correlation between two or more sensor types is established, a deviation from the correlation (e.g., from the correlation value) may indicate an irregular situation and/or malfunction of a sensor of the correlating sensors. The malfunction may include a slippage of a calibration. The malfunction may indicate a requirement for re-calibration of the sensor. A malfunction may comprise complete failure of the sensor. In an example, a movement sensor may collaborate with a carbon dioxide sensor. In an example, responsive to a movement sensor detecting movement of one or more individuals in an enclosure, a carbon dioxide sensor may be activated to begin taking carbon dioxide measurements. An increase in movement in an enclosure, may be correlated with increased levels of carbon dioxide. In another example, a motion sensor detecting individuals in an enclosure may be correlated with an increase in noise detected by a noise sensor in the enclosure. In some embodiments, detection by a first type of sensor that is not accompanied by detection by a second type of sensor may result in a sensor posting an error message. For example, if a motion sensor detects numerous individuals in an enclosure, without an increase in carbon dioxide and/or noise, the carbon dioxide sensor and/or the noise sensor may be identified as having failed or as having an erroneous output. An error message may be posted. A first plurality of different correlating sensors in a first ensemble may include one sensor of a first type, and a second plurality of sensors of different types. If the second plurality of sensors indicate a correlation, and the one sensor indicates a reading different from the correlation, there is an increased likelihood that the one sensor malfunctions. If the first plurality of sensors in the first ensemble detect a first correlation, and a third plurality of correlating sensors in a second ensemble detect a second correlation different from the first correlation, there is an increased likelihood that the situation to which the first ensemble of sensors is exposed to is different from the situation to which the third ensemble of sensors are exposed to.

Sensors of a sensor ensemble may collaborate with one another. The collaboration may comprise considering sensor data of another sensor (e.g., of a different type) in the ensemble. The collaboration may comprise trends projected by the other sensor (e.g., type) in the ensemble. The collaboration may comprise trends projected by data relating to another sensor (e.g., type) in the ensemble. The other sensor data can be derived from the other sensor in the ensemble, from sensors of the same type in other ensembles, or from data of the type collected by the other sensor in the ensemble, which data does not derive from the other sensor. For example, a first ensemble may include a pressure sensor and a temperature sensor. The collaboration between the pressure sensor and the temperature sensor may comprise considering pressure sensor data while analyzing and/or projecting temperature data of the temperature sensor in the first ensemble. The pressure data may be (i) of a pressure sensor in the first ensemble, (ii) of pressure sensor(s) in one or more other ensembles, (iii) pressure data of other sensor(s) and/or (iv) pressure data of a third party.

Figure 12:
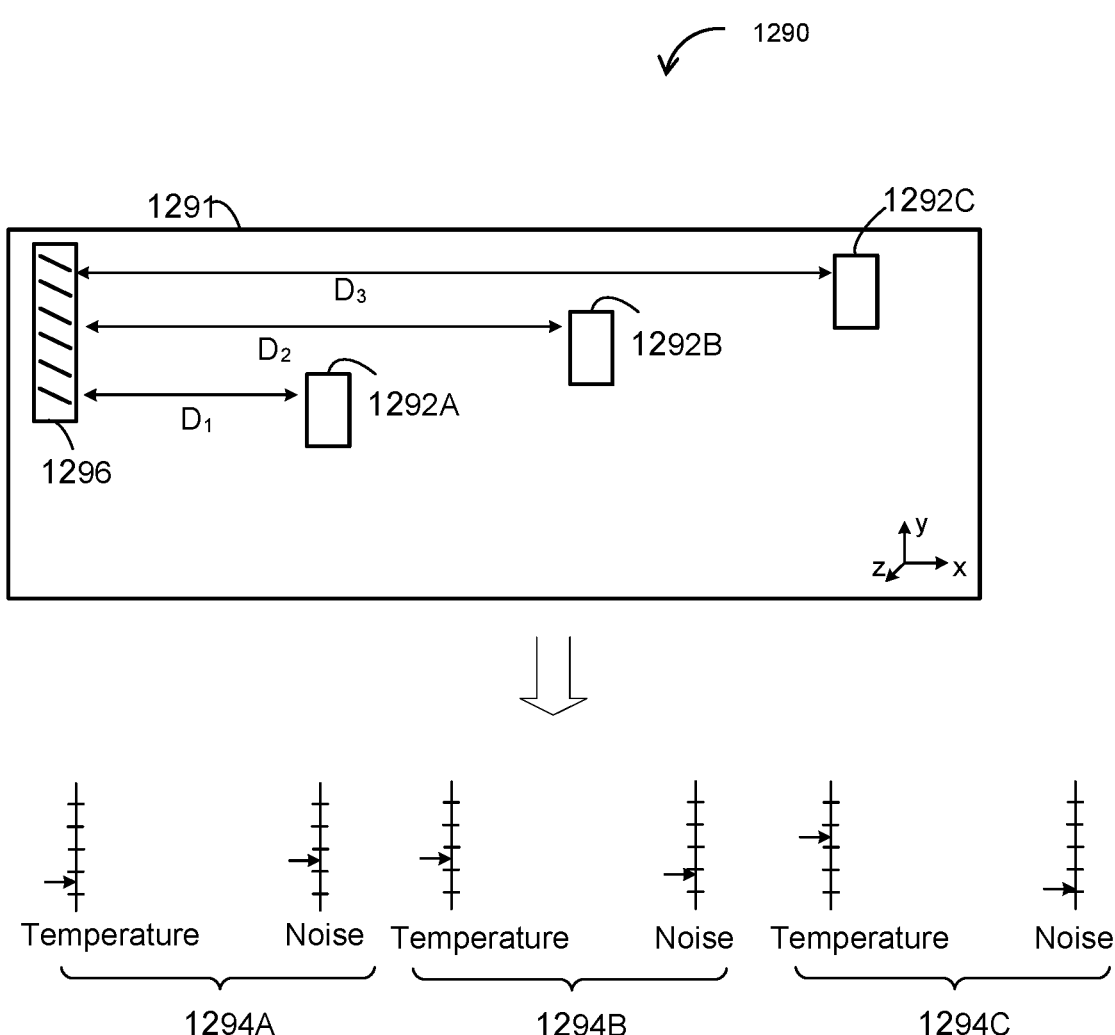
FIG. 12 shows a schematic example of sensor arrangement and sensor data.

In some embodiments, sensor ensembles, are distributed throughout an enclosure. Sensors of a same type may be dispersed in an enclosure, e.g., to allow measurement of environmental parameters at various locations of an enclosure. Sensors of the same type may measure a gradient along one or more dimensions of an enclosure. A gradient may include a temperature gradient, an ambient noise gradient, or any other variation (e.g., increase or decrease) in a measured parameter as a function of location from a point. A gradient may be utilized in determining that a sensor is providing erroneous measurement (e.g., the sensor has a failure). FIG. 12 shows an example of a diagram 1290 of an arrangement of sensor ensembles in an enclosure. In the example of FIG. 12, sensor ensemble 1292A is positioned at a distance $D_1$ from vent 1296. Sensor ensemble 1292B is positioned at a distance $D_2$ from vent 1296. Sensor ensemble 1292C is positioned at a distance $D_3$ from vent 1296. Temperature and noise measurements made by sensor ensemble 1292A are shown by output reading profile 1294A. Output reading profile 1294A indicates a relatively low temperature and a significant amount of noise. Temperature and noise measurements made by sensor ensemble 1292B are shown by output reading profile 1294B. Output reading profile 1294B indicates a somewhat higher temperature, and a somewhat reduced noise level. Temperature and noise measurements made by sensor ensemble 1292C are shown by output reading profile 1294C. Output reading profile 1294C indicates a temperature somewhat higher than the temperature measured by sensor ensemble 1292B and 1292A. Noise measured by sensor ensemble 1292C indicates a lower level than noise measured by sensor ensemble 1292A and 1292B. In an example, if a temperature measured by sensor ensemble 1292C indicates a lower temperature than a temperature measured by sensor ensemble 1292A, one or more processors and/or controllers may identify sensor ensemble 1292C sensor as providing erroneous data.

In another example of a temperature gradient, a temperature sensor installed near a window may measure increased temperature fluctuations with respect to temperature fluctuations measured by a temperature sensor installed at a location opposite the window. A sensor installed near a midpoint between the window and the location opposite the window may measure temperature fluctuations in between those measured near a window with respect to those measured at the location opposite the window. In an example, an ambient noise sensor installed near an air conditioning (or near a heating vent) may measure greater ambient noise than an ambient noise sensor installed away from the air conditioning or heating vent.

In some embodiments, a sensor of a first type cooperates with a sensor of a second type. In an example, an infrared radiation sensor may cooperate with a temperature sensor. Cooperation among sensor types may comprise establishing a correlation (e.g., negative or positive) among readings from sensors of the same type or of differing types. For example, an infrared radiation sensor measuring an increase in infrared energy may be accompanied by (e.g., positively correlated to) an increase in measured temperature. A decrease in measured infrared radiation may be accompanied by a decrease in measured temperature. In an example, an infrared radiation sensor measuring an increase in infrared energy that is not accompanied by a measurable increase in temperature, may indicate failure or degradation in operation of a temperature sensor.

In some embodiments, one or more sensors are included in an enclosure. For example, an enclosure may include at least 1, 2, 4, 5, 8, 10, 20, 50, or 500 sensors. The enclosure may include a number of sensors in a range between any of the aforementioned values (e.g., from about 1 to about 1000, from about 1 to about 500, or from about 500 to about 1000). The sensor may be of any type. For example, the sensor may be configured (e.g., and/or designed) to measure concentration of a gas (e.g., carbon monoxide, carbon dioxide, hydrogen sulfide, volatile organic chemicals, or radon). For example, the sensor may be configured (e.g., and/or designed) to measure ambient noise. For example, the sensor may be configured (e.g., and/or designed) to measure electromagnetic radiation (e.g., RF, microwave, infrared, visible light, and/or ultraviolet radiation). For example, the sensor may be configured (e.g., and/or designed) to measure security-related parameters, such as (e.g., glass) breakage and/or unauthorized presence of personnel in a restricted area. Sensors may cooperate with one or more (e.g., active) devices, such as a radar or lidar. The devices may operate to detect physical size of an enclosure, personnel present in an enclosure, stationary objects in an enclosure and/or moving objects in an enclosure.

In some embodiments, the sensor is operatively coupled to at least one controller. The coupling may comprise a communication link. A communications link (e.g., FIG. 11, 1108) may comprise any suitable communications media (e.g., wired and/or wireless). The communication link may comprise a wire, such as one or more conductors arranged in a twisted-pair, a coaxial cable, and/or optical fibers. A communications link may comprise a wireless communication link, such as Wi-Fi, Bluetooth, ZigBee, cellular, or optical. One or more segments of the communications link may comprise a conductive (e.g., wired) media, while one or more other segments of a communications link may comprise a wireless link.

In some embodiments, the enclosure is a facility (e.g., building). The enclosure may comprise a wall, a door, or a window. In some embodiments, at least two enclosures of a plurality of enclosures are disposed in the facility. In some embodiments, at least two enclosures of a plurality of enclosures are disposed different facilities. The different facilities may be a campus (e.g. and belong to the same entity). At least two of the plurality of enclosures may reside in the same floor of the facility. At least two of the plurality of enclosures may reside in different floors of the facility. Enclosures of shown in FIG. 12, such as enclosures A, B, C, and Z, may correspond to enclosures located on the same floor of a building, or may correspond to enclosures located on different floors of the building. Enclosures of FIG. 12 may be located in different buildings of a multi-building campus. Enclosures of FIG. 12 may be located in different campuses of a multi-campus neighborhood.

In some embodiments, following installation of a first sensor, a sensor performs self-calibration to establish an operating baseline. Performance of a self-calibration operation may be initiated by an individual sensor, a nearby second sensor, or by one or more controllers. For example, upon and/or following installation, a sensor deployed in an enclosure may perform a self-calibration procedure. A baseline may correspond to a lower threshold from which collected sensor readings may be expected to comprise values higher than the lower threshold. A baseline may correspond to an upper threshold, from which collected sensor readings may be expected to comprise values lower than the upper threshold. A self-calibration procedure may proceed beginning with sensor searching for a time window during which fluctuations or perturbations of a relevant parameter are nominal. In some embodiments, the time window is sufficient to collect sensed data (e.g., sensor readings) that allow separation and/or identification of signal and noise form the sensed data. The time window may be predetermined. The time window may be non-defined. The time window may be kept open (e.g., persist) until a calibration value is obtained.

Figure 13:
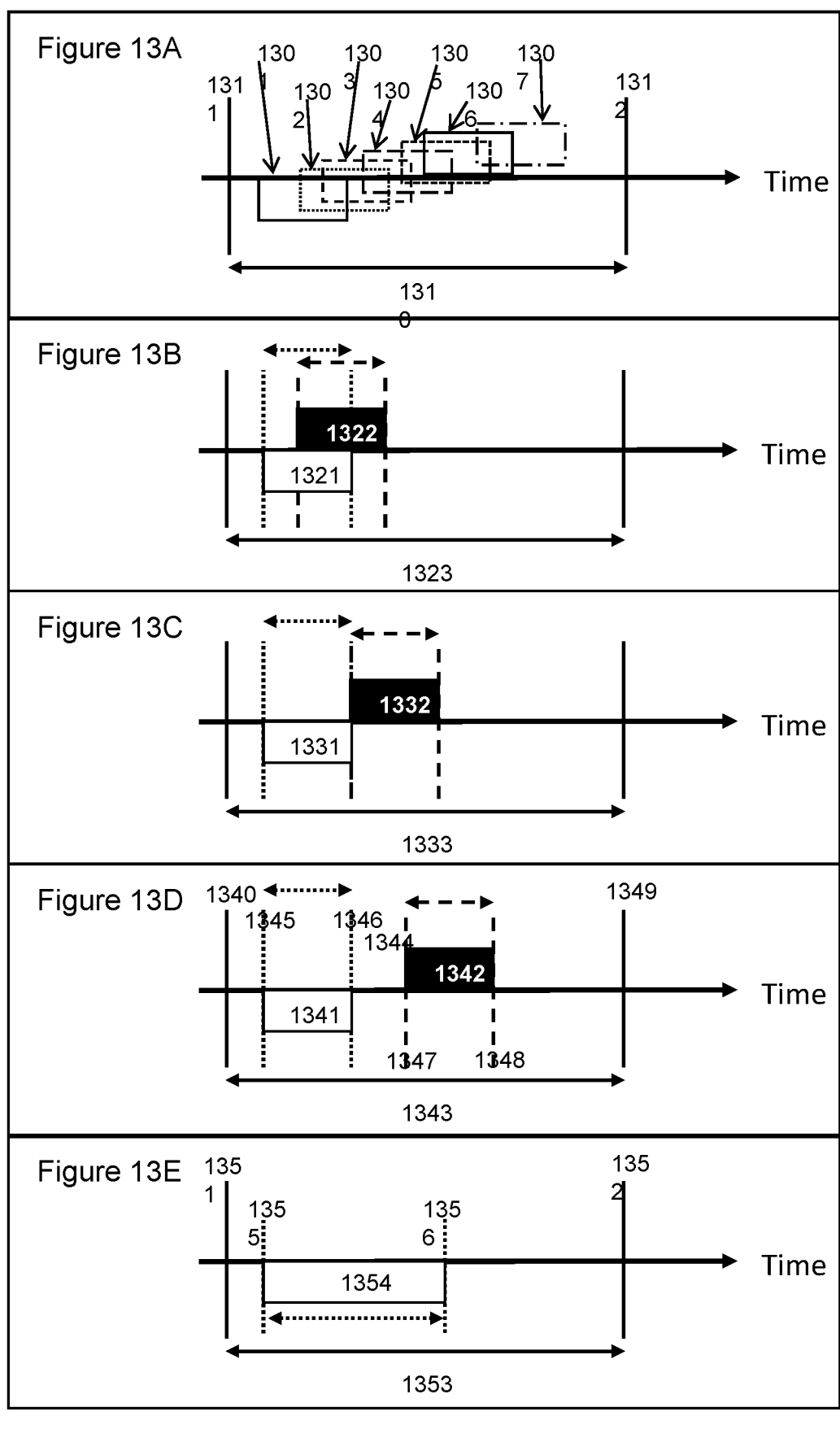
FIGS. 13A-13E show time dependent graphs.

In some embodiments, a sensor may search for an optimal time to measure a baseline (e.g., in a time window). The optimal time (e.g., in the time window) may be a time span during which (i) the measured signal is most stable and/or (ii) the signal to noise ratio is highest. The measured signal may contain some level of noise. A complete absence of noise may indicate malfunction of the sensor or inadequacy for the environment. The sensed signal (e.g., sensor data) may comprise a time stamp of the measurement of the data. The sensor may be assigned a time window during which it may sense the environment. The time window may be predetermined (e.g., using third party information and/or historical data concerning the property measured by the sensor). The signal may be analyzed during that time window, and an optimal time span may be found in the time window, in which time span the measured signal ism most stable and/or the signal no noise ratio is highest. The time span may be equal to, or shorter than, the time window. The time span may occur during the entire, or during part of the time window. FIG. 13E shows an example of a time windows 1353 is indicated having a start time 1351 and an end time 1352. In the time window 1353, a time span 1354 is indicated, having a start time 1355 and an end time 1356. The sensor may sense a property which it is configured to sense (e.g., VOC level) during the time window 1353 for the purpose of finding a time span during which an optimal sensed data (e.g., optimal sensed data set) is collected, which optimal data (e.g., data set) has the highest signal to noise ratio, and/or indicates collection of a stable signal. The optimal sensed data may have a (e.g., low) level of noise (e.g., to negate a malfunctioning sensor). For example, a time window may be 12 hours between 5 PM and 5 AM. During that time span, sensed VOC data is collected. The collected sensed data set may be analyzed (e.g., using a processor) to find a time span during the 12 h, in which there is a minimal noise level (e.g., indicating that the sensor is functioning) and (i) a highest signal to noise ratio (e.g., the signal is distinguishable) and/or (ii) the signal is most stable (e.g., has a low variability). This time may be of a 1 h duration between 4 AM and 5 AM. In this example, the time window is 12 h between 5 PM and 5 AM, and the time span is 1 h between 4 AM and 5 AM.

In some embodiments, finding the optimal data (e.g., set) to be used for calibration comprises comparing sensor data collected during time spans (e.g., in the time window). In the time window, the sensor may sense the environment during several time spans of (e.g., substantially) equal duration. A plurality of time spans may fit in the time window. The time spans may overlap, or not overlap. The time spans may contract each other. Data collected by the sensors in the various time spans may be compared. The time span having the highest signal to noise and/or having the most stable signal, may be selected as determining the baseline signal. For example, the time window may include a first time span and a second time span. The first time span (e.g., having a first duration, or a first time length) may be shorter than the time windows. The second time span (e.g., having a second duration) may be shorter than the time windows. In some embodiments, evaluating the sensed data (e.g., to find the optimal sensed data used for calibration) comprises comparing a first sensed data set sensed (e.g., and collected) during the first time span, with a second sensed data set sensed (e.g., and collected) during the second time span. The length of the first time span may be different from the length of the second time span. The length of the first time span may be equal (or substantially equal) to the length of the second time span. The first time span may have a start time and/or end time, different than the second time span. The start time and/or end time of the first time span and of the second time span may be in the time window. The start time of the first time span and/or of the second time span, may be equal to the start time of the time window. The end time of the first time span and/or of the second time span, may be equal to the end time of the time window. FIG. 13D shows an example of a time window 1343 having a start time 1340 and an end time 1349, a first time window 1341 having a start time 1345 and an end time 1346, and a second time window 1342 having a start time 1347 and an end time 1348. In the example shown in FIG. 13D, start times 1345 and 1347 are in the time window 1343, and end times 1346 and 1348 are in the time window 1343.

FIGS. 13A-13D show examples of various time windows that include time spans. FIG. 13A depicts a time lapse diagram in which a time window 1310 is indicated having a start time 1311 and an end time 1312. In the time window 1310, various time spans 1301-1307 are indicated, which time spans overlap each other. The sensor may sense a property which it is configured to sense (e.g., humidity, temperature, or $CO_2$ level) during at least two of the time spans (e.g., of 1301-1307), e.g., for the purpose of comparing the signal to find at time at which the signal is most stable and/or has a highest signal to noise ratio. For example, the time window (e.g., 1301) may be a day, and the time span may be 50 minutes. The sensor may measure a property (e.g., $CO_2$ level) during overlapping periods of 50 minutes (e.g., during the collective time 1301-1307), and the data may later on be divided into distinct (overlapping) 50 minutes, e.g., by using the time stamped measurements. The 50 minutes that indicates the stables $CO_2$ signal (e.g., at night) and/or having the highest signal to noise, may be designated as an optimal time for measuring a baseline $CO_2$ signal. The signal measured may be selected as a baseline for the sensor. Once the optimal time span has been selected, other $CO_2$ sensors (e.g., in other locations) can utilize this time span for baseline determination. Finding of the optimal time for baseline determination can speed up the calibration process. Once the optimal time has been found, other sensors may be programmed to measure signal at the optimal time to record their signal, which may be used for baseline calibration. FIG. 13B depicts a time lapse diagram in which a time window 1323 is indicated, during which two time spans 1321 and 1322 are indicated, which time spans overlap each other. FIG. 13C depicts a time lapse diagram in which a time window 1333 is indicated, during which two time spans 1331 and 1332 are indicated, which time spans contact each other, that is, ending of the first time span 1331 is the beginning of the second time span 1332. FIG. 13D depicts a time lapse diagram in which a time window 1343 is indicated, during which two time spans 1341 and 1342 are indicated, which time spans are separate by a time gap 1344.

In an example, for a carbon dioxide sensor, a relevant parameter may correspond to carbon dioxide concentration. In an example, a carbon dioxide sensor may determine that a time window during which fluctuations in carbon dioxide concentration could be minimal corresponds to a two-hour period, e.g., between 5:00 AM and 7:00 AM. Self-calibration may initiate at 5:00 AM and continue while searching for a duration within these two hours during which measurements are stable (e.g., minimally fluctuating). In some embodiments, the duration is sufficiently long to allow separation between signal and noise. In an example, data from a carbon dioxide sensor may facilitate determination that a 5-minute duration (e.g., between 5:25 AM and 5:30 AM) within a time window between 5:00 AM and 7:00 AM forms an optimal time period to collect a lower baseline. The determination can be performed at least in part (e.g., entirely) at the sensor level. The determination can be performed by one or more processors operatively couple to the sensor. During a selected duration, a sensor may collect readings to establish a baseline, which may correspond to a lower threshold.

Figure 14:
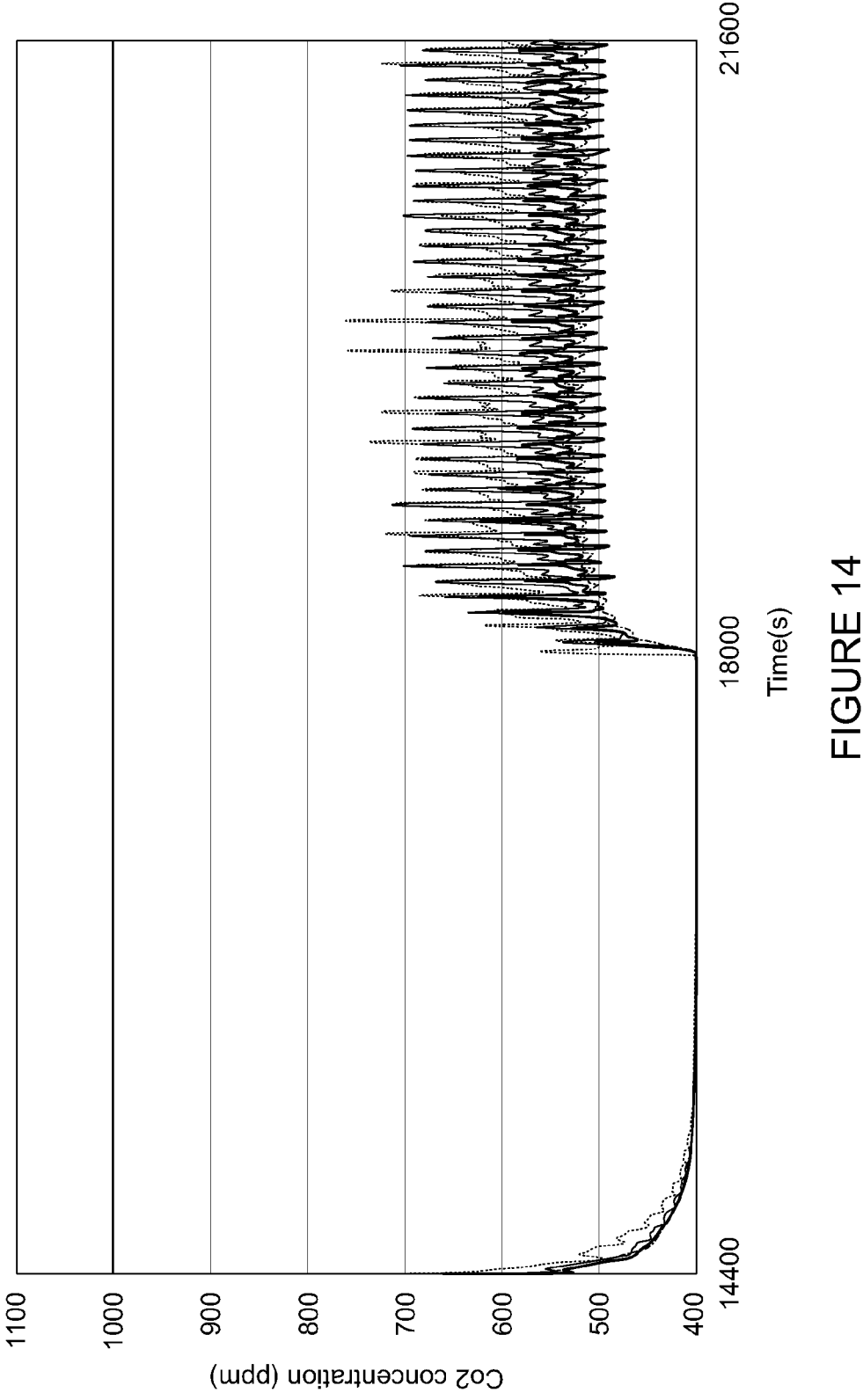
FIG. 14 depicts a time dependent graph of carbon dioxide concentrations.

In an example, for gas sensors disposed in a room (e.g., in an office environment), a relevant parameter may correspond to gas (e.g., $CO_2$) levels, where requested levels are in a range of about 1000 ppm or less. In an example, a $CO_2$ sensor may determine that self-calibration should occur during a time window where $CO_2$ levels are minimal such as when no occupants are in the vicinity of the sensor (e.g. see $CO_2$ levels before 18000 seconds in FIG. 14). Time windows during which fluctuations in $CO_2$ levels are minimal, may correspond to, e.g., a one-hour period during lunch from about 12:00 PM to about 1:00, and during closed business hours. FIG. 15 shows a contour map example of a horizontal (e.g., top) view of an office environment depicting various levels of $CO_2$ concentrations. The gas ($CO_2$) concentrations may be measured by sensors placed at various locations of the enclosure (e.g., office). The office environment may include a first occupant 1501, a second occupant 1502, a third occupant 1503, a fourth occupant 1504, a fifth occupant 1505, a sixth occupant 1506, a seventh occupant 1507, an eighth occupant 1508, and a ninth occupant 1509. The gas ($CO_2$) concentrations may be measured by sensors placed at various locations of the enclosure (e.g., office).

In some examples, a source chemical component(s) of the atmosphere material (e.g., VOC) is located using a plurality of sensors in the room. A spatial profile indicating distribution of the chemical(s) in the enclosure may indicate various (e.g., relative or absolute) concentrations of the chemical(s) as a function of space. The profile may be a two or three dimensional profile. The sensors may be disposed in different locations of the room to allow sensing of the chemical(s) in different room locations. Mapping the (e.g., entire) enclosure (e.g., room) may require (i) overlap of sensing regions of the sensors and/or (i) extrapolating distribution of the chemical(s) in the enclosure (e.g., in regions of low or absence of sensor coverage (e.g., sensing regions)). For example, FIG. 15 shows an example of relatively steep and high concentration of carbon dioxide towards the location of occupant 1505, relative to low concentration 1510 in an unoccupied region of the enclosure. This can indicate that in position of the occupant 1505 there is a source of carbon dioxide expulsion. Similarly, one can find a location (e.g., source) of chemical removal by finding a (e.g., relatively steep) low concentration of a chemical in the environment. Relative is with respect to the general distribution of the chemical(s) in the enclosure.

In some examples, one or more sensors in the enclosure are VOC sensors. A VOC sensor can be specific for a VOC compound (e.g., as disclosed herein), or to a class of compounds (e.g., having similar chemical characteristic). For example, the sensor can be sensitive to aldehydes, esters, thiophenes, alcohols, aromatics (e.g., benzenes and/or toluenes), or olefins. In some example, a group of sensors (e.g., sensor array) sensed VOCs (e.g., having different chemical characteristics). The group of compound may comprise identified or non-identified compounds. The chemical sensor(s) can output a sensed value of a particular compound, class of compounds, or group of compounds. The sensor output may be of a total (e.g., accumulated) measurements of the class, or group of compounds sensed. The sensor output may be of a total (e.g., accumulated) measurements of multiple sensor outputs of (i) individual compounds, (ii) classes of compounds, or (iii) groups of compounds. The one or more sensors may output a total VOC output (also referred to herein as TVOC). Sensing can be over a period of time. The VOCs may derive from human or other sources, e.g., perspiration, aldehydes from carpet/furnishing, etc.

In some embodiments, at least one of the atmospheric components is a VOC. The atmospheric component (e.g., VOC) may include benzopyrrole volatiles (e.g., indole and skatole), ammonia, short chain fatty acids (e.g., having at most six carbons), and/or volatile sulfur compounds (e.g., Hydrogen sulfide, methyl mercaptan (also known as methanethiol), dimethyl sulfide, dimethyl disulfide and dimethyl trisulfide). The atmospheric component (e.g., VOC) may include 2-propanone (acetone), 1-butanol, 4-ethyl-morpholine, Pyridine, 3-hexanol, 2-methyl-cyclopentanone, 2-hexanol, 3-methyl-cyclopentanone, 1-methyl-cyclopentanol, p-cymene, Octanal, 2-methyl-cyclopentanol, Lactic acid, methyl ester, 1,6-heptadien-4-ol, 3-methyl-cyclopentanol, 6-methyl-5-hepten-2-one, 1-methoxy-hexane, Ethyl (−)-lactate, Nonanal, 1-octen-3-ol, Acetic acid, 2,6-dimethyl-7-octen-2-ol (dihydromyrcenol), 2-ethyl hexanol, Decanal, 2,5-hexanedione, 1-(2-methoxypropoxy)-2-propanol, 1,7,7-trimethylbicyclo[2.2.1]heptan-2-one (camphor), Benzaldehyde, 3,7-dimethyl-1,6-octadien-3-ol (linalool), 1-methyl hexyl acetate, Propanoic acid, 6-hydroxy-hexan-2-one, 4-cyanocyclohexene, 3,5,5-trimethylcyclohex-2-en-1-one (isophoron), Butanoic acid, 2-(2-propyl)-5-methyl-1-cyclohexanol (menthol), Furfuryl alcohol, 1-phenyl-ethanone (acetophenone), Isovaleric acid, Ethyl carbamate (urethane), 4-tert-butylcyclohexyl acetate (vertenex), p-menth-1-en-8-ol (alpha-terpineol), Dodecanal, 1-phenylethylester acetic acid, 2(5H)-furanone, 3-methyl, 2-ethylhexyl 2-ethylhexanoate, 3,7-dimethyl-6-octen-1-ol (citronellol), 1,1-oxybis-2-propanol, 3-hexene-2,5-diol, 3,7-dimethyl-2,6-octadien-1-ol (geraniol), Hexanoic acid, Geranylacetone, 2,4,6-tri-tert-butyl-phenol, Unknown, 2,6-bis(1,1-dimethylethyl)-4-(1-oxopropyhphenol, Phenyl ethyl alcohol, Dimethylsulphone, 2-ethyl-hexanoic acid, Unknown, Benzothiazole, Phenol, Tetradecanoic acid, 1-methylethyl ester (isopropyl myristate), 2-(4-tertbutylphenyl)propanal (p-tert-butyl dihydrocinnamaldehyde), Octanonic acid, α-methyl-β-(p-tert-butylphenyl)propanal (lilial), 1,3-diacetyloxypropan-2-yl acetate (triacetin), p-cresol, Cedrol, Lactic acid, Hexadecanoic acid, 1-methylethyl ester (isopropyl palmitate), 2-hydroxy, hexyl ester benzoic acid (hexyl salicylate), Palmitic acid, ethyl ester, Methyl 2-pentyl-3-oxo-1-cyclopentyl acetate (methyl dihydrojasmonate or hedione), 1,3,4,6,7,8-hexahydro-4,6,6,7,8, 8-hexamethyl-cyclopenta-gamma-2-benzopyran (galaxolide), 2-ethylhexylsalicylate, Propane-1,2,3-triol (glycerin), Methoxy acetic acid, dodecyl ester, α-hexyl cinnamaldehyde, Benzoic acid, Dodecanoic acid, 5-(hydroxymethyl)-2-furaldehyde, Homomethylsalicylate, 4-vinyl imidizole, Methoxy acetic acid, tetradecyl ester, Tridecanoic acid, Tetradecanoic acid, Pentadecanoic acid, Hexadecanoic acid, 9-hexadecanoic acid, Heptadecanoic acid, 2,6,10,15,19,23-hexamethyl-2,6,10,14,18,22-tetracosahexaene (squalene), Hexadecanoic acid, and/or 2-hydroxyethylester.

In an example, for an ambient noise sensor disposed in a crowded area such as a cafeteria, a relevant parameter may correspond to sound pressure (e.g., noise) level measured in decibels above background atmospheric pressure. In an example, an ambient noise sensor may determine that self-calibration should occur during a time window while fluctuations in sound pressure level are minimal. A time window while fluctuations in sound pressure are minimal may correspond to a one-hour period from about 12:00 AM to about 1:00 AM. Self-calibration may continue with the sensor determining a duration within a window during which may be made to establish a baseline (e.g., an upper threshold). In an example, an ambient noise sensor may determine that a 10-minute duration (e.g., from about 12:30 AM to about 12:40 AM) within a time window of from about 12:00 AM to about 1:00 AM forms an optimal time to collect an upper baseline, which may correspond to an upper threshold.

In some embodiments, one or more shortcomings in sensor operation may be at least partially corrected and/or alleviated by leveraging a correlation of sensor data between two or more sensor types to synergistically detect an attribute with increased accuracy, sensitivity, and/or speed relative to detection using fewer sensor types. Multiple sensors of one or more of the correlated sensor types may be used to yet further increase accuracy, sensitivity, and/or reliability of attribute detection.

An attribute detected using sensor synergy as described herein may comprise a measurable value obtained by one or more sensors and/or data derived therefrom, such as a status or state of an enclosure or environment, and/or activity occurring therein. Sensor data processing may be performed as elsewhere herein, including the use of one or more learning techniques (machine learning, AI, etc.) and/or rule-based or heuristic techniques to detect an attribute. Detection of various attributes (described in more detail hereafter) using sensor synergy can lead to, among other things, increased efficiency in facility management. For example, the cleaning of a particular restroom in a facility may be dynamically driven by detected events (e.g., detected usage of the restroom), rather than by a static schedule. The cleaning of the restroom itself may be detected, enabling building management software to dynamically (e.g., automatically) track and schedule the cleaning of the restroom.

FIG. 16 shows a table 1600 providing example attributes that may be detected using sensor synergy, according to some embodiments. In the table 1600, sensors include sensors capable of measuring temperature (e.g., a thermometer), relative humidity, $CO_2$, VOC, lux (e.g., light), Correlated Color Temperature (CCT), and sound pressure level (SPL). Alternative embodiments may have other sensor types. Different attributes are listed in each row of the table 1600, and cells marked with an "X" indicate which sensor types may be used to determine the respective attribute for that row. As shown, different combinations of sensors can be used to determine different types of attributes. For example, $CO_2$ and SPL sensors can be used to detect an occupancy status (e.g., whether a room or spaces occupied) or occupancy number. Lux and SPL sensors can be used to detect noises or lights that are loud (e.g., having a volume or brightness exceeding a threshold) or troublesome; $CO_2$, VOC, and SPL sensors can be used to determine whether a cleaning is in progress (e.g., by detecting $CO_2$ from a human occupant, chemicals from chemical cleaners, noise from a vacuum or other cleaning device, etc.); and so forth. Other embodiments may use other sensor combinations. In some embodiments, for example, one or more CO sensors can be used to detect the presence of a gas-fueled appliance and/or vehicle.

Figure 17A:
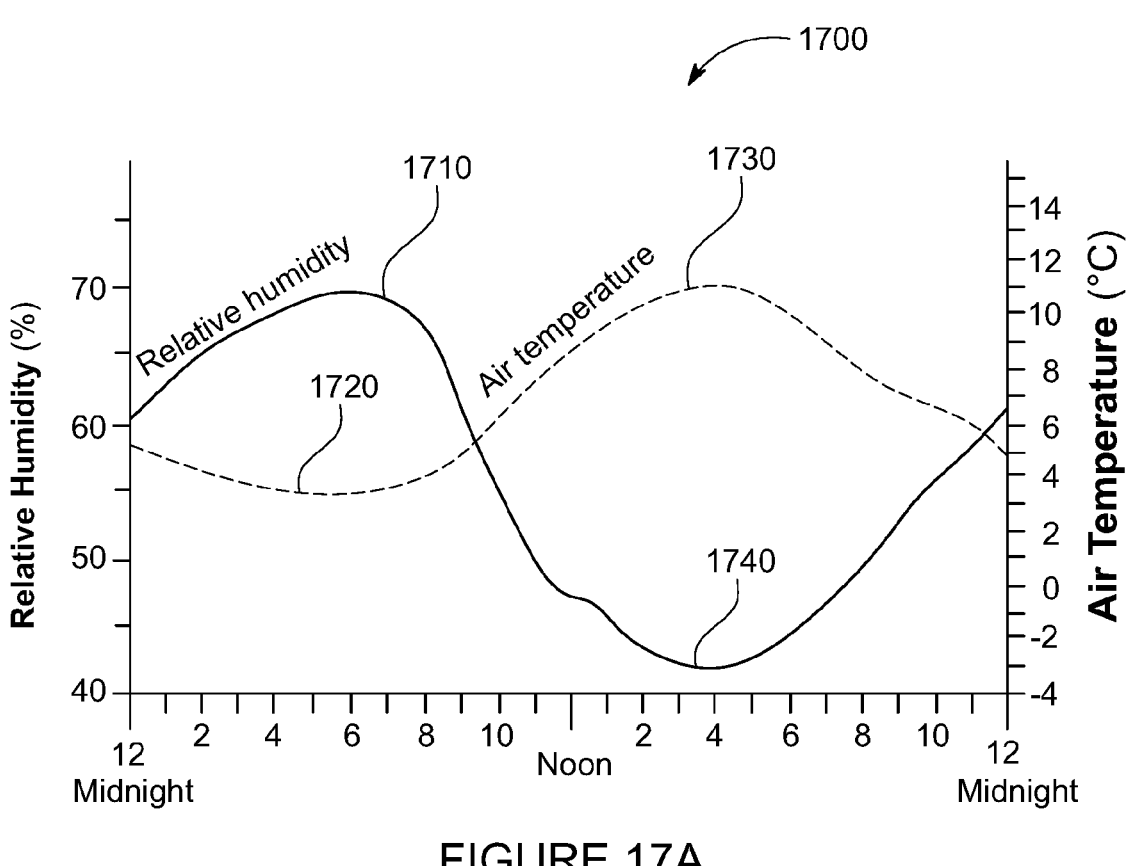
FIGS. 17A and 17B show graphs that illustrate a relationship between relative humidity and air temperature in an example environment.
Figure 17B:
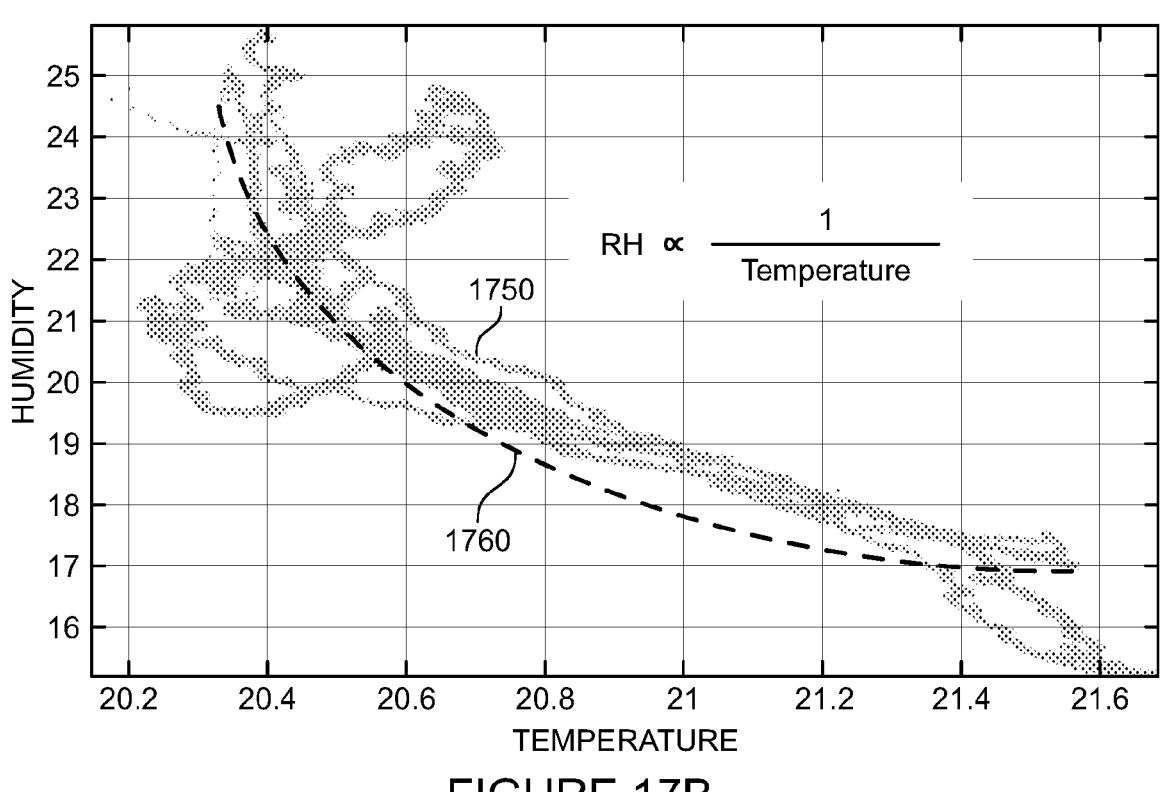

Under normal operational conditions, environmental factors in a particular environment (e.g., room, lobby, or other area related to a facility) that may be detected by one or more sensors may have a natural state or operating range (e.g., baseline values). In some cases, the environmental factors may also have natural relationships with each other. FIG. 17A, for example, shows a graph 1700 that illustrates an inverse relationship that humidity and temperature have, in a particular example. Specifically, a rise in relative humidity 1710 and a fall in air temperature 1720 are correlated in time, as are a rise in air temperature 1730 and a fall in relative humidity 1740. FIG. 17B further illustrates this inverse relationship between relative humidity (RH) and temperature by showing a plot of actual measurements 1750 of humidity and temperature and a curve 1760 derived from the measurements, which can be used to model the relationship of relative humidity and temperature. Because the nature of at least some types of such relationships may be at least partially dependent on the type of environment, a model (e.g., curve 1760) may be determined on a per-environment basis, based on sensor data from the environment and/or similar environments in which the relationship has been modeled. An environment from which a relationship has been modeled may be determined to be "similar" based on features and/or aspects of the environment that may have an effect on the relationship, such as room size, HVAC features (e.g., number or location of vent(s)), window information (e.g., size, location, transmissivity, orientation (e.g., with respect to the sun), or number), construction material information (e.g., material type or insulation rating), and the like. Additional details regarding similar environments are provided hereafter. Relationships between more than two sensors may also exist. Thus, in some embodiments, a relationship is determined between at least two sensors, three sensors, four sensors, five sensors, 10 sensors, or the like, in which case a multi-dimensional model (e.g., similar to curve 1760, using additional dimensions) may be determined from the relationship of the more than two sensors.

Various automated and/or human activities in an environment may disrupt the natural state or operating range (baseline) of environmental factors. Thus, according to some embodiments, an attribute (e.g., status or activity) may be detected from the sensor data indicative of a departure of an environmental factor from the natural state or operating range. For example, a model (e.g., curve 1760) of a relationship between values measured by different sensor types can be made from sensor data of an environment during normal operating conditions (e.g., when the environment is unoccupied) and subsequently used as a reference to detect an attribute of the environment based on the departure of the measured values (e.g., beyond a threshold) from the model representing the normal operating conditions. To do so, sensor data may be obtained from sensors and outlier detection (e.g., outlier detection as used for self-calibration described herein) then may be performed in which the measured values are compared with the model. To help ensure sensors are properly calibrated, this outlier detection may be performed if sensor data is obtained from sensors within a threshold time and/or operating range after calibration, if outlier data is confirmed using sensor data from multiple sensors of the same type, or if data is obtained from a sensor that does not otherwise need calibration. Again, outlier detection can be performed using learning-based techniques (e.g., machine learning or AI) or rule-based techniques (e.g., heuristic analysis).

Figure 18:
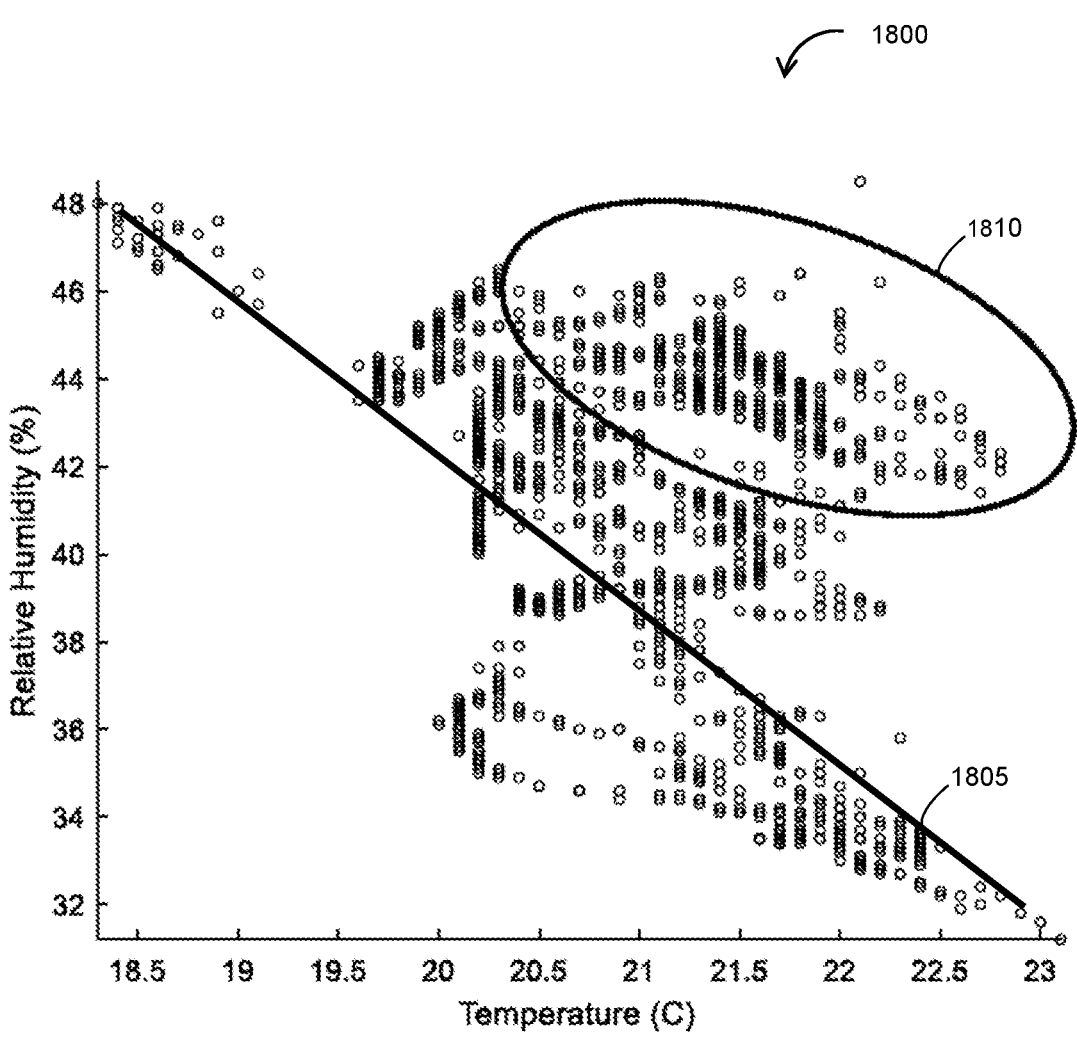
FIG. 18 shows an example graph of relative humidity and temperature.

FIG. 18 shows an example graph 1800 in which measured values of relative humidity and temperature over a period of time are used to determine occupancy in a room. In particular, measured values (represented as small circles in FIG. 18) are compared with a model 1805 representing a natural state of the room. Outlier detection is used to determine outlier values 1810 indicating higher values for temperature and/or relative humidity (e.g., beyond a threshold) than those obtained while the room is in a natural state. These outlier values 1810, which are a result of the presence of one or more human occupants in the room, may be associated with occupancy in the room based on a previously-established relationship of such values (e.g., during training of a machine learning model or based on similar values in other rooms). The number of occupants in the room may be obtained based on information such as the degree to which outlier values 1810 depart from the model 1805 and/or other related information (e.g., time information indicative of a rate of relative humidity and/or temperature increase).

Because different sensors have different sampling rates and detention times, the detection of different attributes may be made on different timescales. A light sensor, for example, may be sampled at a relatively fast rate (e.g., compared with other sensor types) and may be capable of determining a change in light at a similarly fast rate (e.g., on a scale of milliseconds or seconds). A sensor measuring relative humidity, on the other hand, may be sampled at a relatively slow rate and may be capable of determining a change in humidity at a similarly slow rate (e.g., on a scale of minutes or tens of minutes). Thus, detecting an attribute may occur on a relatively long time scale if detected using a relatively slow sensor alone.

Figure 19:
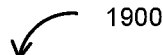
FIG. 19 shows a table of example timescales for different sensors.

FIG. 19 shows a table 1900 of timescales for different sensors in an example sensing system. In the table 1900, the sensor response row indicates timescales of sensor output (e.g., periodicity of sensor output) of the example sensing system. Rows for natural state inputs and human activity inputs indicate timescales of rates of change of sensor data under conditions in which the environment is in a natural state (e.g., no human activity) and when human activity is occurring in the environment, respectively. (For example, a detectable change in $CO_2$ levels may occur over the course of 1-5 minutes when human activity is occurring in the environment, whereas a similar change in $CO_2$ may take up to an hour if the environment is in its natural state). As shown in table 1900, lux, CCT, and SPL sensors have quick sensor response times (e.g., 30 seconds) corresponding with quick input timescales (e.g., 1-5 or 1-10 seconds) relative to the timescales of response times (e.g., 5-10 minutes) and inputs (e.g., up to one hour) of temperature, relative humidity, $CO_2$, and VOC sensors. Thus, detecting an attribute of an environment using a temperature, relative humidity, $CO_2$, or VOC sensor may occur on a relatively long timescale relative to an attribute of the environment detected using a lux, CCT, or SPL sensors.

In some embodiments, one or more sensor types with relatively fast sensor response times can be used in a synergistic with one or more sensor types having relatively slow response times to reduce a timescale at which an attribute is detected. In particular, by leveraging a relationship of environmental factors (e.g., similar to the relationship shown in FIGS. 17A and 17B) sensed by fast and slow sensors, embodiments may detect an attribute using the fast and slow sensors synergistically on a timescale much faster than detection of the attribute using slow sensors alone. In some embodiments, pattern recognition (e.g., using machine learning, AI, or the like) may be performed on sensor data from two or more sensor types of an environment to determine relationships between sensor types and model natural state sensor data (e.g., the in a manner discussed with regard to FIGS. 17A and 17B). Embodiments may further use pattern recognition to detect certain attributes associated with departures from natural state sensor data. By using sensor data from sensor types having a relatively fast response times, some attributes may be detected more quickly than they would otherwise be detected utilizing sensor data from sensor types having relatively slow response times. According to some embodiments, attributes may be detected with more certainty using multiple sensor types than with a single sensor type.

Figure 20:
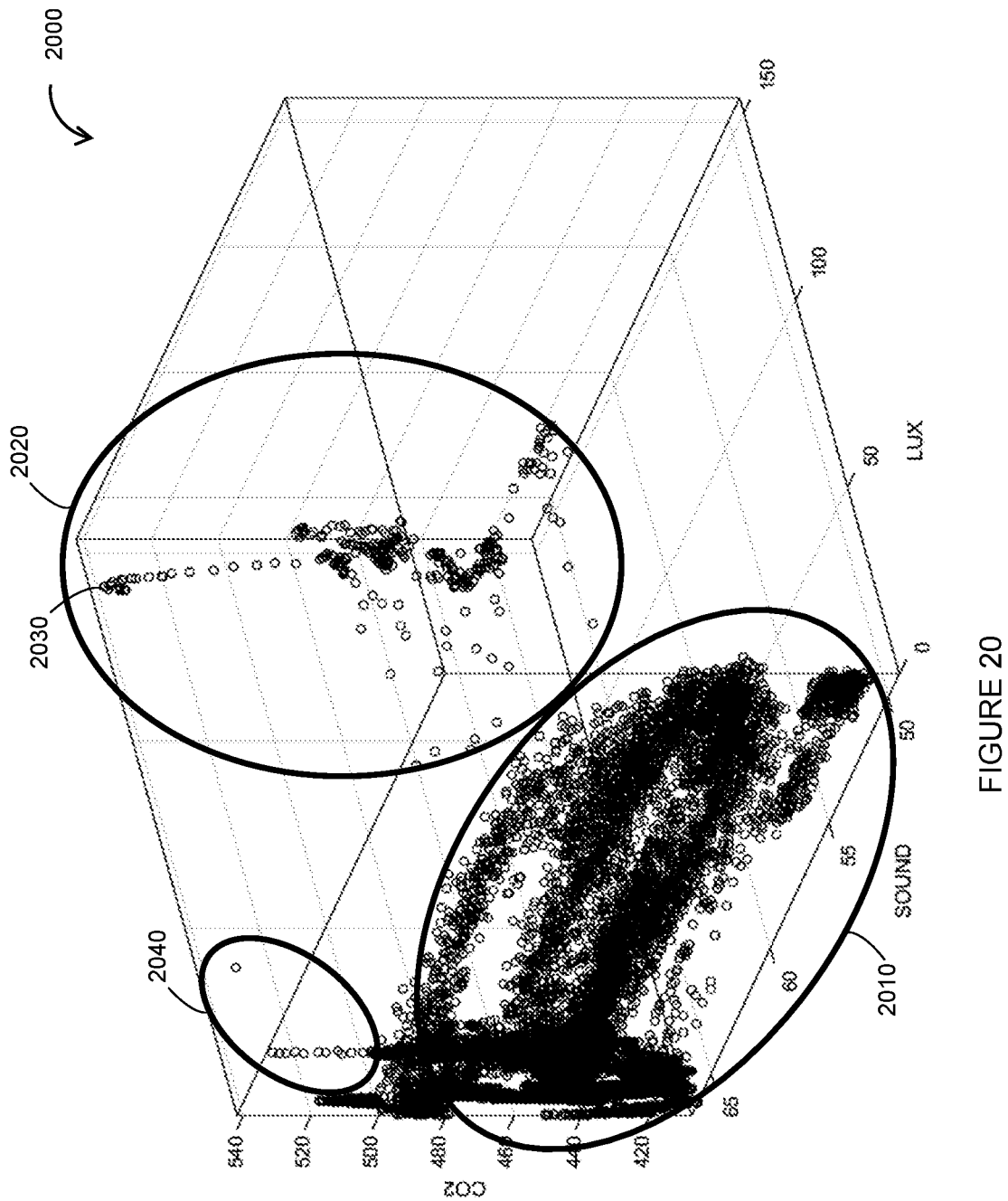
FIG. 20 shows an example graph plotting sensor data obtained from three sensor types.

FIG. 20 shows a graph 2000 in which data from three sensor types in a room over the course of one day are plotted, where data is obtained every 30 seconds. The three sensor types comprise $CO_2$ (with values shown in parts per million (PPM)), lux, and SPL (sound, with value shown in decibels) sensors. Data values 2010 corresponds to values obtained by sensors when the room is unoccupied (e.g., in a natural state). As shown, sound and $CO_2$ values fluctuate when the room is unoccupied, due to, for example, and HVAC system turning on and off. Thus, occupancy of the room may be difficult to accurately detect or predict using data from $CO_2$ and SPL sensors alone. However, when coupled with a lux sensor, occupancy can be detected from values 2020 (e.g., using outlier detection in view of natural state data values 2010). In particular, data from the lux sensor can be used to detect when a person turns on a light when entering a room, and the sound and $CO_2$ sensors can be used to detect whether the person stays in the room. In the example shown in the graph 2000, the person stays in the room, which elevates the $CO_2$ values until they peak at 2030, after which the person turns the light off when exiting the room, and the peak $CO_2$ values then begin to drop (as shown by values 2040).

The data in graph 2000 illustrate how sensor synergy can be used to increase the accuracy and reduce detection time for detecting the attribute that the room is occupied. In particular, the use of lux sensor alone may result in relatively quick detection of the turning on of a light, but an erroneous determination that the room is occupied in cases where the light is on but no occupant is present (e.g., when a person turns on a light in the room and subsequently leaves without turning the light off). On the other hand, the use of a $CO_2$ sensor alone may allow for detection of an occupant based on $CO_2$ levels that may exceed $CO_2$ levels when the room is unoccupied (e.g., $CO_2$ levels at peak 2030 may exceed $CO_2$ levels in data values 2010), but may take a long time (relative to the lux sensor) to make the detection. However, lux and $CO_2$ sensors may be used synergistically to allow for occupant detection with increased accuracy and speed over using each sensor alone. For example, detection of an occupant entering a room may be based on pattern recognition where the lux sensor detects a light increase (e.g., due to a light in the room being turned on), followed by an increase in $CO_2$ levels (e.g. due to one or more occupants being in the room). Because the increased $CO_2$ levels are accompanied by the increase in light, the determination that an occupant is in the room may be made at a faster rate than with a $CO_2$ sensor alone. This is because the lux sensor readings provide additional certainty that an occupant is in the room. Otherwise, use of $CO_2$ levels alone would take longer to reach a similar certainty (waiting, for example, tens of minutes to ensure that an increase in $CO_2$ levels to exceed those of natural state data values 2010, or waiting to ensure that an increase in $CO_2$ levels is more than just sensor noise). The use of sound values from an SPL sensor, which may detect common sounds made by one or more occupants entering or exiting the room (e.g., a door opening or closing) can add additional certainty and/or speed to the occupancy detection based on readings from the $CO_2$ and lux sensors.

The use of sensor synergy to increase the accuracy and/or speed of attribute detection can be useful in a variety of ways. In the example of FIG. 20, for instance, faster detection of the occupancy in a room can be used to trigger an HVAC system in the room to help ensure $CO_2$ and temperature levels are comfortable for occupants. Increased accuracy of the occupancy detection can be used to determine patterns of occupancy, which can be used to accurately predict occupancy and, in turn, operate HVAC and/or other systems in a predictive manner.

Figure 21:
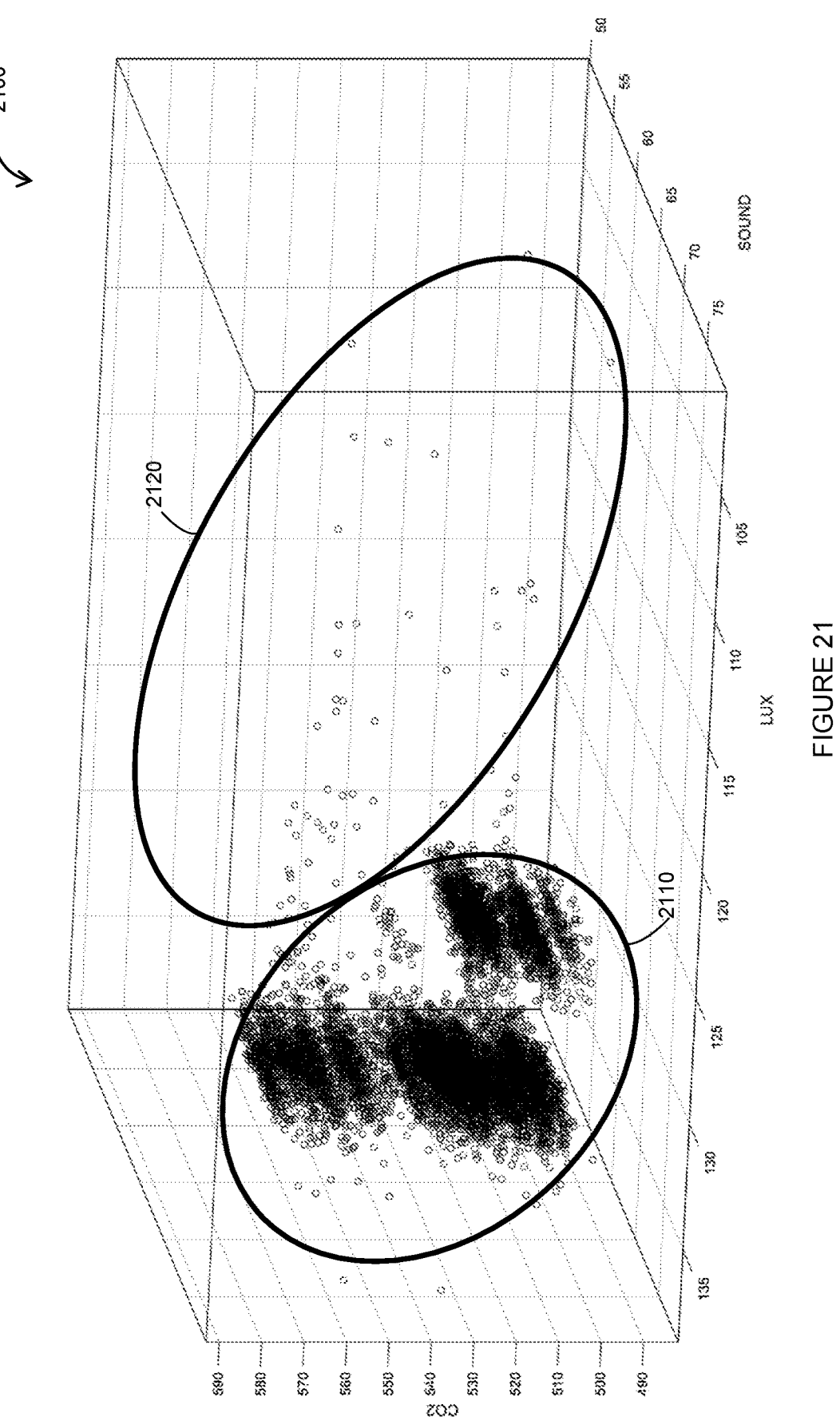
FIG. 21 shows another example graph plotting sensor data obtained from three sensor types.

FIG. 21 shows another example graph 2100 on which $CO_2$, lux, and SPL (sound) sensors are used together data from a room. This example includes a restroom with ambient music and the light, where the light changes between bright and dim settings, resulting in natural state sensor data values 2110 in which values for sound extend across a range, and values for light are generally bimodal. Anomalous values 2120 result primarily from light fluctuations occurring when people enter and exit the restroom, crossing in front of the light sensor. However, when synergistically coupled with sound data (e.g., a door opening or closing) and $CO_2$ data, detection of these anomalous values 2120 can be indicative of people entering and exiting the room with a high degree of certainty.

Figure 22:
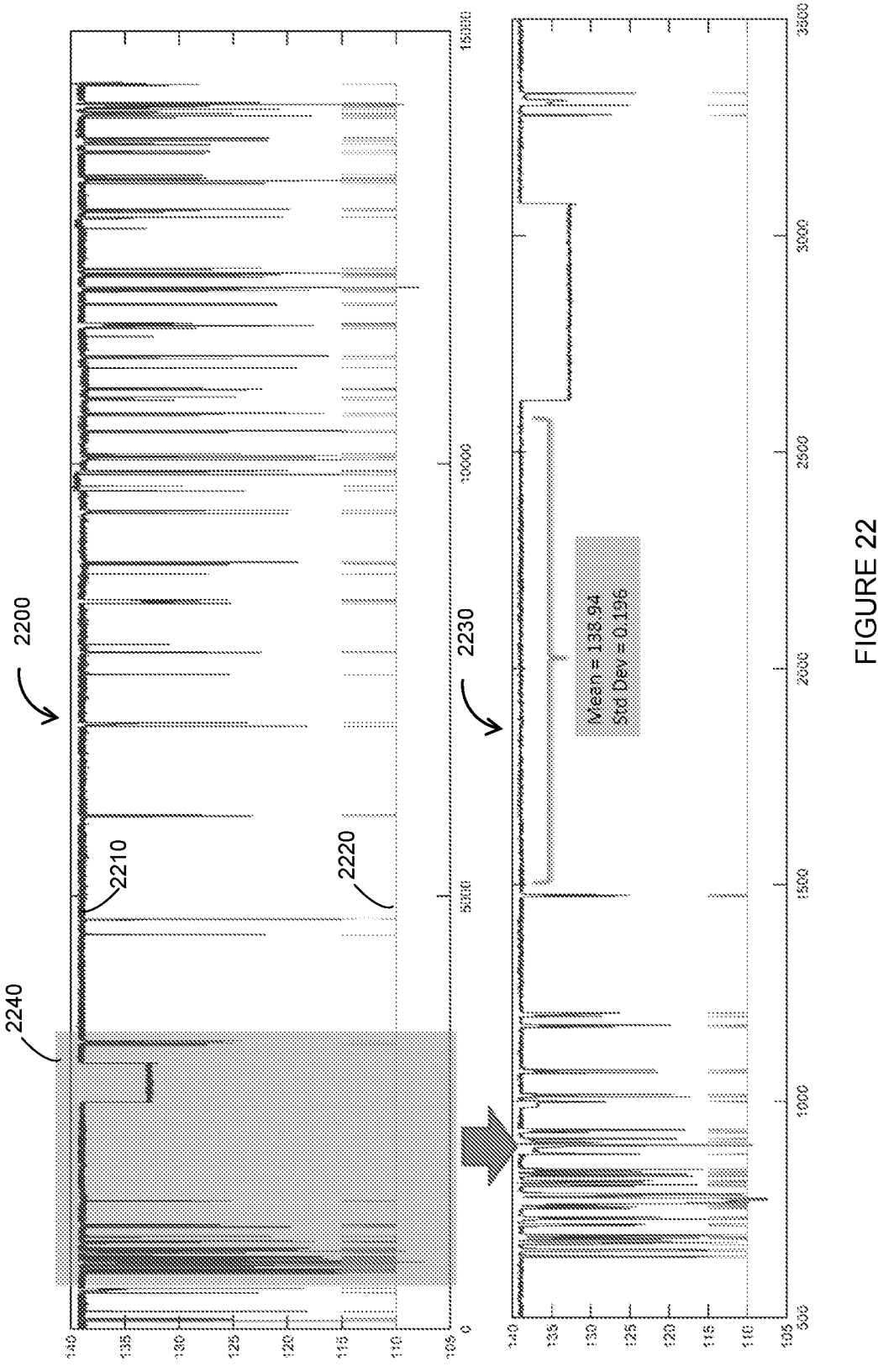
FIG. 22 shows timing diagrams illustrating sound and lux data values of the graph of FIG. 21 over time.
Figure 23:
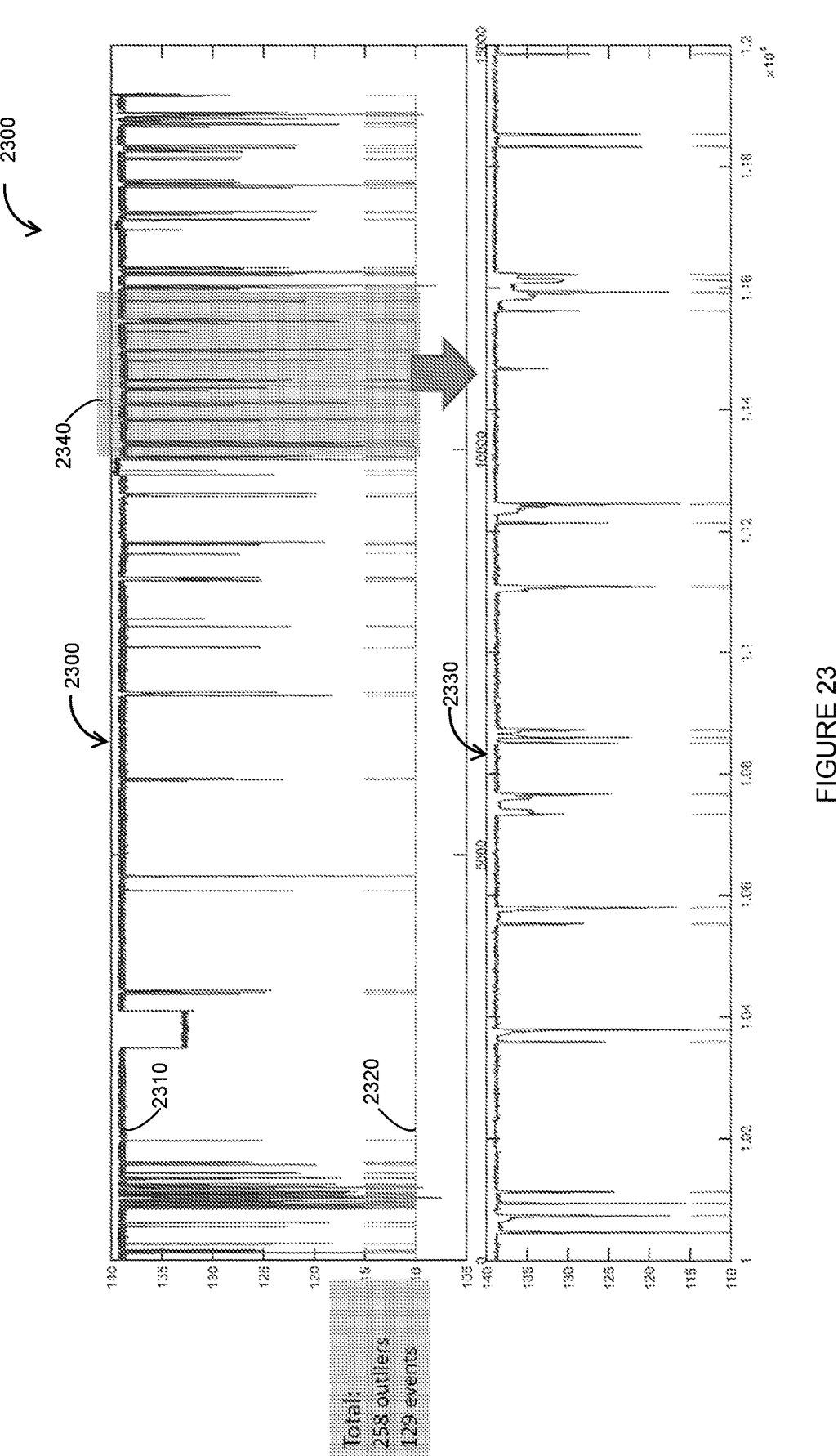
FIG. 23 shows additional timing diagrams illustrating sound and lux data values of the graph of FIG. 21 over time.

The relative timing of sensor data can be used to determine correlations between sensor types in a given environment and/or to detect an attribute (e.g., an event) of the environment. FIG. 22, for example, shows timing diagrams illustrating sound and lux data values of the graph 2100 of FIG. 21 over time. The upper diagram 2200 shows lux values 2210 and sound values 2220 over time, across 15,000 samples (where samples are taken at a frequency of 30 seconds). The lower diagram 2230 shows similar values across 3,500 samples representing a portion 2240 of the upper diagram 2200. Both diagrams 2200 and 2230 show downward spikes in lux values 2210 and upward spikes in sound values 2220 which correspond in time and represent fluctuations in light and sound as people enter and exit the room. These spikes correspond with anomalous values 2120 of FIG. 21. As another example, FIG. 23 shows timing diagrams similar to the timing diagrams of FIG. 22, where the upper diagram 2300 shows lux values 2310 and sound values 2320 over time, across 15,000 samples (the same as the upper diagram 2200 of FIG. 22). The lower diagram 2330 shows similar values across 2,000 samples representing a portion 2340 of the upper diagram 2300 (different than the portion 2240 of FIG. 22). Again, both diagrams 2300 and 2330 show downward spikes in lux values 2310 and upward spikes in sound values 2320 that correspond in time and correspond with anomalous values 2120 of FIG. 21.

Different sensor combinations may be used synergistically to detect different attributes of an environment. As a specific example, the cleaning of a room may be detected using $CO_2$, lux, and SPL sensors to detect the entrance and exit of a person into and out of a room, and sound related to cleaning (e.g., vacuuming or floor buffering). Additionally, a VoC sensor may be used to detect cleaning chemicals. The $CO_2$ sensor may be omitted where automated (e.g., robotic) cleaning occurs without a human or other source of $CO_2$ present. A CO sensor may be used where a gas-fueled appliance and/or vehicle is used. The detection of cleaning can result in the triggering of an HVAC system to help prevent a spike in VoC levels and/or harmful gasses (e.g., CO). Again, examples of different sensor combinations are shown in the table 1600 of FIG. 16. FIGS. 24 and 25, described below, FIG. 24 shows a flowchart for a method 2400 for determining an attribute, according to an embodiment. The method of FIG. 24 may be performed by an individual sensor of a sensor ensemble. The method of FIG. 24 may be performed by a first sensor coupled to (e.g., and in communication with) a second sensor. The method of FIG. 24 may be directed by at least one controller (e.g., processor) coupled to (e.g., in communication with) first and/or second sensors. The method of FIG. 24 may be performed or facilitated by a system comprising a network operatively coupled to first and second sensors. The method of FIG. 24 begins at 2410, in which a first sensor is used to measure a first attribute at a first sampling rate, the first sampling rate being faster than a second sampling rate of a second sensor configured to sense a second attribute. The first sampling rate may be at least about one order of magnitude faster than the second sampling rate. At 2420, the second attribute is determined and/or predicted at least in part by using measurements of the first attribute by the first sensor rather than measurements of the second sensor, the first sensor and the second sensor being of a facility. The second sensor and the first sensor may be at disposed in the facility. The first sensor and the second sensor may be at disposed in an enclosure of the facility. The first sensor may be disposed in a housing enclosing another sensor, a transceiver, or an emitter. The housing may be disposed in a fixture of the facility or is attached to a fixture of the facility. The first sensor may be utilized to control an environment of the facility. The second attribute may comprise an activity. The activity may comprise (i) cleaning of an enclosure, (ii) movement of one or more personnel in the enclosure, (iii) a change in an environmental condition, (iv) one or more personnel entering into the enclosure, (v) one or more personnel exiting the enclosure, (vi) activity in the enclosure, (vii) exceeding of a maximum occupancy of the enclosure, or (viii) an arrival of a vehicle at an transportation hub. The enclosure may comprise a building, room, or any other confined space. The environmental condition may comprise a weather condition, a sound level, an electromagnetic radiation level, an air quality level, a gas level, a particulate matter level, or a volatile organic compound level. The transportation hub may comprise an airport, a train station, a bus station, a tram stop, a ferry slip, a pilot station, a sailing station, or any other transit station; and wherein optionally the other transit station comprises a rapid transition station. The vehicle may comprise an airplane, a train, a bus, a car, a subway car, a light rail car, a tram, a ferry, a boat, a ship, a helicopter, or a rocket; and optionally wherein the car comprises a taxi car. The second attribute may comprise occupancy status of an enclosure, number of occupants in the enclosure, sound, electromagnetic radiation, an indicator of a level of comfort, an indicator of energy efficiency, air quality, temperature, gas, particulate matter, or volatile organic compounds. The electromagnetic radiation may comprise visible, infrared, ultrasound, or radio frequency radiation. The second attribute that comprises the gas, may comprise the second attribute of one or more of: gas, comprises gas type, velocity, and pressure. The second attribute that comprises gas, they comprise the second attribute of one or more of: humidity, carbon dioxide, carbon monoxide, hydrogen sulfide, radon, nitrogen oxides, halogen, organic halogens, and formaldehyde. The second attribute may comprise temperature, sound, pressure, humidity, gas, particulate matter, volatile organic compound, or electromagnetic radiation. The gas may comprise carbon dioxide, carbon monoxide, radon, or hydrogen sulfide. The second attribute may be associated with an activity. The activity may comprise a human activity or a mechanical activity.

In some embodiments, the method 2400 may further comprise using a third sensor to measure a third attribute at a third sampling rate where the third sampling rate being faster than the second sampling rate of the second sensor, and determining and/or predicting the second attribute at least in part by using measurements of (i) the first attribute by the first sensor and (ii) the third attribute by the third sensor, the third sensor being of a facility. The first sensor and the third sensor may be disposed in a housing. The housing may enclose another sensor, a transceiver, or an emitter. The housing may enclose at least two or seven different sensors. The housing may be disposed in a fixture of the facility, or may be attached to a fixture of the facility. The method 2400 may further comprise synergistically and/or symbiotically evaluating measurements of the first sensor and measurements of the third sensor to determine and/or predict the second attribute. The method 2400 may further comprise using artificial intelligence to determine and/or predict the second attribute. The artificial intelligence may comprise machine learning. The first sensor may be used to collect first sensed data during a period of time at the first sampling rate, the third sensor may be used to collect third sensed data during the period of time at the third sampling rate, wherein the third sensor may comprise a different sensor type than the first sensor and obtaining data indicative of an occurrence of an activity during the period of time, responsive to obtaining the data indicative of the occurrence of the activity: (i) evaluating the first sensed data to determine a first correlation between the activity and a first range of values of the first sensed data, and (ii) evaluating the third sensed data to determine a second correlation between the activity and a third range of values of the third sensed data. The method 2400 may further comprise determining a relationship between the activity, the first range of values, and the third range of values, wherein determining the relationship is based at least in part on the first correlation and the second correlation, and storing data indicative of the determined relationship. The first sensed data, the third sensed data, or both the first sensed data and the third sensed data may occur prior to and/or during the occurrence of the activity.

FIG. 25 shows a flowchart for a method 2500 for establishing a relationship between an attribute (e.g., an activity of interest) and values of sensor data from first and second sensors, according to an embodiment. The method of FIG.

25 may be performed by an individual sensor of a sensor ensemble. The method of FIG. 25 may be performed by a first sensor coupled to (e.g., and in communication with) a second sensor. The method of FIG. 25 may be directed by at least one controller (e.g., processor) coupled to (e.g., in communication with) first and/or second sensors. The method of FIG. 25 may be performed or facilitated by a system comprising a network operatively coupled to first and second sensors. The method of FIG. 25 begins at 2510, where data of the first sensor is analyzed to identify variation from baseline that occurs when an attribute occurs. Baseline may comprise sensor data values of a natural state or mode of operation. Variation from baseline may be identified using outlier detection techniques, as described herein Natural state or mode of operation may correspond to a state in which an environment (e.g., a room or facility) is unoccupied. At 2520, data from one or more additional sensors may be analyzed to identify values that occur before, or during, the attribute. The analysis of data from the first sensor and data from the one or more additional sensors may utilize a multi-dimensional data analysis. The analysis of data from the first sensor and data from the one or more additional sensors may learning techniques (e.g. machine learning or AI) or rule-based techniques (e.g., heuristic analysis). For learning techniques, the data from the first sensor and data from the one or more additional sensors may represent the positive data set. The attribute may be verified by a human user. At 2530, values from the analysis are contrasted with values that occur when the attribute does NOT occur. For learning techniques, values that occur when the attribute does not occur may comprise a negative data set. The human user may verify that the attribute does not take place. The functionality at 2530 can help prevent possible false positives (e.g., detecting an activity of interest when no activity of interest is taking place). At 2540, a range of values of data from first sensor and any additional sensors that occur (e.g., only or often) when the attribute occurs is established. The range may be established in view of the analysis of data at 2510 and 2520, as well as the functionality at 2530.

According to some embodiments, once a relationship is established between an attribute of an environment (e.g., an activity of interest) and values of sensor data from two or more sensors that can be used synergistically (e.g., using the method 2500), the relationship may be modeled for a particular type of environment (e.g., a particular type of room) and utilized in other environments of a similar type. Because each environment has a unique combination of characteristics (e.g., HVAC vents, windows, dimensions, and insulation/building materials), initial deployments of sensors in environments using the synergistic sensing techniques herein may rely on measured sensor data in the field to establish the relationship between sensor values and an attribute. However, as increasingly more data are available across large number of environments, the data may be analyzed to establish environment profiles in which values of sensor data have a similar relationship with an attribute of the environment. Sensor values of rooms having similar combinations of characteristics, for example, may have similar values for detecting a given attribute. Once these environment profiles are established, data from these environment profiles can be utilized to streamline deployment to a new environment by leveraging data from an environment profile applicable to the new environment. According to some embodiments, machine learning or AI techniques may be utilized to analyze data from various environments, determine environment characteristics, and establish environment profiles based on sensor data.

Figure 26:
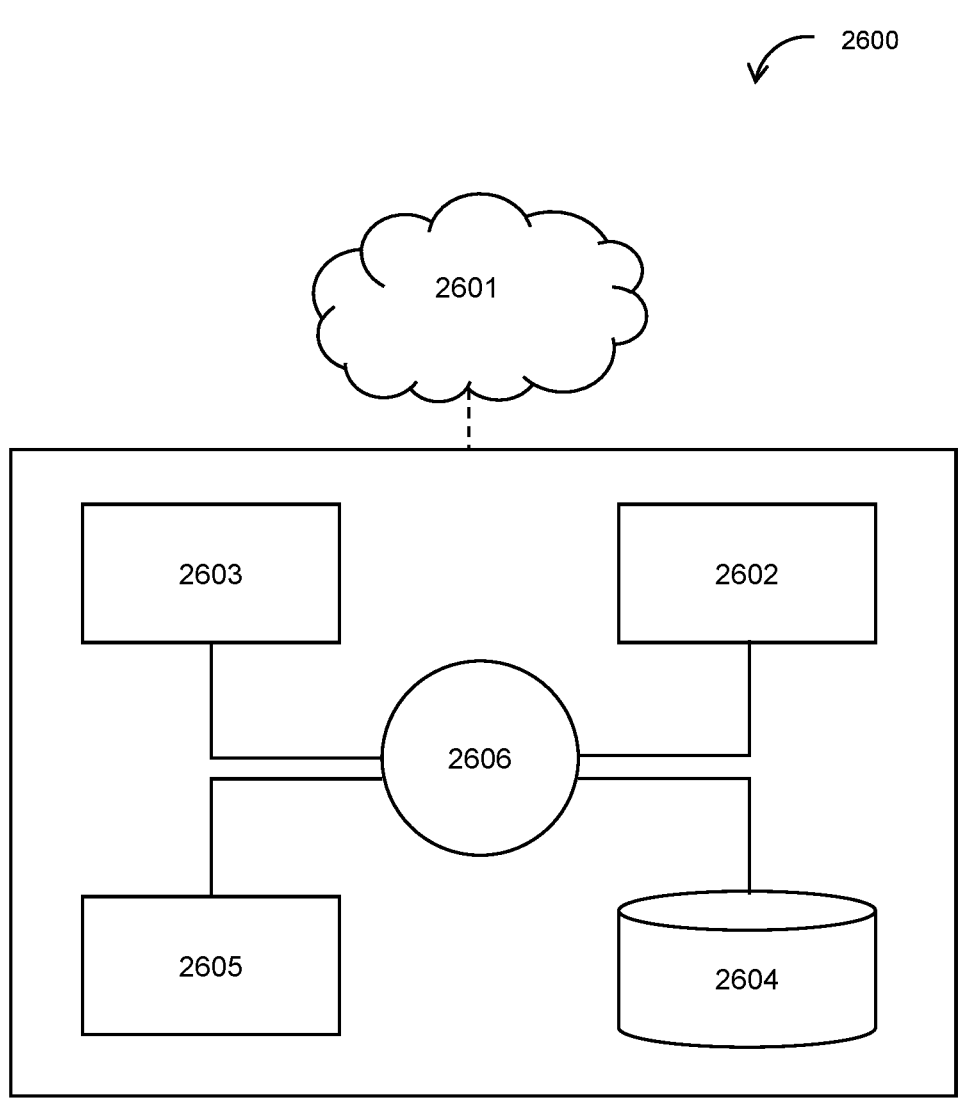
FIG. 26 schematically depicts a processing system.

FIG. 26 shows a schematic example of a computer system 2600 that is programmed or otherwise configured to one or more operations of any of the methods provided herein. The computer system can control (e.g., direct, monitor, and/or regulate) various features of the methods, apparatuses and systems of the present disclosure, such as, for example, control heating, cooling, lightening, and/or venting of an enclosure, or any combination thereof. The computer system can be part of, or be in communication with, any sensor or sensor ensemble disclosed herein. The computer may be coupled to one or more mechanisms disclosed herein, and/or any parts thereof. For example, the computer may be coupled to one or more sensors, valves, switches, lights, windows (e.g., IGUs), motors, pumps, optical components, or any combination thereof. The sensor may be integrated in a transceiver.

The computer system can include a processing unit (e.g., 2606) (also "processor," "computer" and "computer processor" used herein). The computer system may include memory or memory location (e.g., 2602) (e.g., random-access memory, read-only memory, flash memory), electronic storage unit (e.g., 2604) (e.g., hard disk), communication interface (e.g., 2603) (e.g., network adapter) for communicating with one or more other systems, and peripheral devices (e.g., 2605), such as cache, other memory, data storage and/or electronic display adapters. In the example shown in FIG. 26, the memory 2602, storage unit 2604, interface 2603, and peripheral devices 2605 are in communication with the processor 2606 through a communication bus (solid lines), such as a motherboard. The storage unit can be a data storage unit (or data repository) for storing data. The computer system can be operatively coupled to a computer network ("network") (e.g., 2601) with the aid of the communication interface. The network can be the Internet, an internet and/or extranet, or an intranet and/or extranet that is in communication with the Internet. In some cases, the network is a telecommunication and/or data network. The network can include one or more computer servers, which can enable distributed computing, such as cloud computing. The network, in some cases with the aid of the computer system, can implement a peer-to-peer network, which may enable devices coupled to the computer system to behave as a client or a server.

The processing unit can execute a sequence of machine-readable instructions, which can be embodied in a program or software. The instructions may be stored in a memory location, such as the memory 2602. The instructions can be directed to the processing unit, which can subsequently program or otherwise configure the processing unit to implement methods of the present disclosure. Examples of operations performed by the processing unit can include fetch, decode, execute, and write back. The processing unit may interpret and/or execute instructions. The processor may include a microprocessor, a data processor, a central processing unit (CPU), a graphical processing unit (GPU), a system-on-chip (SOC), a co-processor, a network processor, an application specific integrated circuit (ASIC), an application specific instruction-set processor (ASIPs), a controller, a programmable logic device (PLD), a chipset, a field programmable gate array (FPGA), or any combination thereof. The processing unit can be part of a circuit, such as an integrated circuit. One or more other components of the system 2600 can be included in the circuit.

The storage unit can store files, such as drivers, libraries and saved programs. The storage unit can store user data (e.g., user preferences and user programs). In some cases, the computer system can include one or more additional data storage units that are external to the computer system, such as located on a remote server that is in communication with the computer system through an intranet or the Internet.

The computer system can communicate with one or more remote computer systems through a network. For instance, the computer system can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. A user (e.g., client) can access the computer system via the network.

Methods as described herein can be implemented by way of machine (e.g., computer processor) executable code stored on an electronic storage location of the computer system, such as, for example, on the memory 2602 or electronic storage unit 2604. The machine executable or machine-readable code can be provided in the form of software. During use, the processor 2606 can execute the code. In some cases, the code can be retrieved from the storage unit and stored on the memory for ready access by the processor. In some situations, the electronic storage unit can be precluded, and machine-executable instructions are stored on memory.

The code can be pre-compiled and configured for use with a machine have a processer adapted to execute the code or can be compiled during runtime. The code can be supplied in a programming language that can be selected to enable the code to execute in a pre-compiled or as-compiled fashion.

In some embodiments, the processor comprises a code. The code can be program instructions. The program instructions may cause the at least one processor (e.g., computer) to direct a feed forward and/or feedback control loop. In some embodiments, the program instructions cause the at least one processor to direct a closed loop and/or open loop control scheme. The control may be based at least in part on one or more sensor readings (e.g., sensor data). One controller may direct a plurality of operations. At least two operations may be directed by different controllers. In some embodiments, a different controller may direct at least two of operations (a), (b) and (c). In some embodiments, different controllers may direct at least two of operations (a), (b) and (c). In some embodiments, a non-transitory computer-readable medium cause each a different computer to direct at least two of operations (a), (b) and (c). In some embodiments, different non-transitory computer-readable mediums cause each a different computer to direct at least two of operations (a), (b) and (c). The controller and/or computer readable media may direct any of the apparatuses or components thereof disclosed herein. The controller and/or computer readable media may direct any operations of the methods disclosed herein.

In some embodiments a user is able to adjust the environment, e.g., using a virtual reality (VR) module (e.g., augmented reality module). The VR module may receive data from one or more sensors about various environmental properties (e.g., characteristics) sensed by the one or more sensors. The VR module may receive structural information regarding the environment, e.g., to account for any surrounding walls, windows, and/or doors enclosing the environment. The VR module may receive visual information about the environment, e.g., from one or more sensors (e.g., comprising a camera such as a video camera). The VR module may be operated by a controller (e.g., comprising a processor). The VR module may be operatively (e.g., communicatively) coupled to a projection aid. The projection aid may comprise a screen (e.g., electronic or non-electronic screen), a projector, or a headset (e.g., glasses or goggles). The one or more sensors may be disposed on an electrical board (e.g., a motherboard). The one or more sensors may be a part of a sensor ensemble. The sensor ensemble may be a device ensemble comprising (i) sensors or (ii) a sensor and an emitter. The enclosure may comprise sensors of the same type disposed at different locations in the environment. The enclosure may comprise ensembles disposed at different locations in the environment. The VR module may allow a user to select a type of environmental property (e.g., among different property types) to view and/or control. The VR module may allow emulation of any variability in the property in the environment. The property variability may be emulated as a three-dimensional map superimposed on any fixtures of the enclosure enclosing the environment. The property variability in the environment may change in real time. The VR module may update the property variability in real time. The VR module may use data of the one or more sensors (e.g., measuring the requested property in the environment), simulation, and/or third party data, to emulate the property variability. The simulation may utilize artificial intelligence. The simulation may be any simulation described herein. The VR module may project a plurality of different properties in the environment, e.g., simultaneously and/or in real time. A user may request alteration of any property displayed by the VR module. The VR module may send (e.g., directly or indirectly) commands to one or more components that affect the environment of the enclosure (e.g., HVAC, lighting, or tint of a window). Indirect command may be via one or more controllers communicatively coupled to the VR module. The VR module may operate via one or more processors. The VR module may reside on a network that is operatively coupled to the one or more components that affect the environment, to one or more controllers, and/or to one or more processors. For example, the VR module may facilitate controlling a tint of a window disposed in the enclosure. The VR projection may project the window, as well as a menu or bar (e.g., sliding bar) depicting various levels of tint. The menu may be superimposed on the VR projection of the enclosure. The user may look at the window and select the desired level of tint. Receiving the command (e.g., through the network), the window controller may direct the user selected window to alter its tint. For example, the VR module may facilitate controlling a temperature in the enclosure. In another example, the VR module may emulate a temperature distribution in the enclosure. A user may look at the temperature range displayed on a menu or bar (e.g., sliding bar) and select the desired temperature in the enclosure and/or in a portion of the enclosure. The request may be directed to a local controller that directs the HVAC system (e.g., including any vents) to adjust its temperature according to the request. Subsequent to the request, the VR module may emulate a change in the property (e.g., glass tint, and/or temperature), e.g., as the change occurs in the enclosure. The user may be able to view both temperature distribution and window tint level in the same VR experience (e.g., projection timeframe of the VR environment) or in different VR experiences. The user may be able to request both new temperature and new window tint level in the same VR experience or in different VR experiences. The user may be able to view a change in both new temperature and new window tint level in the same VR experience or in different VR experiences. At times, a VR projected update of an alteration of a first property may lag (e.g., due to processing time of sensor data) relative to an update of an alteration of at least one second property, wherein the user requested a change in both first property and the at least one second property. At times, a VR projected update of an alteration of a first property may coincide with an update of an alteration of at least one second property, wherein the user requested a change in both first property and the at least one second property. The selection may be using any VR tools and/or any other user input tool such as a touchscreen, joystick, console, keyboard, controller (e.g., remote controller and/or game controller), digital pen, camera, or microphone.

In some embodiments, the at least one sensor is operatively coupled to a control system (e.g., computer control system). The sensor may comprise light sensor, acoustic sensor, vibration sensor, chemical sensor, electrical sensor, magnetic sensor, fluidity sensor, movement sensor, speed sensor, position sensor, pressure sensor, force sensor, density sensor, distance sensor, or proximity sensor. The sensor may include temperature sensor, weight sensor, material (e.g., powder) level sensor, metrology sensor, gas sensor, or humidity sensor. The metrology sensor may comprise measurement sensor (e.g., height, length, width, angle, and/or volume). The metrology sensor may comprise a magnetic, acceleration, orientation, or optical sensor. The sensor may transmit and/or receive sound (e.g., echo), magnetic, electronic, or electromagnetic signal. The electromagnetic signal may comprise a visible, infrared, ultraviolet, ultrasound, radio wave, or microwave signal. The gas sensor may sense any of the gas delineated herein. The distance sensor can be a type of metrology sensor. The distance sensor may comprise an optical sensor, or capacitance sensor. The sensor may comprise an accelerometer. The temperature sensor can comprise Bolometer, Bimetallic strip, calorimeter, Exhaust gas temperature gauge, Flame detection, Gardon gauge, Golay cell, Heat flux sensor, Infrared thermometer, Microbolometer, Microwave radiometer, Net radiometer, Quartz thermometer, Resistance temperature detector, Resistance thermometer, Silicon band gap temperature sensor, Special sensor microwave/imager, Temperature gauge, Thermistor, Thermocouple, Thermometer (e.g., resistance thermometer), or Pyrometer. The temperature sensor may comprise an optical sensor. The temperature sensor may comprise image processing. The sensor may comprise an IR camera, a visible light camera, and/or a depth camera. The temperature sensor may comprise a camera (e.g., IR camera, CCD camera). The pressure sensor may comprise Barograph, Barometer, Boost gauge, Bourdon gauge, Hot filament ionization gauge, Ionization gauge, McLeod gauge, Oscillating U-tube, Permanent Downhole Gauge, Piezometer, Pirani gauge, Pressure sensor, Pressure gauge, Tactile sensor, or Time pressure gauge. The position sensor may comprise Auxanometer, Capacitive displacement sensor, Capacitive sensing, Free fall sensor, Gravimeter, Gyroscopic sensor, Impact sensor, Inclinometer, Integrated circuit piezoelectric sensor, Laser rangefinder, Laser surface velocimeter, LIDAR, Linear encoder, Linear variable differential transformer (LVDT), Liquid capacitive inclinometers, Odometer, Photoelectric sensor, Piezoelectric accelerometer, Rate sensor, Rotary encoder, Rotary variable differential transformer, Selsyn, Shock detector, Shock data logger, Tilt sensor, Tachometer, Ultrasonic thickness gauge, Variable reluctance sensor, or Velocity receiver. The optical sensor may comprise a Charge-coupled device, Colorimeter, Contact image sensor, Electro-optical sensor, Infra-red sensor, Kinetic inductance detector, light emitting diode (e.g., light sensor), Light-addressable potentiometric sensor, Nichols radiometer, Fiber optic sensor, Optical position sensor, Photo detector, Photodiode, Photomultiplier tubes, Phototransistor, Photoelectric sensor, Photoionization detector, Photomultiplier, Photo resistor, Photo switch, Phototube, Scintillometer, Shack-Hartmann, Single-photon avalanche diode, Superconducting nanowire single-photon detector, Transition edge sensor, Visible light photon counter, or Wave front sensor. The one or more sensors may be connected to a control system (e.g., to a processor, to a computer).

While preferred embodiments of the present invention have been shown, and described herein, it will be obvious to those skilled in the art that such embodiments are provided by way of example only. It is not intended that the invention be limited by the specific examples provided within the specification. While the invention has been described with reference to the afore-mentioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein might be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A method of determining an attribute, the method comprising:

using a first sensor to measure a first attribute at a first sampling rate, the first sampling rate being faster than a second sampling rate of a second sensor configured to sense a second attribute;

using the first sensor to collect first sensed data during a period of time at the first sampling rate;

using a third sensor to measure a third attribute at a third sampling rate, the third sampling rate being faster than the second sampling rate of the second sensor;

using the third sensor to collect third sensed data during the period of time at the third sampling rate, wherein the third sensor comprises a different sensor type than the first sensor;

obtaining data indicative of an occurrence of an activity during the period of time;

responsive to obtaining the data indicative of the occurrence of the activity:

(i) evaluating, by an artificial intelligence, the first sensed data to determine a first correlation between the activity and a first range of values of the first sensed data, and (ii) evaluating, by the artificial intelligence, the third sensed data to determine a second correlation between the activity and a third range of values of the third sensed data;

determining, by the artificial intelligence, a relationship between the activity, the first range of values, and the third range of values, wherein determining the relationship is based at least in part on the first correlation and the second correlation; and determining, by the artificial intelligence, the second attribute at least in part by using measurements of the first attribute by the first sensor and the third attribute by the third sensor rather than measurements of the second sensor, the first, second, and third sensors being of a facility.

2. The method of claim 1, wherein the second attribute comprises an activity.

3. The method of claim 2, wherein the activity comprises (i) cleaning of an enclosure, (ii) movement of one or more personnel in the enclosure, (iii) a change in an environmental condition, (iv) one or more personnel entering into the enclosure, (v) one or more personnel exiting the enclosure, (vi) activity in the enclosure, (vii) exceeding of a maximum occupancy of the enclosure, or (viii) an arrival of a vehicle at a transportation hub.

4. The method of claim 3 wherein the environmental condition comprises a weather condition, a sound level, an electromagnetic radiation level, an air quality level, a gas level, a particulate matter level, or a volatile organic compound level.

5. The method of claim 3 wherein the transportation hub comprises an airport, a train station, a bus station, a tram stop, a ferry slip, a pilot station, a sailing station, or any other transit station; and wherein optionally the other transit station comprises a rapid transition station.

6. The method of claim 3 wherein the vehicle comprises an airplane, a train, a bus, a car, a subway car, a light rail car, a tram, a ferry, a boat, a ship, a helicopter, or a rocket; and optionally wherein the car comprises a taxi car.

7. The method of claim 1, wherein the second attribute comprises occupancy status of an enclosure, number of occupants in the enclosure, sound, electromagnetic radiation, an indicator of a level of comfort, an indicator of energy efficiency, air quality, temperature, gas, particulate matter, or volatile organic compounds.

8. The method of claim 7, wherein the second attribute that comprises gas comprises one or more of: gas type, velocity, and pressure.

9. The method of claim 7, wherein the second attribute that comprises gas comprises one or more of: humidity, carbon dioxide, carbon monoxide, hydrogen sulfide, radon, nitrogen oxides, halogen, organic halogens, and formaldehyde.

10. The method of claim 1, wherein the second sensor and the first sensor are disposed in the facility.

11. The method of claim 1, wherein the second attribute comprises temperature, sound, pressure, humidity, gas, particulate matter, volatile organic compound, or electromagnetic radiation.

12. The method of claim 11, wherein the gas comprises carbon dioxide, carbon monoxide, radon, or hydrogen sulfide.

13. The method of claim 1, wherein the second attribute is associated with an activity that comprises a human activity or a mechanical activity.

14. The method of claim 1, wherein the first sensor is utilized to control an environment of the facility.

15. The method of claim 1, wherein the first sensor and the third sensor are disposed in a housing, and the method further comprising synergistically and/or symbiotically evaluating measurements of the first sensor and measurements of the third sensor to determine and/or predict the second attribute.

16. The method of claim 1, wherein the artificial intelligence comprises machine learning.

17. The method of claim 1, wherein (i) the first sensed data, (ii) the third sensed data, or both the first sensed data and the third sensed data, occur prior to and/or during the occurrence of the activity.

18. The method of claim 1, further comprising:
modeling a relationship between the second attribute and the first sensed data and the third sensed data for a specific environmental type; and
establishing, by the artificial intelligence, an environmental profile for the specific environmental type based on the modeled relationship.

19. A non-transitory computer readable medium storing instructions that, when executed by one or more processors, cause the one or more processors to perform an operation, the operation comprising:
using, or directing use of, a first sensor to measure a first attribute at a first sampling rate, the first sampling rate being faster than a second sampling rate of a second sensor configured to sense a second attribute;
collecting, or directing collection of, the first sensor to collect first sensed data during a period of time at the first sampling rate;
using, or directing use of, a third sensor to measure a third attribute at a third sampling rate, the third sampling rate being faster than the second sampling rate of the second sensor;
collecting, or directing collection of, the third sensor to collect third sensed data during the period of time at the third sampling rate, wherein the third sensor comprises a different sensor type than the first sensor;
obtaining, or directing obtaining of, data indicative of an occurrence of an activity during the period of time;
responsive to obtaining the data indicative of the occurrence of the activity:
(i) evaluating, or directing evaluation of, by an artificial intelligence, the first sensed data to determine a first correlation between the activity and a first range of values of the first sensed data; and
(ii) evaluating, or directing evaluation of, by the artificial intelligence, the third sensed data to determine a second correlation between the activity and a third range of values of the third sensed data;
determining, or directing determination of, by the artificial intelligence, a relationship between the activity, the first range of values, and the third range of values, wherein determining the relationship is based at least in part on the first correlation and the second correlation; and
determining, or directing determination of, by the artificial intelligence, the second attribute at least in part by using measurements of the first attribute by the first sensor and the third attribute by the third sensor rather than measurements of the second sensor, the first, second, and third sensors being of an environment.

20. An apparatus, comprising:
a device ensemble comprising a first sensor, a second sensor, a third sensor, and at least one processor, the device ensemble being configured to:
measure a first attribute by the first sensor at a first sampling rate, the first sampling rate being faster than a second sampling rate of the second sensor configured to sense a second attribute;
collect, using the first sensor, first sensed data during a period of time at the first sampling rate;
measure a third attribute by the third sensor at a third sampling rate, the third sampling rate being faster than the second sampling rate of the second sensor;
collect, using the third sensor, third sensed data during the period of time at the third sampling rate, wherein the third sensor comprises a different sensor type than the first sensor;

obtaining, by the at least one processor, data indicative of an occurrence of an activity during the period of time; and responsive to obtaining the data indicative of the occurrence of the activity, the at least one processor is configured to:

(i) evaluate, implementing an artificial intelligence, the first sensed data to determine a first correlation between the activity and a first range of values of the first sensed data;

(ii) evaluate, by implementing the artificial intelligence, the third sensed data to determine a second correlation between the activity and a third range of values of the third sensed data;

(iii) determine, by implementing the artificial intelligence, a relationship between the activity, the first range of values, and the third range of values, wherein determining the relationship is based at least in part on the first correlation and the second correlation; and (iv) determine, by implementing the artificial intelligence, the second attribute at least in part by using measurements of the first attribute by the first sensor and the third attribute by the third sensor rather than measurements of the second sensor, the first, second, and third sensors being of an enclosure.

\* \* \* \* \*